(12) United States Patent
Owen et al.

(10) Patent No.: US 10,223,076 B1
(45) Date of Patent: Mar. 5, 2019

(54) GENERATING CODE BASED ON USER INTERACTIONS WITH A USER INTERFACE ELEMENT IN A CODE EDITOR

(71) Applicant: The MathWorks, Inc., Natick, MA (US)

(72) Inventors: James G. Owen, Bolton, MA (US); Felix Alvarez, Natick, MA (US); Keerthi Gurijala, Natick, MA (US); Abigail S. Skofield, Bolton, MA (US); Alexander Zak, Boston, MA (US); Claudia G. Wey, Wayland, MA (US); Eera Gupta, Framingham, MA (US); Roy Lurie, Natick, MA (US); Michelle D. Erickson, Watertown, MA (US); Ralf Hillebrand, Paderborn (DE); Alexander Rensmann, Paderborn (DE); Benjamin V. Hinkle, Brookline, MA (US); Oliver Kluge, Oerllinghausen (DE)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/610,227

(22) Filed: May 31, 2017

Related U.S. Application Data

(63) Continuation-in-part of application No. 15/249,879, filed on Aug. 29, 2016.

(51) Int. Cl.
*G06F 8/33* (2018.01)
*G06F 8/34* (2018.01)
*G06F 3/0482* (2013.01)

(52) U.S. Cl.
CPC .............. *G06F 8/34* (2013.01); *G06F 3/0482* (2013.01); *G06F 8/33* (2013.01)

(58) Field of Classification Search
CPC ..... G06F 8/30; G06F 8/33; G06F 8/34; G06F 3/0482
USPC .................................................. 717/106–113
See application file for complete search history.

(56) References Cited

U.S. PATENT DOCUMENTS

| | | | |
|---|---|---|---|
| 9,053,235 B1 | 6/2015 | Bienkowski et al. | |
| 2001/0034879 A1 | 10/2001 | Washington | |
| 2002/0167544 A1* | 11/2002 | Raghavan | G06F 8/34 715/763 |
| 2006/0080639 A1 | 4/2006 | Bustelo | |

(Continued)

OTHER PUBLICATIONS

The MathWorks, "Save Figure to Reopen in MATLAB Later", https://www.mathworks.com/help/matlab/creating_plots/save-figure-to-reopen-in-matlab-later.html#buneyas-4, 2 pages.

(Continued)

*Primary Examiner* — Qing Chen
(74) *Attorney, Agent, or Firm* — Harrity & Harrity, LLP

(57) ABSTRACT

A method may include displaying an output, e.g., a figure, a data set, a symbolic expression or equation, a model, or any object with a representation that can be manipulated, e.g., a tree, a list, or a control loop, from executing program code. The method may include receiving an indication that the output has been modified through one or more manipulations, and generating code that represents modifications to the output, such that executing the code with the program code generates the output that has been modified.

39 Claims, 42 Drawing Sheets

(56) References Cited

U.S. PATENT DOCUMENTS

2014/0297516 A1 10/2014 Brown
2015/0301806 A1* 10/2015 Leon .................. G06F 8/33
                                                717/113

OTHER PUBLICATIONS

The MathWorks, "Example-Generating MATLAB Code to Reproduce a Graph::Plots and Plotting Tools (MATLAB)", https://www.mathworks.com/help/releases/R2010a/techdoc/creating_plots/f944170. html, 2 pages.

Co-pending U.S. Appl. No. 15/052,464, filed Feb. 24, 2016 entitled "Embedding User Interface Elements in Documents Containing Code," Joseph F. Hicklin et al., 60 pages.

Co-pending U.S. Appl. No. 14/745,945, filed Jun. 22, 2015 entitled "Linking Program Code and Code Artifacts Using a Single Entity," Joseph F. Hicklin et al., 77 pages.

* cited by examiner

Second Derivatives: Finding Inflection Points

Computing the second derivative lets you find inflection points of the expression. The most efficient way to compute second or high-order derivatives is to use the parameter that specifies the order of the derivative.

h = diff (f, x, 2) ⌒1302

$$h = \frac{18x+34}{\sigma_1} - \frac{2(6x^2-1)(9x^2+34x+6)}{\sigma_1^2} + \frac{12x\sigma_2}{\sigma_1^2} + \frac{2(6x^2-1)^2\sigma_2}{\sigma_1^3}$$

Where
$\sigma_1 = 2x^3 - x + 3$
$\sigma_2 = 3x^3 + 17x^2 + 6x + 1$

Simplify ⌒1308
SimplifyFraction
Expand ⌒1312
Combine ⌒1314
Subexpr ⌒1316
Rewrite ⌒1318

FIG. 2V-1

Second Derivatives: Finding Inflection Points

Computing the second derivative lets you find inflection points of the expression. The most efficient way to compute second or high-order derivatives is to use the parameter that specifies the order of the derivative.

h = diff (f, x, 2) —1302
h = simplify(h) —1322

$$h = \frac{2(68x^6+90x^5+18x^4+699x^3-249x^2+63x+172)}{(2x^3-x+3)^3}$$

```
syms t;
int(sin(t^2), t, 0, inf)        —1402
```

$$\int_0^\infty \sin(t^2)$$ —1404

GENERATING CODE BASED ON USER INTERACTIONS WITH A USER INTERFACE ELEMENT IN A CODE EDITOR

RELATED APPLICATIONS

This application is a continuation in part of U.S. patent application Ser. No. 15/249,879, filed on Aug. 29, 2016, the entire contents of which are hereby incorporated by reference.

BRIEF DESCRIPTION OF THE DRAWINGS

FIG. 3 is a diagram of an example environment in which systems and/or methods, described herein, may be implemented;

DETAILED DESCRIPTION

Figure 1A:
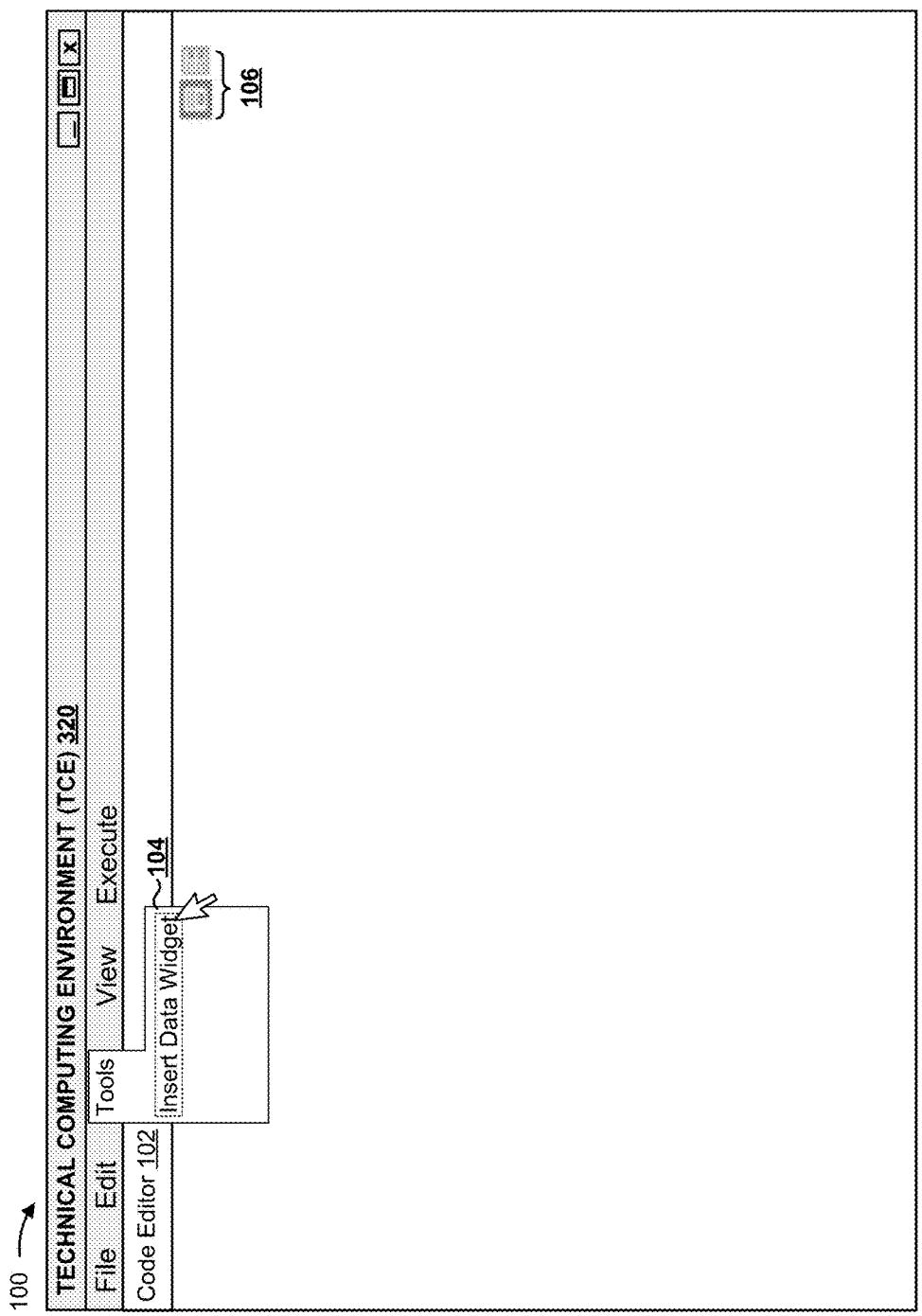
FIGS. 1A-1H are diagrams of an overview of example implementations described herein.

The following detailed description of example implementations refers to the accompanying drawings.

A user, such as a computer programmer, may be working with data, objects, and/or program code on a device. The device may provide the data and/or the objects for display together with program code associated with the data and/or the objects (e.g., program code that generates, operates on, etc. the data and/or the objects). For example, the device may provide the data and/or the objects for display via a user interface (UI) element associated with (e.g., supported by, compatible with, displayed within, etc.) a technical computing environment (TCE). The UI element may enable the user to create, visualize, and/or manipulate the data and/or the objects. In addition, the UI element may enable the user to create, visualize, and/or manipulate the program code associated with the data and/or the objects. For example, the UI element may enable the user to create, visualize, and/or manipulate the program code that generates or operates on the data and/or the objects. Further, the creation, visualization, and/or manipulation of the program code may be recorded by automatic generation of program code, such that execution of the program code causes the creation, visualization, and/or manipulation to be recreated.

Implementations described herein enable a device to provide data, objects, and/or program code from a program file, such as a file that includes program code, for visualization, manipulation, and/or execution. In addition, the device may provide the data, objects, and/or program code for visualization, manipulation, and/or execution using the same TCE, thereby reducing or eliminating the need for separate TCEs for visualizing, manipulating, and/or executing data, an object, and/or program code. Further, the device may persist manipulations to the data and/or the objects by automatically generating program code using a code generator and storing the generated code, thereby reducing or eliminating the need for a user to handwrite program code.

FIGS. 1A-1H are diagrams of an overview of an example implementation 100 described herein. In the examples shown in FIGS. 1A-1H, the programming environment is a TCE 320 (described in more detail in connection with FIG. 3, below). In some implementations, a code editor 102 may be displayed within TCE 320 on a screen associated with a device (e.g., a screen connected with a client device or a server device). In some implementations, a device may host TCE 320 and/or code editor 102 (e.g., a code editor window that permits a user to input and/or view program code). Additionally, or alternatively, a device may host TCE 320 and/or code editor 102, and may provide access to TCE 320 and/or code editor 102 (e.g., may provide a device with access to TCE 320 and/or code editor 102).

In some implementations, a user may interact with TCE 320 using an input component associated with the device (e.g., a keyboard, a touch screen, a mouse, or a touch pad connected with the device). Additionally, or alternatively, the user may interact with TCE 320 using an input mechanism associated with TCE 320 (e.g., a button, a menu, or a menu item displayed by, displayed within, connected with, etc. TCE 320). For example, the user may use a mouse to interact with TCE 320 to select or click a menu associated with TCE 320 (e.g., a "Tools" menu displayed by, displayed within, connected with, etc. TCE 320) and/or to select a menu item included in the menu.

In some implementations, systems and/or methods (e.g., software and/or applications installed, or executing, on the device) may provide a UI element for display. For example, the systems and/or methods may provide the UI element for display via TCE 320. In some implementations, a user of the device may interact with the UI element. For example, the user may input data, view data, and/or manipulate data. In some implementations, the systems and/or methods may generate program code to record the interactions of the user with the UI element. For example, the systems and/or methods may generate program code that persists the interactions of the user such that execution of the generated program code recreates the interactions.

As shown in FIG. 1A, and by reference number 104, the user may select an "Insert Data Widget" menu item included in the "Tools" menu. In some implementations, the user may select the "Insert Data Widget" menu item to insert (e.g., display) a UI element in code editor 102, such as a data widget that permits the user to visualize and/or manipulate data. Additionally, or alternatively, the user may handwrite particular program code (e.g., data=) within code editor 102, which may trigger display of an input mechanism in code editor 102 for inserting a UI element in code editor 102 (e.g., rather than selecting a menu item from a menu to insert the UI element in code editor 102). For example, code editor 102 may display an "Insert Data Widget" button in-line with the particular program code that triggered display of the "Insert Data Widget" button, selection of which may insert a UI element in code editor 102.

As shown by reference number 106, TCE 320 may include one or more input mechanisms that permit the user to toggle a display of data, objects, and/or program code (e.g., toggle between an in-line display or a side-by-side display), as described in more detail elsewhere herein. Assume for FIGS. 1A-1E that the user has selected an in-line display of the data, the objects, and/or the program code, as indicated by the darkened border around the left positioned button associated with reference number 106.

Figure 1B:
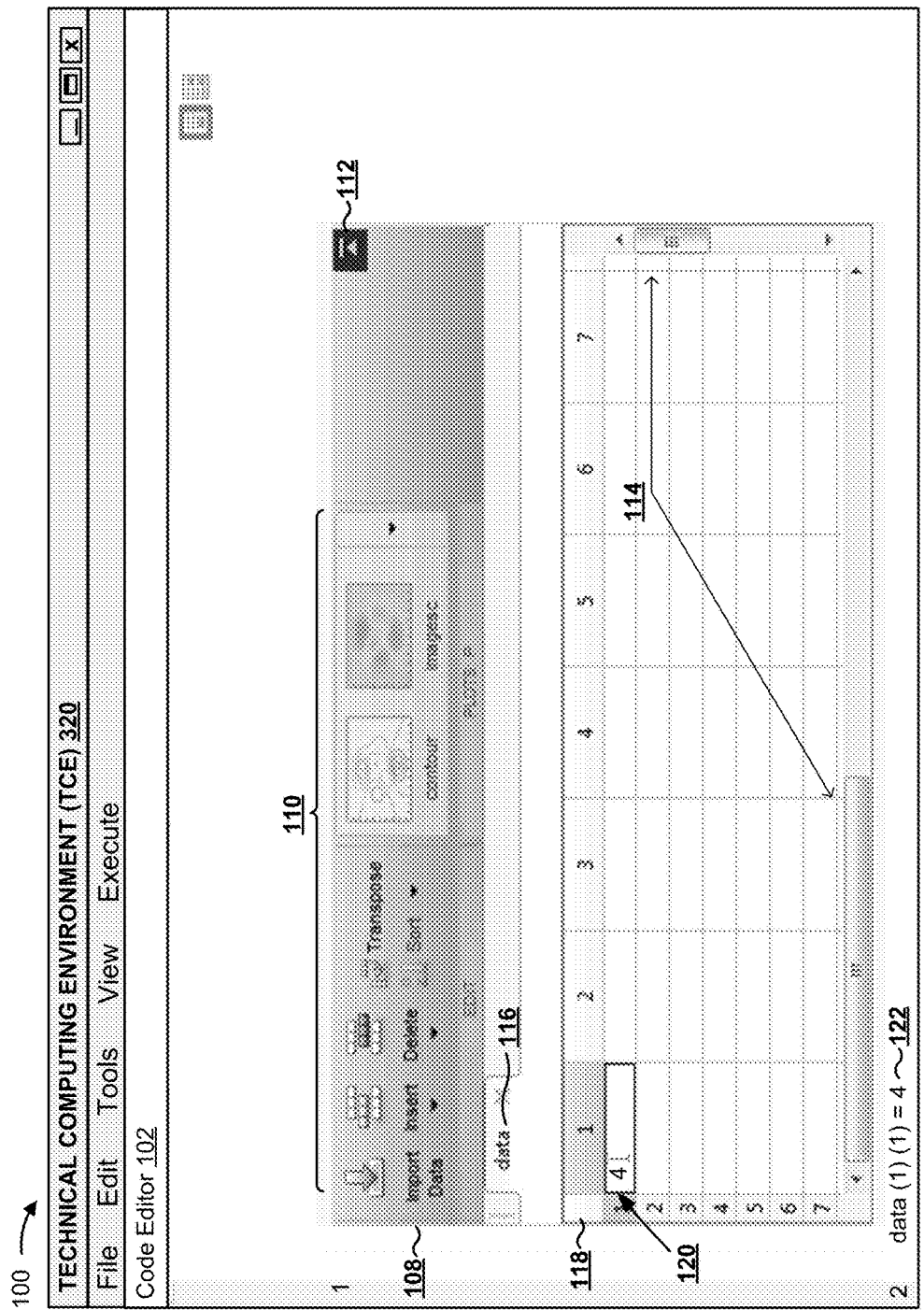

As shown in FIG. 1B, the systems and/or methods may provide UI element 108 for display via TCE 320. In some implementations, TCE 320 may display UI element 108 based on one or more triggers (e.g., user selection of the "Insert Data Widget" menu item or user selection of an "Insert Data Widget" button displayed in-line with program code). As shown by reference number 110, UI element 108 may include one or more input mechanisms, such as an "Import Data" button, an "Insert" button, a "Delete" button, etc.

In some implementations, user selection of the one or more input mechanisms may cause UI element 108 to perform one or more actions. For example, selection of the "Import Data" button may cause UI element 108 to import data into UI element 108. In some implementations, selection of another button may cause UI element 108 to manipulate the data (e.g., after UI element 108 has imported the data into UI element 108). For example, selection of an "Insert" button may cause UI element 108 to insert a blank row into the data. As another example, selection of a "Delete" button may cause UI element 108 to delete a row of data. As another example, selection of a "Transpose" button may cause UI element 108 to transpose data displayed within UI element 108. In some implementations, selection of the one or more input mechanisms may cause the systems and/or methods to generate program code, as described in more detail below.

As shown by reference number 112, an input mechanism associated with (e.g., displayed by, connected with, etc.) UI element 108, such as an expander control, may enable the user to expand or collapse UI element 108 (e.g., expand UI element 108 from a line of program code and/or collapse UI element 108 into a line of program code). As shown by reference number 114, UI element 108 may include one or more scroll bars that permit the user to scroll (e.g., scroll up, down, left, or right) through UI element 108 (e.g., a table) via interaction with the scroll bars. Including one or more scroll bars may permit a user to view data imported by, displayed by, and/or displayed within, UI element 108.

As show by reference number 116, UI element 108 may include an identifier, such as a variable identifier, used to identify a variable that stores data associated with (e.g., displayed by, imported by, etc.) UI element 108 (e.g., shown as "data"). In some implementations, the systems and/or methods may use the identifier in association with generating program code (e.g., by including the identifier in the generated program code, generating the program code based on the identifier, etc.), as described below. As shown by reference number 118, UI element 108 may include a table or matrix of cells capable of receiving and/or displaying data (e.g., values, such as numbers or strings of characters). For example, the table and/or matrix of cells may receive data via user input and/or may display data input by a user, data imported by UI element 108, etc., as described in more detail below. In some implementations, the cells of the table may be arranged in rows and columns.

In some implementations, a user may create data within UI element 108 (e.g., by inputting the data into UI element 108). As shown by reference number 120, the user may select a particular cell of the table (e.g., a cell corresponding to the intersection of row one and column one, referred to herein as "cell 1, 1"). As further shown, the user may input "4" as the value of cell 1, 1. In some implementations, UI element 108 may permit the user to input text or a function as the value of the cell, such as a function that receives input from another cell and provides output.

As shown by reference number 122, the systems and/or methods may automatically generate program code based on the user inputting a value for cell 1, 1. For example, the code generator may generate data (1) (1)=4 as a line of program code, where data is the identifier of the variable used to store data associated with (e.g., displayed by, displayed within, imported by, etc.) UI element 108, (1) (1) refers to cell 1, 1 (or matrix element at column 1, row 1), and =4 refers to the value of cell 1, 1, which was input by the user. When executed, the program code generated by the code generator may enable the systems and/or methods to recreate the user interaction with cell 1, 1 (e.g., by setting the value of cell 1, 1 to 4). The systems and/or methods may provide the generated program code for display to the user via code editor 102, which may enable the user to visualize and/or manipulate the program code.

In some implementations, UI element 108 may automatically update the generated program code, or generate new program code, based on user interaction with the data input by the user. For example, assuming that the user changes the data in cell 1, 1 from "4" to "6," UI element 108 may update the program code shown by reference number 122 to data (1) (1)=6 to record the user modification of the data from "4" to "6."

In this way, the systems and/or methods may record a user interaction with a UI element without the user having to handwrite additional program code, and may persist a result of the interaction by storing the program code in a program file. Further, additional program code (e.g., additional handwritten program code or additional generated program code) may use generated program code and/or a generated variable created using the UI element to persist the result of the interaction.

Figure 1C:
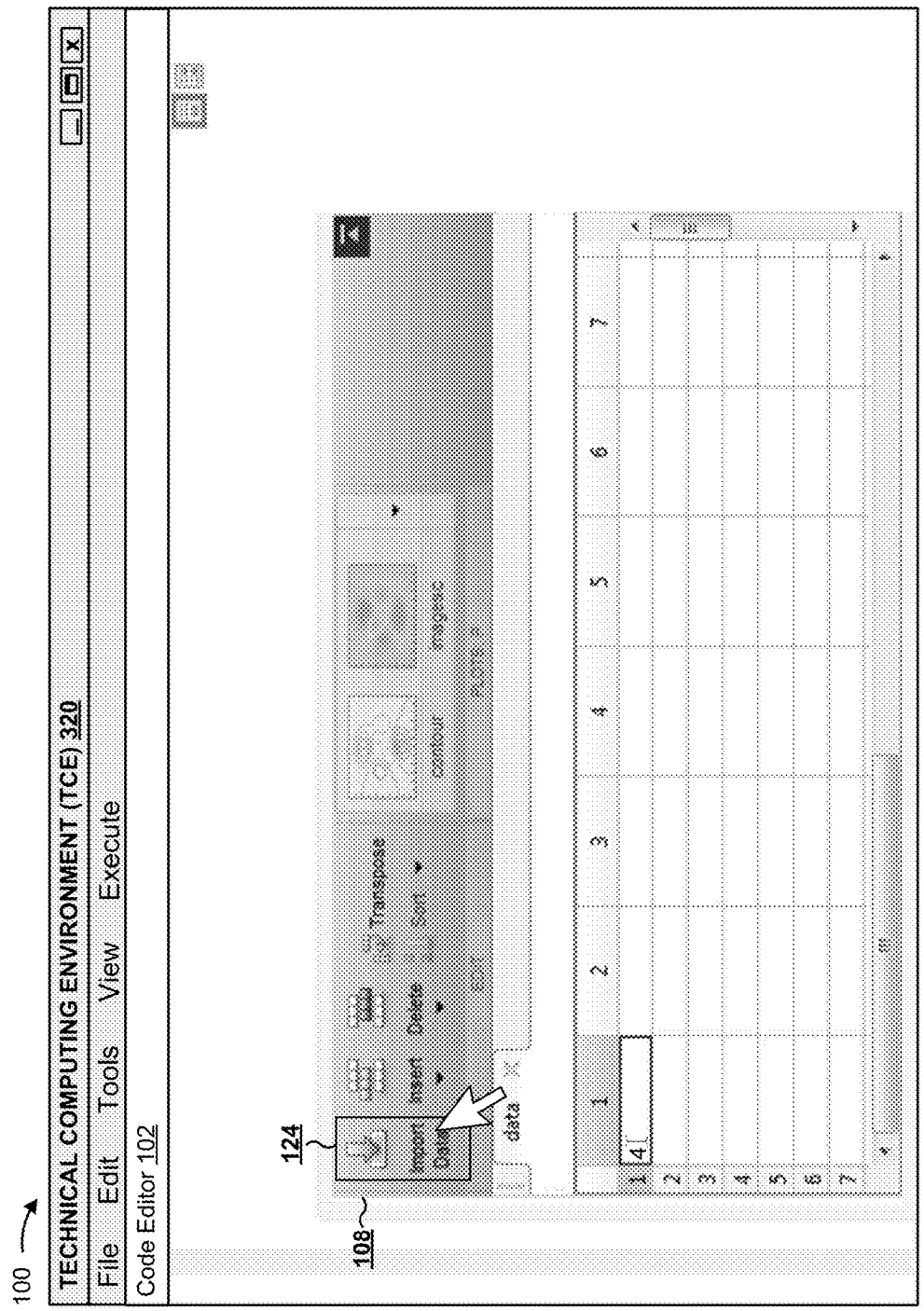

In some implementations, a UI element may receive data via import (e.g., rather than a user creating the data directly within the UI element). As shown in FIG. 1C, and by reference number 124, the user may select an "Import Data" button associated with (e.g., displayed by, displayed within, connected with, etc.) UI element 108, which may cause the systems and/or methods to import data into UI element 108. In some implementations, the systems and/or methods may import the data from a location different than program code displayed by, or displayed within, code editor 102 (e.g., a file different than the file that includes the program code). Importing of data is described in more detail with respect to FIG. 1D.

In some implementations, the user may select one or more other input mechanisms associated with UI element 108 (e.g., an input mechanism displayed by, displayed within, connected with, etc. UI element 108, an input mechanism that causes UI element 108 to perform an action, etc.). For example, the user may select an "Insert" button, which may cause the systems and/or methods to insert an empty row or an empty column at a specified location of the table and modify program code, such as program code displayed by, or displayed within, code editor 102 or program code generated by UI element 108, based on inserting the row or column. As another example, the user may select a "Delete" button, which may cause the systems and/or methods to delete a particular row or column from the table and modify program code based on deleting the row or column.

As another example, the user may select a "Transpose" button, which may cause the systems and/or methods to transpose data displayed within UI element 108 (e.g., display rows as columns, display columns as rows, or reflect a matrix of values over a main diagonal). As another example, the user may select a "Sort" button, which may cause the systems and/or methods to sort data displayed within UI element 108 (e.g., sort from highest value to lowest value, lowest value to highest value, based on alphabetical order, or based on reverse alphabetical order). As another example, the user may select one or more plot buttons, such as a "contour" button or an "imagesc" button, which may enable the user to generate a graphics object (e.g., a graphical representation, such as a contour plot or an image with scaled colors) of data displayed within UI element 108.

Figure 1D:
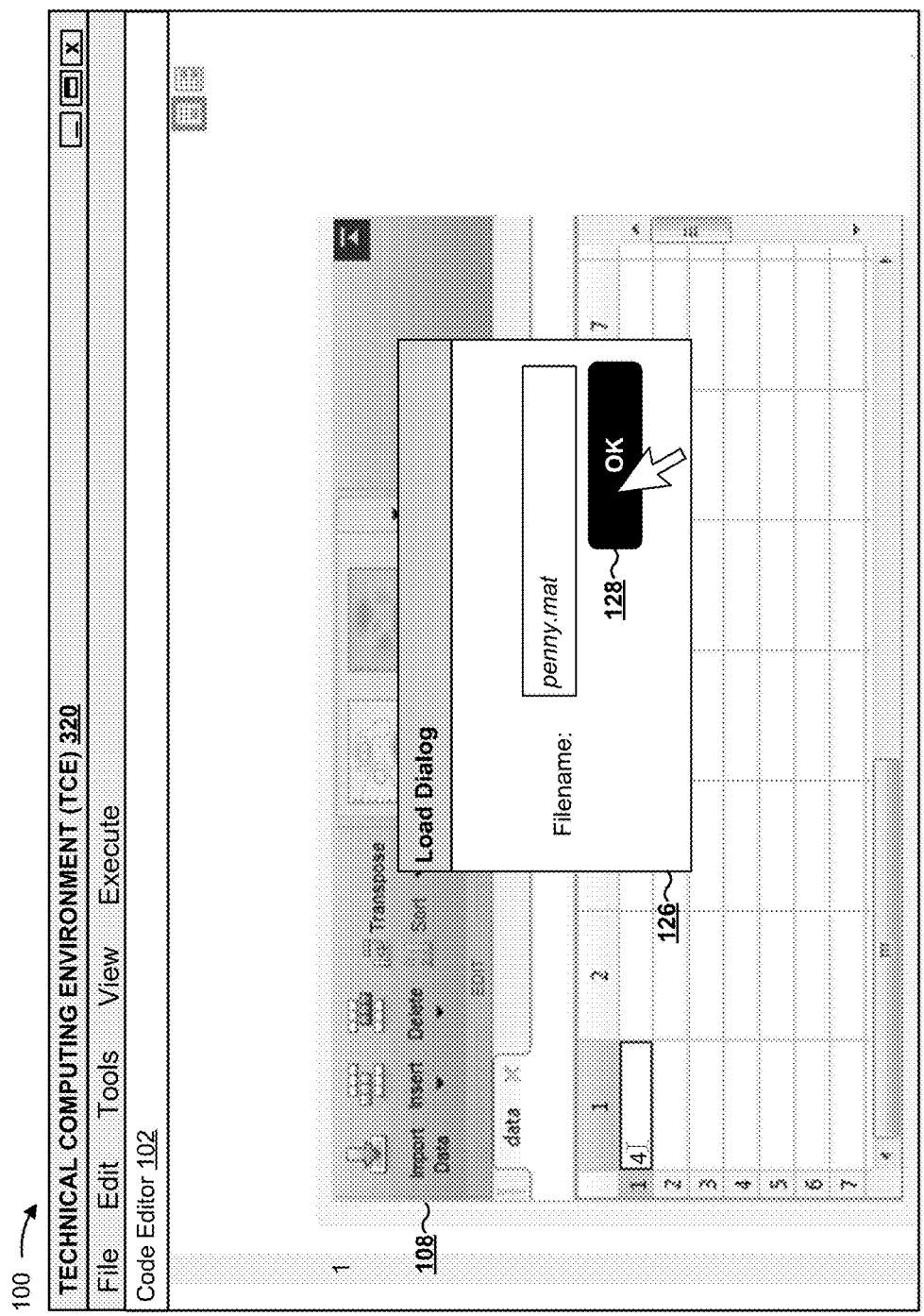

Returning to description of importing data, as shown in FIG. 1D, user selection of the "Import Data" button may cause the systems and/or methods to display dialog 126, such as a load dialog or an import dialog. In some implementations, dialog 126 may include a prompt that permits a user to specify a file to import into UI element 108 by file name. Additionally, or alternatively, dialog 126 may include a prompt that permits the user to select a specific file to import into UI element 108 by using a file selection dialog, a file browser, or a file manager. As shown, assume, for example, that the user specifies a file named penny.mat as the file to import into UI element 108. As shown by reference number 128, the user may initiate import of the file by selecting the "OK" button. In some implementations, the user may select multiple input mechanisms in combination. For example, the user may select the "Import Data" button and then select the "Transpose" button.

Figure 1E:
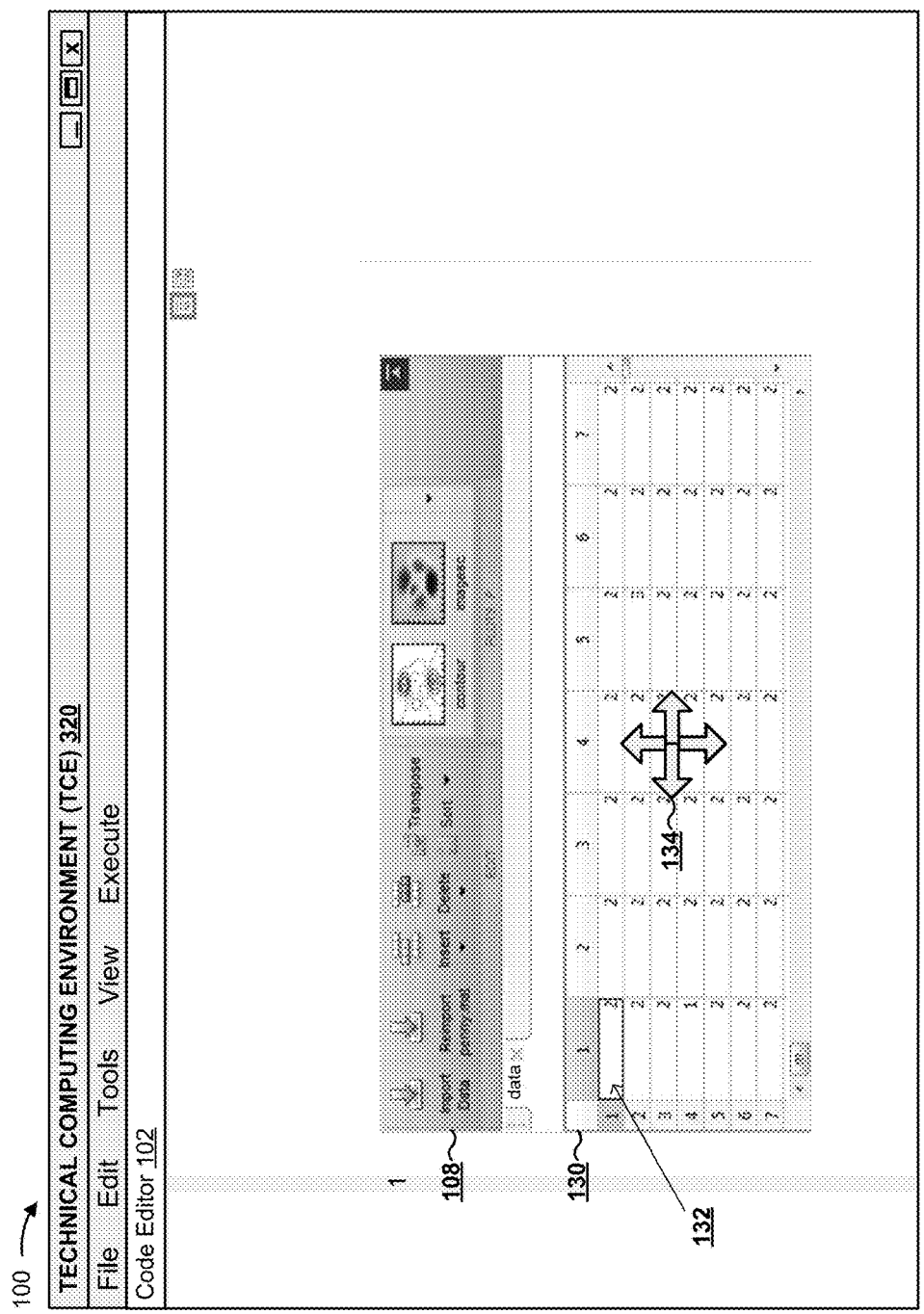

As shown in FIG. 1E, and by reference number 130, the systems and/or methods may import data included in the file penny.mat into the table included in UI element 108. When importing the file, the systems and/or methods may overwrite data previously input into the table. For example, as shown by reference number 132, the value of cell 1, 1 is no longer "4" as was input by the user, and has been modified to "2" based on importing data from the file penny.mat. In this way, the systems and/or methods may import data into UI element 108 from a location different than program code displayed by, or displayed within, code editor 102, and may provide the data for visualization and/or manipulation using a UI element or may provide the data for execution. In addition, the systems and/or methods may provide multiple UI elements for display via TCE 320. For example, the systems and/or methods may provide a first UI element for data input by a user (e.g., for the value "4" input by a user) and a second UI element for data imported into the UI element (e.g., for data included in penny.mat), thereby enabling preservation of data input, or imported, into the UI element.

In some implementations, when the systems and/or methods imports a file into UI element 108, the systems and/or methods may remove automatically generated program code that creates, modifies, etc. data previously input into the table associated with (e.g., displayed by or displayed within) UI element 108, such as when the systems and/or methods overwrites the data previously input into UI element 108. For example, as shown, TCE 102 has removed the line of program code data (1) (1)=4 based on importing file penny.mat. Additionally, or alternatively, the systems and/or methods may automatically generate program code to record the import of the data from penny.mat (rather than removing previously generated program code), thereby preserving previously recorded interactions with UI element 108. For example, the systems and/or methods may automatically generate program code, such as data=importdata(penny.mat) to record the import of the data from penny.mat.

In some implementations, a cell may correspond to a matrix element of a matrix. For example, cell 1, 1 may correspond to data (1, 1), where data is the matrix and (1, 1) is the matrix element for row 1, column 1 of data. In some implementations, the systems and/or methods may automatically adjust a quantity of cells shown based on the matrix. For example, the systems and/or methods may automatically adjust the quantity of cells shown so that the quantity of cells shown is equal the quantity of matrix elements in the matrix, is equal to a default quantity of cells, satisfies a threshold quantity of cells, etc.

In some implementations, when the systems and/or methods do not show all cells that correspond to the matrix (e.g., when the quantity of cells shown is less than the quantity of matrix elements of the matrix), a user may use scroll bars to view the cells that are not shown. Additionally, or alternatively, as shown by reference number 134, the user may move a cursor over the table to interact with the table. In some implementations, the cursor may change to indicate that the user may interact with the table (e.g., by changing size, color, type, etc.). For example, the cursor may change from a single arrow type cursor, as shown in FIGS. 1A-1D, to a four-arrow type cursor, as shown in FIG. 1E by reference number 134.

In some implementations, the user may click and drag to scroll through the data displayed in UI element 108 (e.g., scroll through rows or columns of data displayed in the table). Additionally, or alternatively, the user may select particular cells of the table (e.g., by clicking and dragging to highlight one or more cells). Additionally, or alternatively, the user may rearrange data displayed in UI element 108 by, for example, clicking and dragging the particular cell to a new location within UI element 108, thereby manipulating the data displayed in UI element 108. As the user interacts with UI element 108, the code generator may automatically generate program code to record the interactions, thereby enabling the systems and/or methods to record the interactions. For example, the code generator may automatically generate data (1) (1)=1 to record a user clicking and dragging the value displayed in cell 4, 1 (e.g., "1") to cell 1, 1.

In some implementations, user interactions with UI element 108 and/or data displayed by, or displayed within, UI element 108 may not affect the file from which the data is imported (e.g., may not affect the data included in penny.mat). For example, UI element 108 may import data into UI element 108 using program code data=importdata(penny.mat) and may record user interactions by generating program code that operates on the variable data, which stores the imported data, rather than operating on the file penny.mat.

In some implementations, the systems and/or methods may persist the data imported into UI element 108 such that a user may revert manipulated data to the data imported from the file (e.g., by undoing, reversing, or canceling user interactions with the data). In some implementations, the systems and/or methods may provide an input mechanism (e.g., an "Undo" button or a "Revert" button) that permits the user to revert the manipulated data. Additionally, or alternatively, the systems and/or methods may provide a manipulation log or version history of the data imported from the file. Based on the manipulation log or version history, the systems and/or methods may revert the manipulated data to a version a user desires, such as data at a previous point in time or a previous version of the data.

Figure 1F:
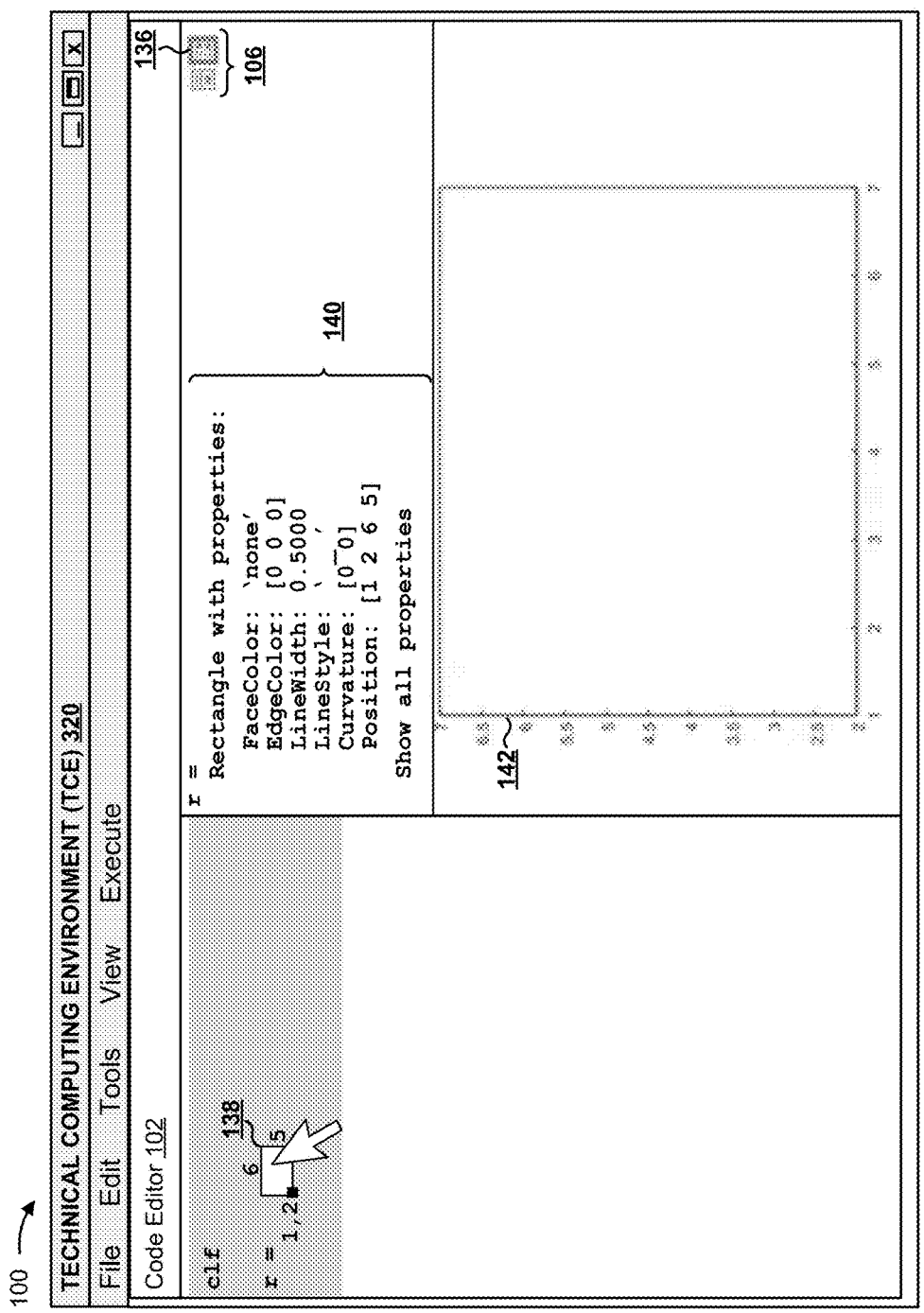
Figure 1G:
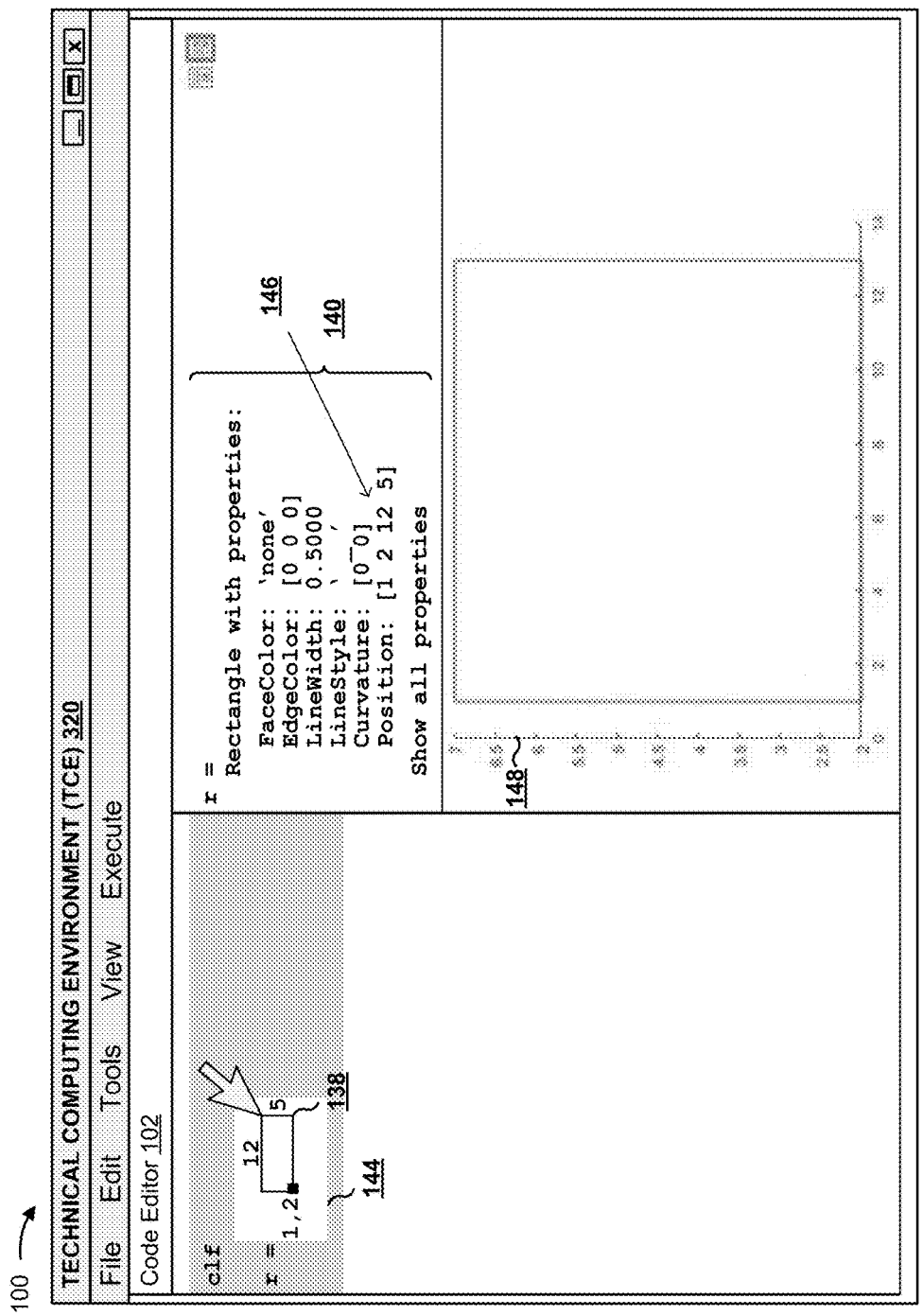
Figure 1H:
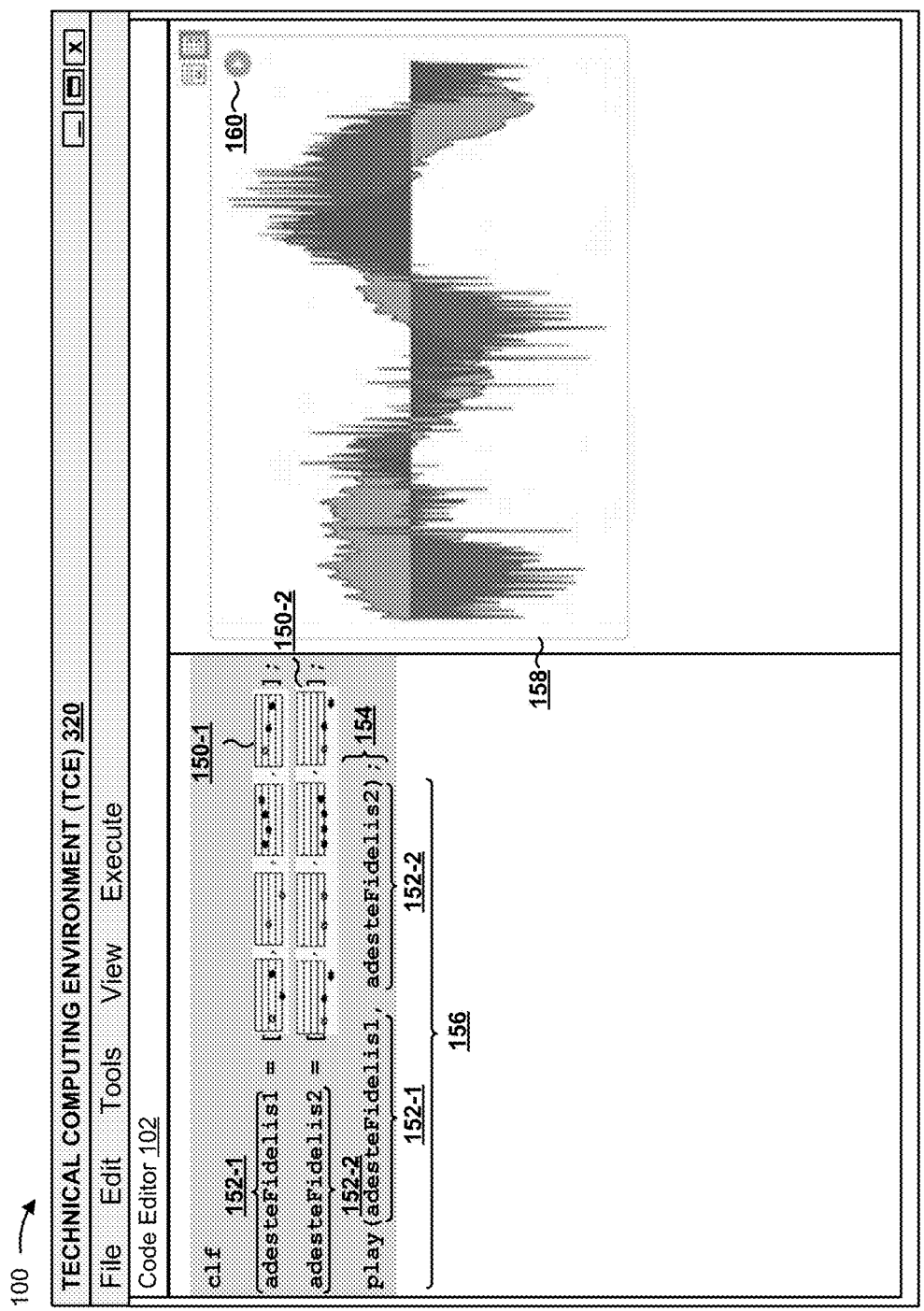

In some implementations, a UI element may be displayed in-line with program code. In some implementations, the program code in which the UI element is displayed may generate a graphics object when executed. FIGS. 1F-1H show examples of this type of UI element. Assume for FIGS. 1F-1H that the user has selected a side-by-side display of the data, the objects, and/or the program code, as indicated by darkened border 136 around the right positioned button identified by reference number 106. As shown in FIG. 1F, the systems and/or methods may display program code (e.g., program code that creates rectangle object 138).

As further shown, code editor 102 may display the program code 140 that creates rectangle object 138. As shown by reference number 142, the systems and/or methods may provide a graphics object to visualize an output of the program code. For example, TCE 320 may display a rectangle graphics object that has the same dimensions as rectangle object 138.

As shown in FIG. 1G, and by reference number 144, a user may interact with rectangle object 138 by interacting with a UI element that includes rectangle object 138 (e.g., the same rectangle object shown in FIG. 1F). For example, the user may interact with the UI element by clicking on the UI element and manipulating the dimensions of rectangle object 138. For example, manipulating the dimensions of rectangle object 138 may include clicking on a top-right corner of rectangle object 138 and dragging rectangle object 138 to increase the length of rectangle object 138 from six units to 12 units. As shown by reference number 146, the systems and/or methods may record the interaction by automatically manipulating, updating, or generating replacement code for program code 140 that corresponds to rectangle object 138. For example, compared to program code 140 of FIG. 1F that corresponds to rectangle object 138, program code 140 of FIG. 1G, also corresponding to rectangle object 138, has been modified. As shown by reference number 146, the systems and/or methods have updated a value of a "position" property of the rectangle from "6" to "12"). Additionally, or alternatively, the systems and/or methods may automatically generate additional program code to record the interaction (e.g., rather than manipulating, updating, or replacing the program code).

As shown by reference number 148, the systems and/or methods may update the rectangle graphics object based on the manipulations to rectangle object 138 by modifying the dimensions of the rectangle graphics object displayed by the UI element. For example, as shown by reference number 148, the systems and/or methods may update a dimension of the rectangle graphics object from 6 units (as shown by program code 140 in FIG. 1F) to 12 units (as shown by reference number 146 in FIG. 1G).

In another implementation, a UI element may be displayed in-line with program code (e.g., program code in code editor 102). In some implementations, the UI element may permit a user to visualize and/or manipulate values of arguments of a function.

As shown in FIG. 1H, the systems and/or methods may provide UI elements 150-1 and 150-2 that include a visualization of a portion of program code (e.g., program code in code editor 102). For example, UI elements 150-1 and 150-2 may provide a visualization of a portion of program code that generates values for audio objects 152-1 and 152-2, which are used to produce audio signals (e.g., where adesteFidelis1 is audio object 152-1 and adesteFidelis2 is audio object 152-2). As shown by reference number 154, code editor 102 may display program code, such as function 156 (e.g., play(adesteFidelis1, adesteFidelis2)), where audio objects 152-1 (e.g., adesteFidelis1) and 152-2 (e.g., adesteFidelis2) are arguments of function 156. In some implementations, execution of the program code play(adesteFidelis1, adesteFidelis2); may produce audio signals. As shown by reference number 158, TCE 320 may display a graphics object, such as a plot of audio frequencies of the audio signals produced via execution of function 156. As shown by reference number 160, the graphics object may include an input mechanism, such as a button, to control execution of function 156. For example, the graphics object may include a play button to execute the program code play(adesteFidelis1, adesteFidelis2); to play audio signals.

In this way, a systems and/or methods may provide data, objects, and/or program code from a program file for visualization, manipulation, and/or execution using a UI element within a code editor. Additionally, the systems and/or methods may enable the user to import data or objects into the code editor from a location different than the code editor. Further, the systems and/or methods may generate program code based on user interactions with the UI element, thereby persisting the user interactions without additional program code from the user.

As indicated above, FIGS. 1A-1H are provided merely as examples of UI elements in a TCE. Other examples are possible and may differ from what was described with regard to FIGS. 1A-1H.

Figure 2A:
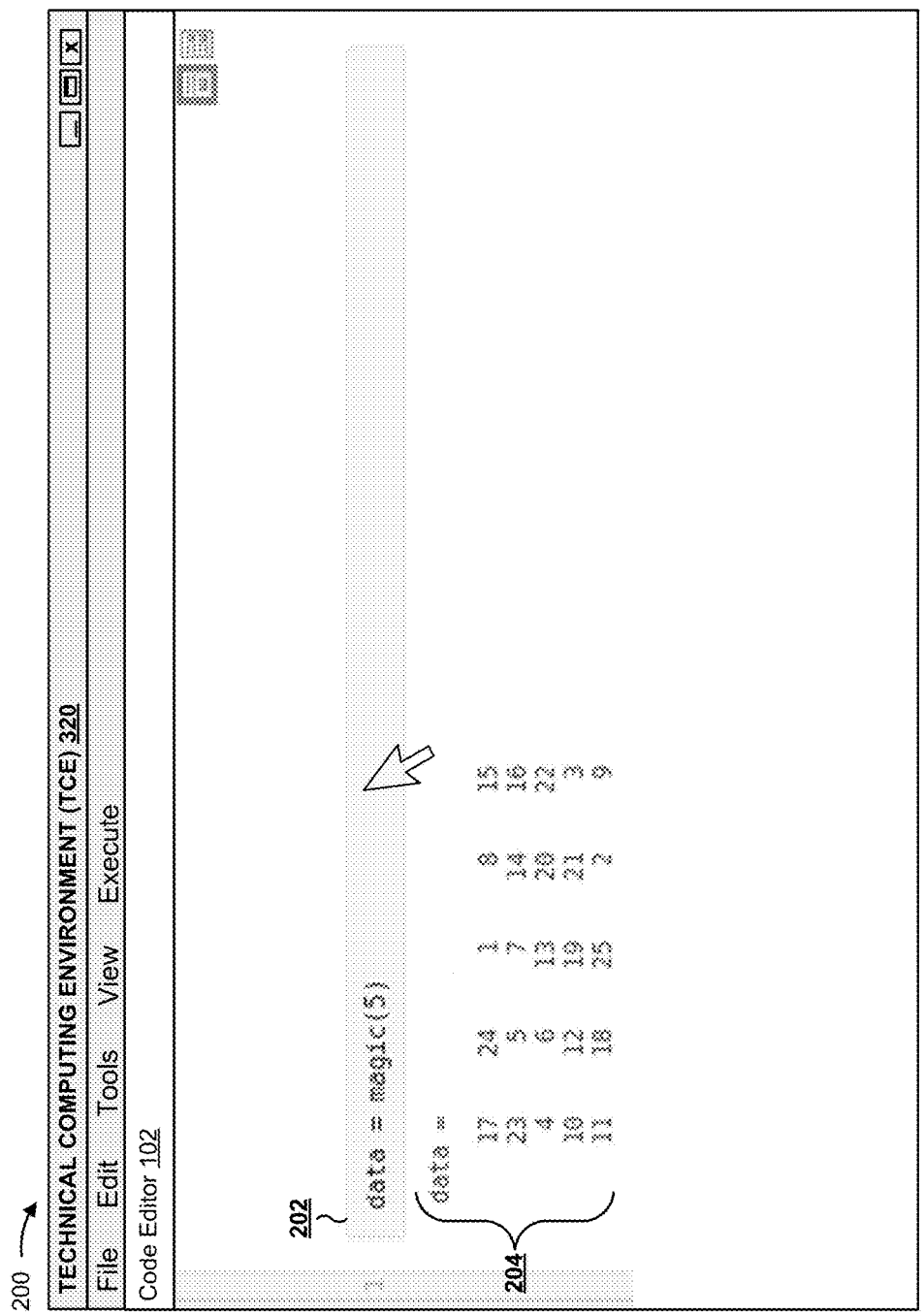
FIGS. 2A-2S and FIGS. 2V-1 to 2V-3, 2W-1 and 2W-2, and 2X-1 and 2X-2 are diagrams of an overview of example implementations described herein.

In another implementation, a UI element may enable a user to visualize and/or manipulate output of program code (e.g., data generated by program code). For example, the UI element may enable a user to visualize and/or manipulate output of program code handwritten by a user of TCE 320. FIGS. 2A-2S and FIGS. 2V-1 to 2V-3, 2W-1 and 2W-2, and 2X-1 and 2X-2 are diagrams of an overview of an example implementation 200 described herein. In the examples shown in FIGS. 2A-2S and FIGS. 2V-1 to 2V-3, 2W-1 and 2W-2, and 2X-1 and 2X-2, the programming environment is a TCE 320, similar to what was described with respect to FIGS. 1A-1H. As shown in FIG. 2A, code editor 102 may display UI element 202. In some implementations, UI element 202 may display program code (e.g., data=magic(5)). In some implementations, a user may handwrite the program code, which may trigger insertion of UI element 202 into TCE 320 or may trigger display of a menu item that permits a user to insert UI element 202. Additionally, or alternatively, the user may select a menu option that causes TCE 320 to insert UI element 202 into code editor 102. Additionally, or alternatively, code editor 102 may display UI element 202 based on the systems and/or methods executing program code (e.g., handwritten program code) that generates data based on execution of the program code (e.g., data that is stored external to UI element 202 after being generated), thereby enabling the user to visualize output of program code. In some implementations, UI element 202, as shown in FIG. 2A, may be collapsed (e.g., rather than expanded, as shown in FIG. 2B).

As shown by reference number 204, the program code may cause code editor 102 to display data generated by the program code displayed by UI element 202 (e.g., data=magic(5)). For example, the program code may generate values for a 5×5 magic square (e.g., a 5×5 matrix constructed using the integers 1 through $5^2$, where every row and column of the matrix have equal sums). In some implementations, the user may interact with UI element 202. For example, the user may click on UI element 202 to expand UI element 202.

In some implementations, program code (e.g., handwritten program code) within code editor 102 may generate data external to UI element 202. In some implementations, the systems and/or methods may import the external data into UI element 202. In this case, the data imported into UI element 202 may replace the program code in code editor 102 with the imported data.

Figure 2B:
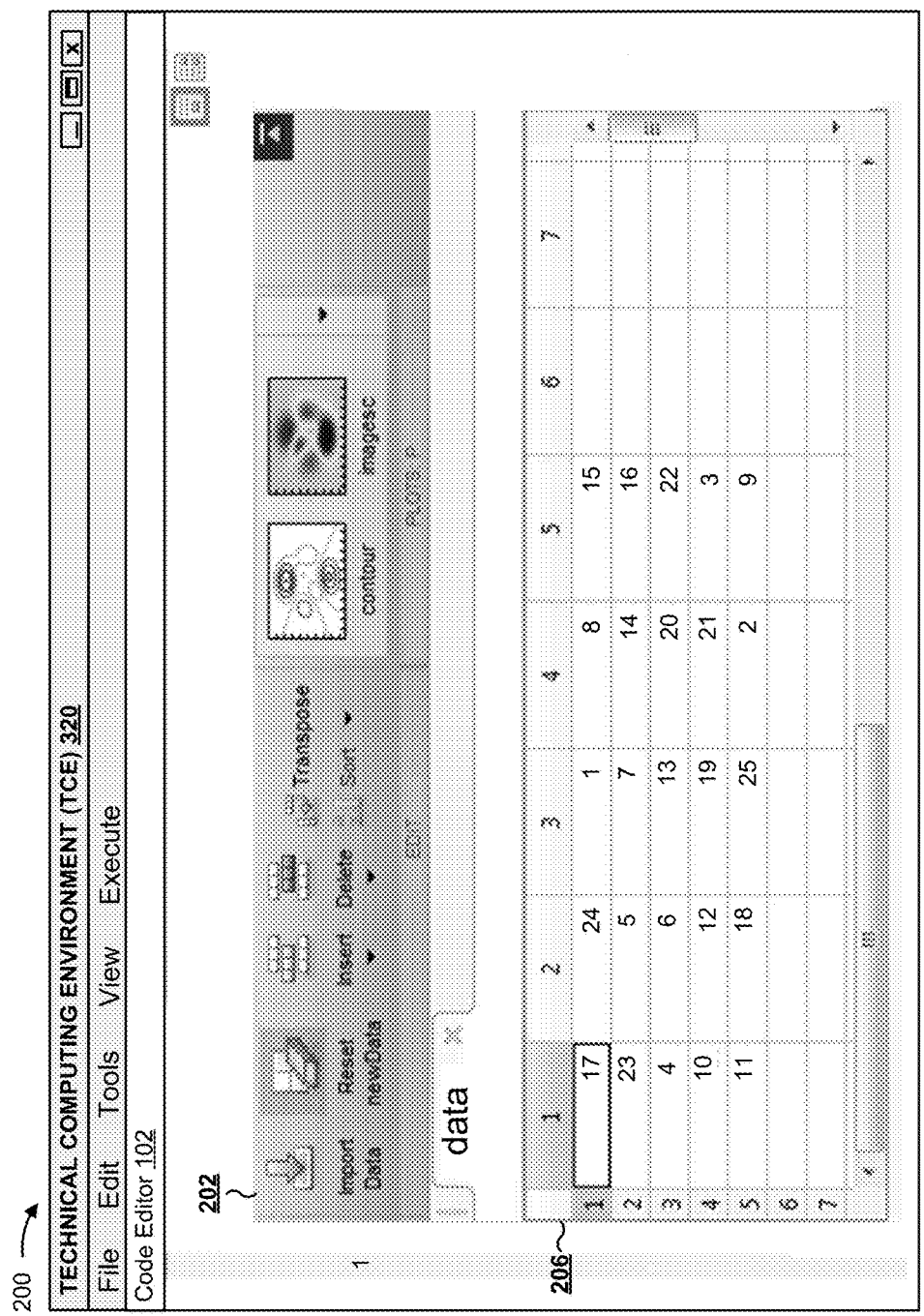
FIGS. 2T and 2U are schematic diagrams of example code generators.

As shown in FIG. 2B, UI element 202 may expand based on the user interacting with UI element 202. In some implementations, when UI element 202 expands, UI element 202 may display and/or import the output of the program code displayed by UI element 202. For example, as shown by reference number 206, UI element 202 may display a table with the values for the 5×5 magic square, generated by the program code data=magic(5). In this way, systems and/or methods may use a UI element to display the output of program code (e.g., data generated programmatically).

Figure 2C:
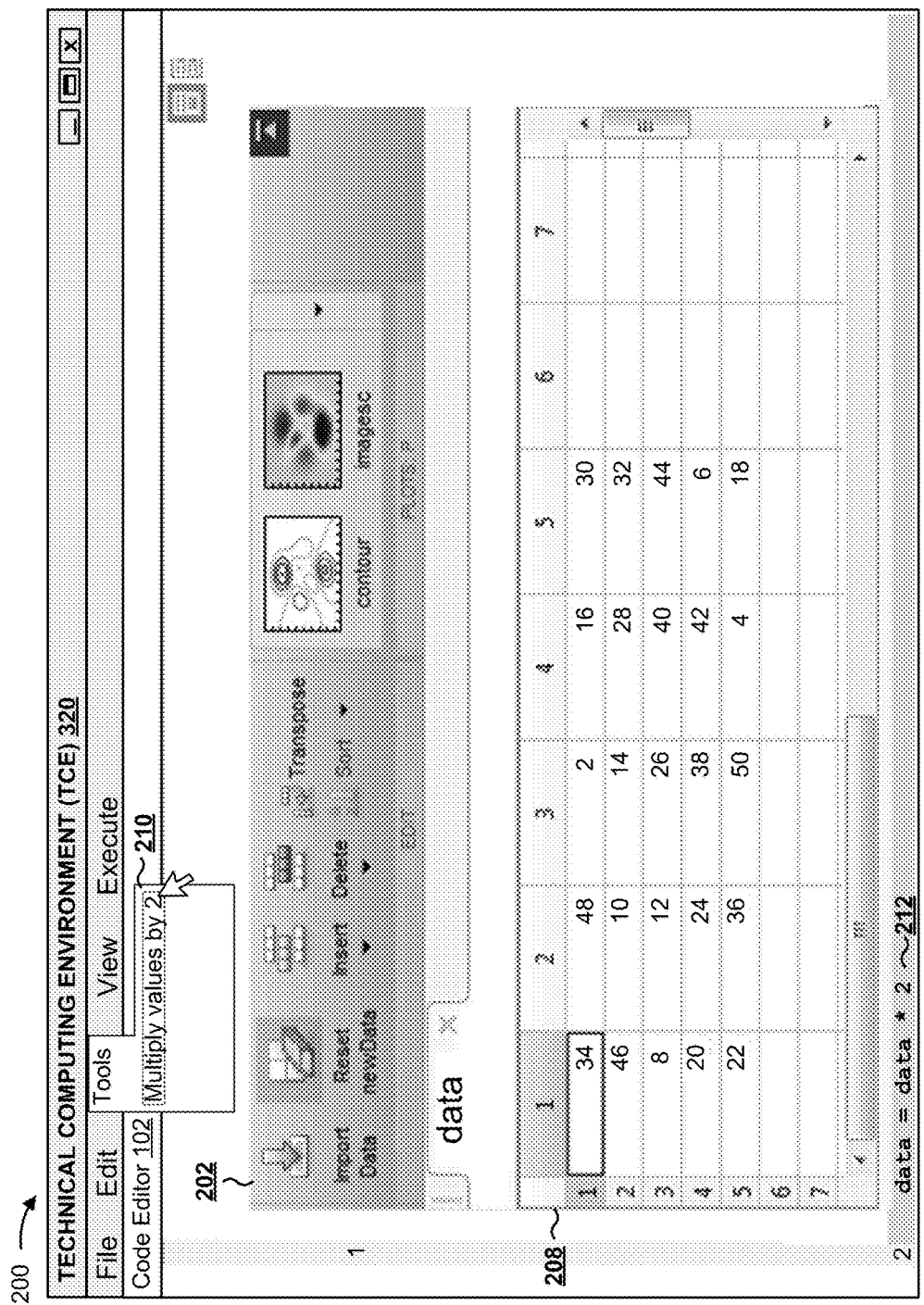

As shown in FIG. 2C, and by reference number 208, a user may interact with UI element 202 to multiply each value of the table by two (e.g., by selecting a button, selecting a menu item, or inputting a function into the table). For example, as shown by reference number 210, a user may select a "Multiply values by 2" menu item to multiply each value of the table by two. As shown by reference number 212, the systems and/or methods may automatically generate program code (e.g., data=data*2) based on the user interaction with UI element 202. For example, the automatically generated code may record the user interaction that multiplied the values of the table by two.

Additionally, or alternatively, the user may handwrite program code in code editor 102, which may cause the systems and/or methods to manipulate the values displayed in the table. For example, the user may handwrite data=data*2 in the code editor, and the systems and/or methods may automatically update the values of the table by multiplying the values by two. In this way, systems and/or methods may enable a user to visualize and/or manipulate output of program code and may record interactions with the output by automatically generating program code.

Figure 2D:
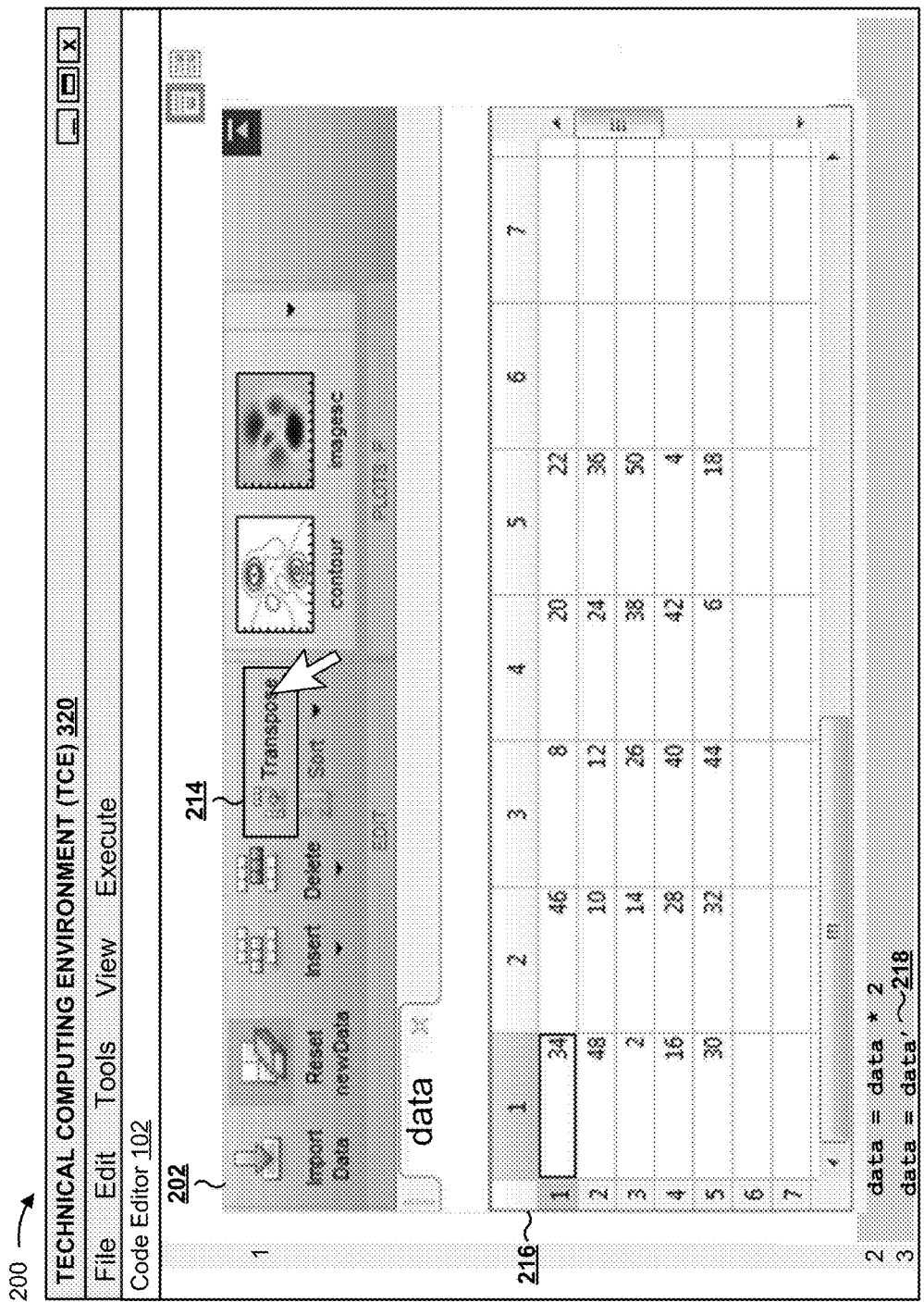

As shown in FIG. 2D, and by reference number 214, the user may interact with UI element 202. For example, the user may interact with UI element 202 by selecting a "Transpose" button, which may cause the systems and/or methods to transpose the values displayed in the table (e.g., by transposing rows to columns, which may be represented by the equation data (i)(j)=data (j)(i)). As shown by reference number 216, UI element 202 may display transposed values of the table. As shown by reference number 218, the systems and/or methods may automatically generate program code to record the transposition (e.g., data=data', where the ' operator transposes the values of data).

In some implementations, the user may perform one or more other interactions with UI element 202. For example, the user may select one or more other buttons, such as an "Import" button, a "Reset" button, an "Insert" button, a "Delete" button, or a "Sort" button. As another example, the user may interact with the data displayed by UI element 202 (e.g., by inputting, deleting, changing, rearranging, etc. the data).

Figure 2E:
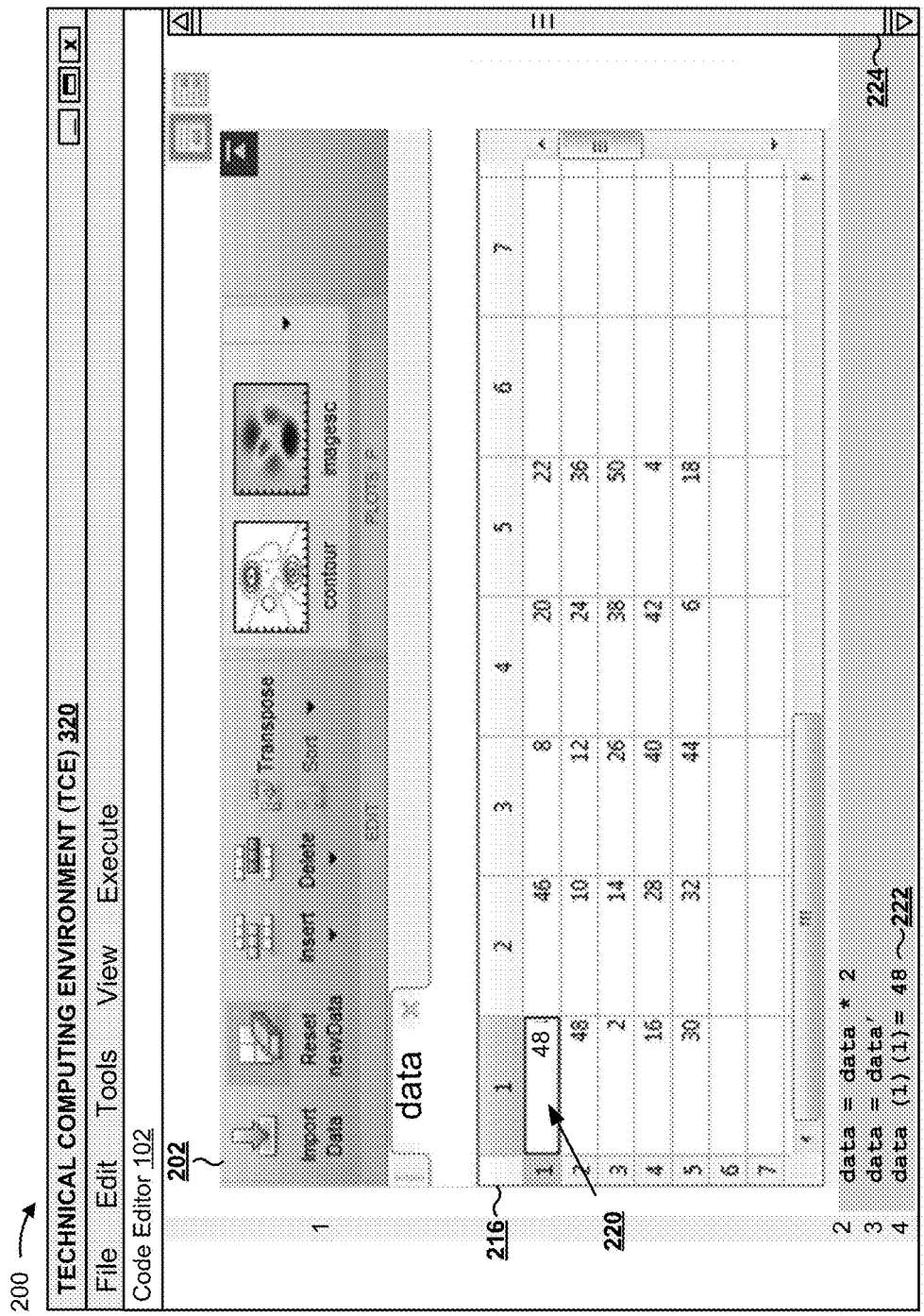

A user may interact with UI element 202 by manually manipulating one or more values displayed in the table. For example, in the example shown in FIG. 2E, and by reference number 220, the user may change the value displayed in cell (1, 1) from 34 to 48. As shown by reference number 222, the systems and/or methods may automatically generate program code (e.g., data (1) (1)=48) to persist the manual manipulation of the value of cell (1, 1) from 34 to 48, where data (1) (1) refers to cell 1, 1 and =48 sets the value of cell 1, 1 to 48. As shown by reference number 224, code editor 102 may include a scroll bar that permits the user to scroll through code editor 102 to view UI elements and/or program code.

Figure 2F:
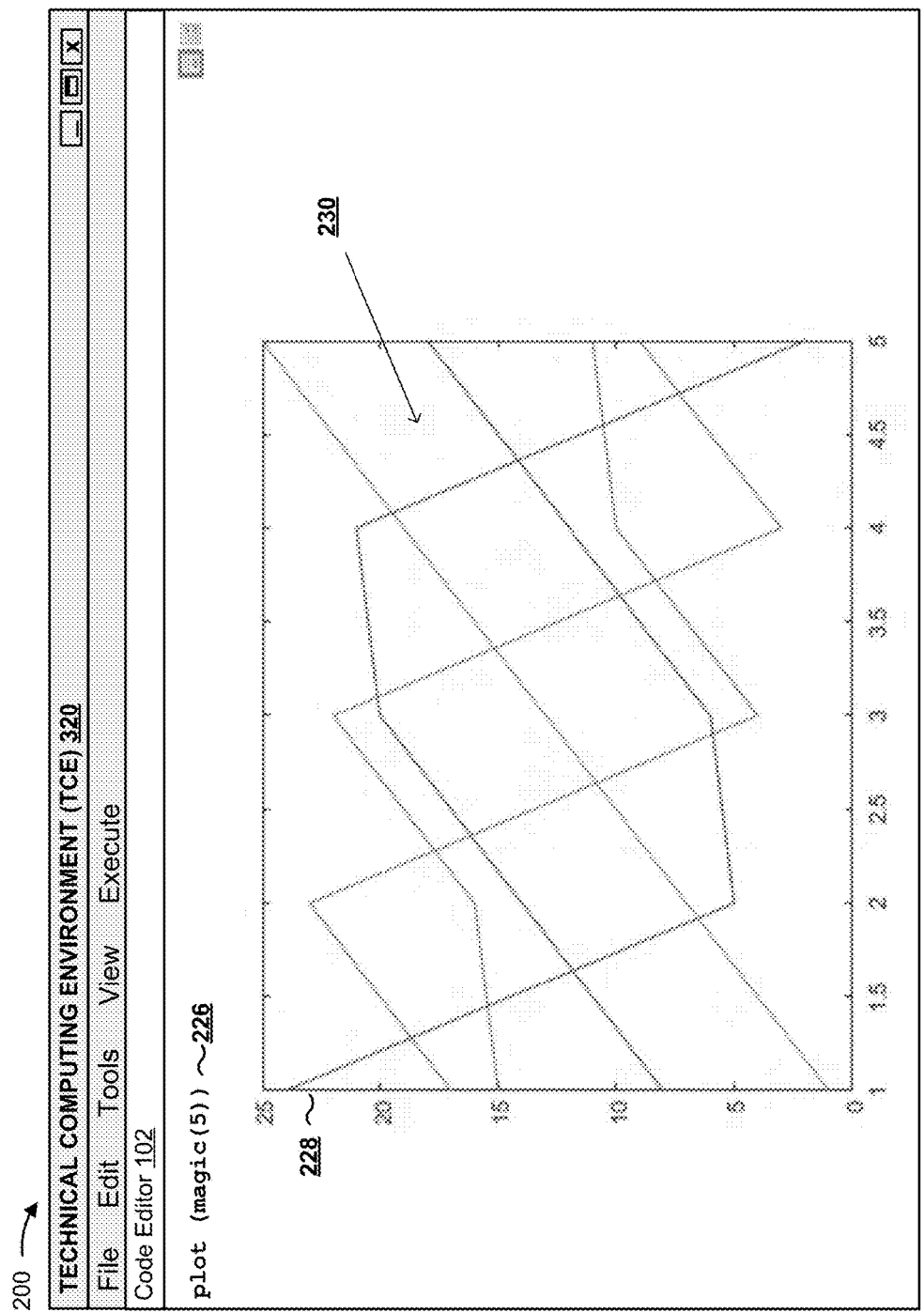

Code editor 102 may display program code and output of the program code using a UI element. In some implementations, a user may interact with the UI element to modify the output of the program code and the systems and/or methods may generate program code based on the user interaction. As shown in FIG. 2F, code editor 102 may display program code 226 (e.g., plot (magic(5))). In some implementations, the program code may be handwritten by a user. As further shown in FIG. 2F, the systems and/or methods may provide UI element 228. In some implementations, UI element 228 may display output of the program code (e.g., based on execution of program code 226, in response to receipt of program code 226, etc.). For example, as shown by reference number 230, UI element 228 may include a graphics object that displays data generated by the function plot (magic(5)).

Figure 2G:
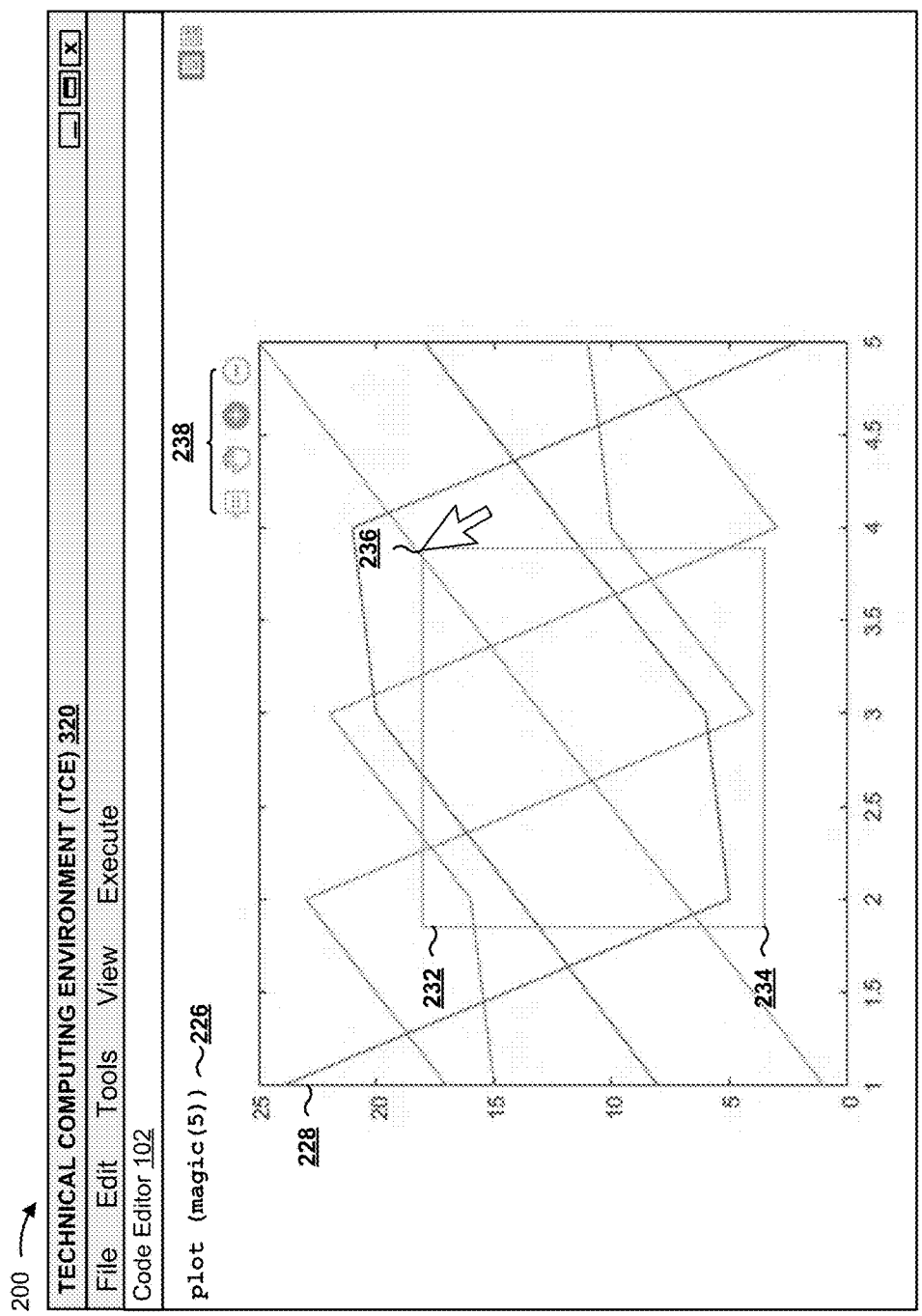

As shown in FIG. 2G, a user may interact with UI element 228 by selecting an area 232 of the plot displayed by UI element 228 (e.g., to zoom in on area 232). For example, the user may select area 232 by clicking at point 234 and dragging to point 236. Additionally, or alternatively, as shown by reference number 238, the user may use one or more input mechanisms to interact with UI element 228. For example, the input mechanisms may include one or more buttons that enable the user to scroll through the plot, zoom in on a portion of the plot, or zoom out from a portion of the plot.

Figure 2H:
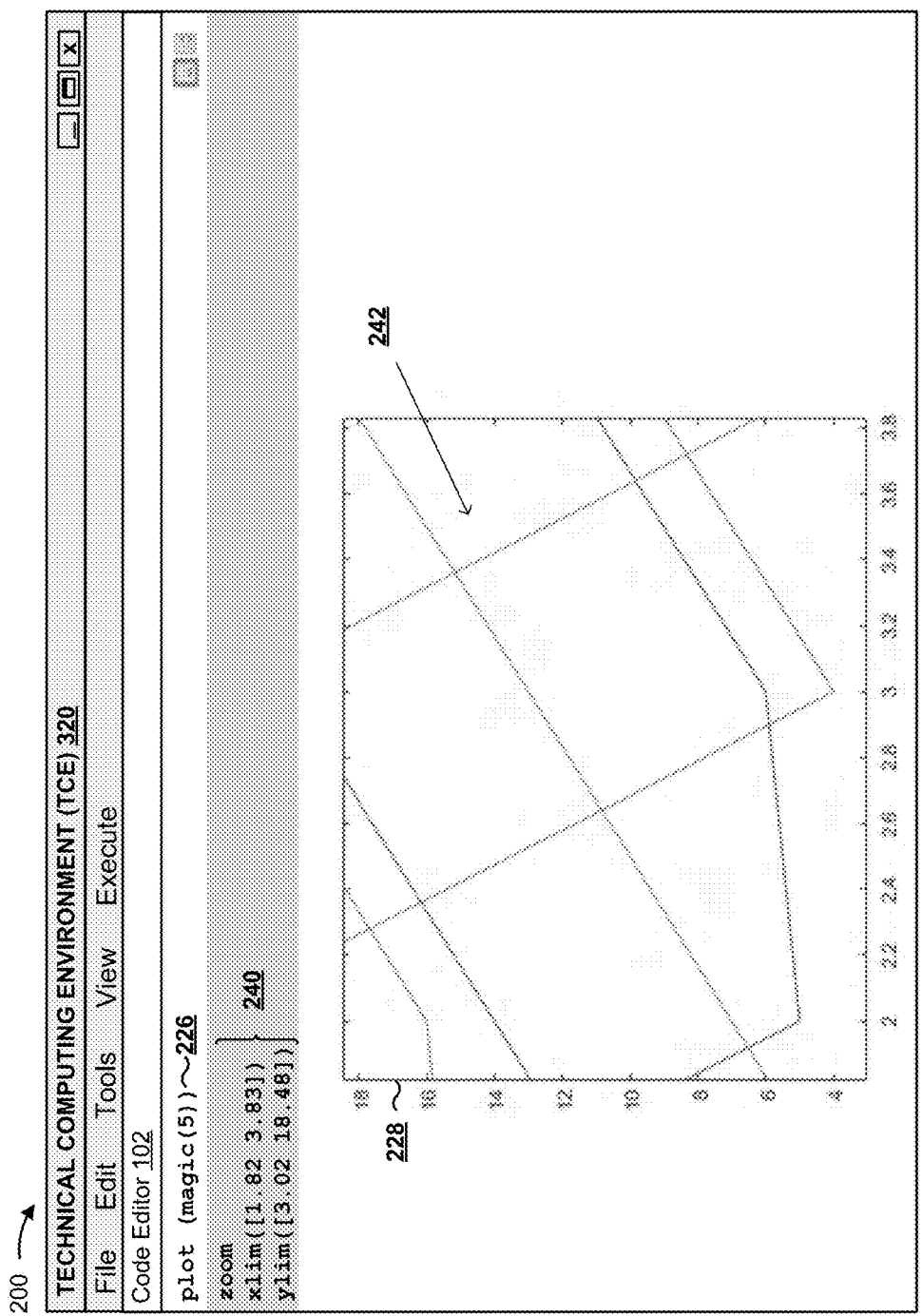

As shown in FIG. 2H, and by reference number 240, the systems and/or methods may automatically generate program code (e.g., zoom xlim([1.82 3.83]) ylim([3.02 18.48])) based on the user interaction with UI element 228. For example, the automatically generated code may record the user interaction that zoomed in on area 232. In some implementations, the automatically generated code may record a first value and a second value on a first axis for area 232 (e.g., xlim([1.82 3.83]), where 1.82 is the first value on the first axis and 3.83 is the second value on the first axis). In some implementations, the automatically generated program code may record a first value and a second value on a second axis for area 232 (e.g., ylim([3.02 18.48]), where 3.02 is the first value on the first axis and 18.48 is the second value on the second axis). As further shown in FIG. 2H, and by reference number 242, UI element 228 may include a graphics object that displays area 232 (e.g., a zoomed in area of the plot displayed by UI element 228 in FIGS. 2F and 2G). In some implementations, the user may interact with an input mechanism to toggle code editor 102 between an in-line display and a side-by-side display, similar to what was described above with regard to FIG. 1F.

In some implementations, a user may interact with output of program code (e.g., handwritten program code). For example, the user may interact with a UI element in TCE 320 that displays the output of the program code. In some implementations, the systems and/or methods may generate program code to record a result of the user interaction. In some implementations, the systems and/or methods may automatically insert the generated program code into previously existing program code (e.g., the handwritten code). Additionally, or alternatively, the systems and/or methods may permit a user to insert the generated program code into previously existing program code manually (e.g., by permitting the user to copy and paste the generated program code into the handwritten code).

Figure 2I:
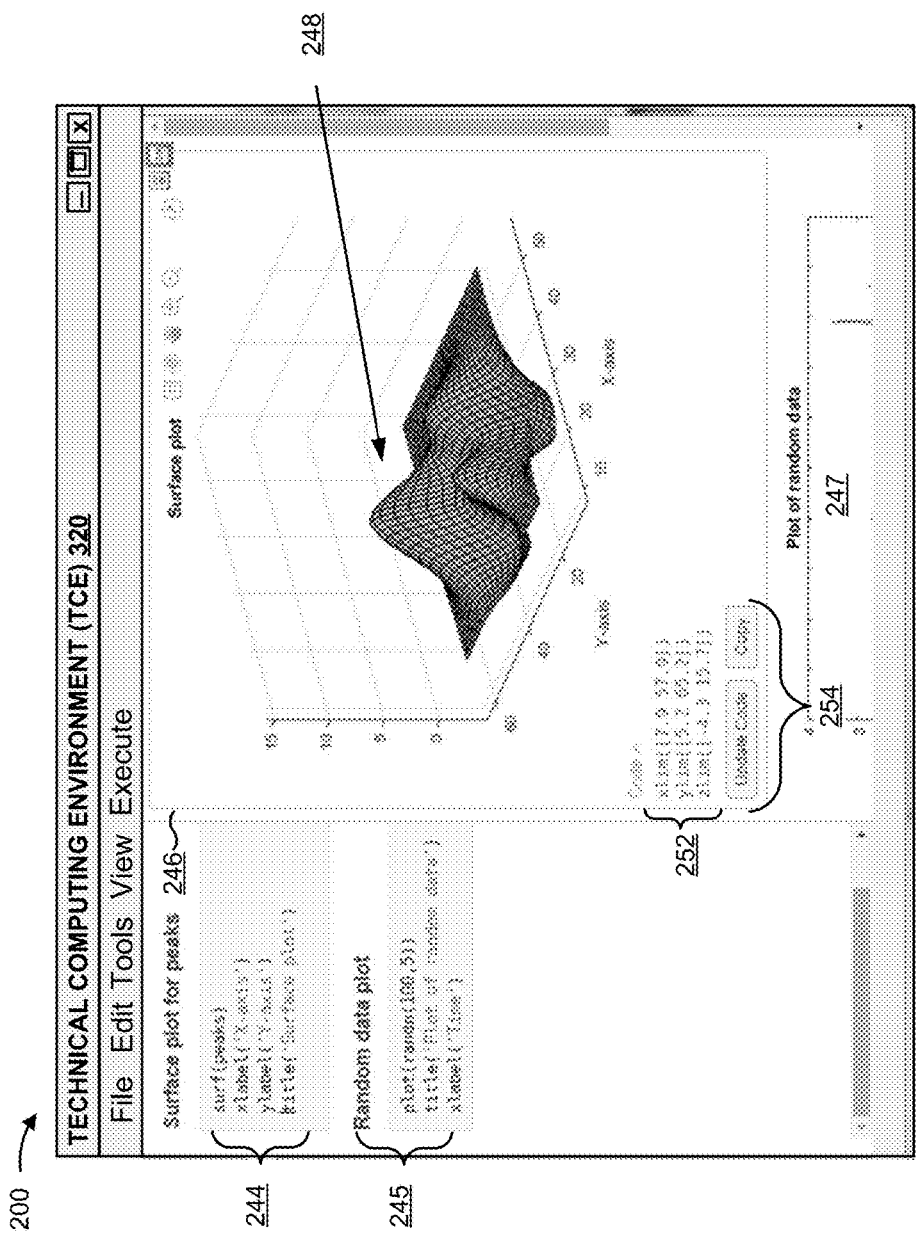

As shown in FIG. 2I, the systems and/or methods may display program code 244 (e.g., handwritten program code). In some implementations, program code 244 may produce an output (e.g., when executed). For example, program code 244 may create a surface plot of data when program code 244 is executed. As further shown, TCE 320 may display UI element 246. In some implementations, UI element 246 may display output of program code 244. For example, UI element 246 may display a graphics object (e.g., a figure, such as a surface plot) that includes a graphical representation of data generated by program code 244. As shown, a user may interact with the graphics object, such as a FIG. 248. For example, the user may pan the graphics object, zoom in on or zoom out from a portion of the graphics object, rotate the graphics object, add and/or modify a title of the graphics object, add and/or modify an axis label of the graphics object, change a line thickness, move a legend to a new location, resize an axis, etc.

As further shown in FIG. 2I, the systems and/or methods may generate program code 252 based on the user interaction. For example, the systems and/or methods may generate xlim([7.9 57.9]) ylim([5.2 65.2]) zlim([−4.3 15.7]), based on the effects of panning on limits of an x-axis, a y-axis, and a z-axis. As further shown, TCE 320 may display program code 252. In some implementations, TCE 320 may display program code 252 prior to the systems and/or methods using the generated program code (e.g., to modify program code 244, as described below). Providing the generated program code prior to using the generated program code can allow the user to view the generated program code prior to the systems and/or methods using the generated program code, thereby increasing user control over modifications to the existing program code.

In some implementations, the user may perform multiple interactions with the graphics object. For example, the user may perform one or more pans, one or more zooms, and/or one or more rotates in sequence. In some implementations, when the user performs multiple interactions, the systems and/or methods may generate program code that, when executed, produces a result of the multiple interactions (e.g., a final result of the multiple interactions or a combined effect of the multiple interactions, rather than recording each of the multiple interactions). For example, if a user were to interact with UI element 246 by rotating the graphics object by 30 degrees to the right, from an initial position, about a vertical axis and then by rotating the graphics object by 20 degrees to the left about the vertical axis, the systems and/or methods may generate program code that records a 10 degree rotation to the right, from the initial position, about the vertical axis (e.g., because the 30 degree rotation to the right plus the 20 degree rotation to the left results in the same rotation as a 10 degree rotation to the right from the initial position).

In some implementations, when the user performs multiple interactions, program code may be generated in multiple ways. In some implementations, when the user performs multiple interactions, the systems and/or methods may generate program code based on a result of the multiple interactions (e.g., rather than generating program code for each of the multiple interactions). For example, the systems and/or methods may compare values of data or graphics objects properties prior to a user interaction and the values of the data or the graphics objects properties after the user interaction and may generate program code to record the change. In some implementations, the systems and/or methods may optimize the generated program code simultaneously with generating the program code. For example, the systems and/or methods may regenerate the program code after each interaction to record the result of the multiple interactions. Additionally, or alternatively, the systems and/or methods may generate, and optimize, the program code after the user has finished interacting with a UI element (e.g., by waiting for a threshold amount of time to be satisfied, after a user interaction, before generating the program code to record the result of the interactions).

Additionally, or alternatively, when the user performs multiple interactions, the systems and/or methods may generate multiple program code based on each of the multiple interactions (e.g., rather than generating program code based on the result of the multiple interactions). For example, the systems and/or methods may generate first program code based on a pan manipulation, second program code based on a zoom manipulation, etc. In some implementations, the systems and/or methods may generate the program code when a threshold has been satisfied. For example, the systems and/or methods may generate the program code when a threshold amount of time without an interaction has been satisfied or after a threshold quantity of interactions. In some implementations, the systems and/or methods may optimize the program code generated in a manner similar to that described above.

In some implementations, the systems and/or methods may simplify the program code generated by, for example, minimizing the number of lines of program code needed to reproduce the interaction. For example, if the user pans a graphics object, about a vertical axis, 30 degrees to the right from an initial position and then pans the graphics object 20 degrees to the left, the systems and/or methods may generate a single line of program code that records a 10 degree pan to the right from the initial position (e.g., rather than generating two lines of program code, one for the 30 degree pan to the right and another for the 20 degree pan to the left).

In the example shown in FIG. 2I, the TCE 320 generates and displays a surface plot 248 from executing the program code portion 244. Another program portion 245 is executed to generate a plot 247 (not fully shown in FIG. 2I). The program code portions 244, 245 and the plots 248, 247 are displayed within a same window, although other display methods can be used. The surface plot 248 is displayed in a configuration that includes a title having a value "Surface plot," axes labels having values "Y-axis" and "X-axis," and displayed coordination ranges along the three axes X, Y, and Z. The surface plot 248 is displayed in a UI element 246 and can be manipulated through user interactions with the UI element. For example, a user can change the title of the plot by deleting "Surface plot" and replace it with a desired new title, or a user can rotate the view of the plot by placing the mouse on the plot and dragging the plot in a rotating motion. A user can also pan the plot 248, zoom in on or zoom out from a portion of the plot 248, add and/or modify an axis label of the plot 248, and/or take other actions, some of which are described above. The TCE 320 may receive an indication that the FIG. 248 has been modified as a result of one or more manipulations. The modification to the figure changes the configuration of the figure that has been presented.

The TCE 320 may generate code 252 that represents one or more modifications to the FIG. 248 (e.g., based on the one or more manipulations). In some implementations, the TCE 320 may generate the code 252 that can minimize or reduce an amount of generated code (e.g., a number of lines of code) as compared to generating all of the code needed to reproduce the FIG. 248 in its final configuration from scratch.

Figure 2J:
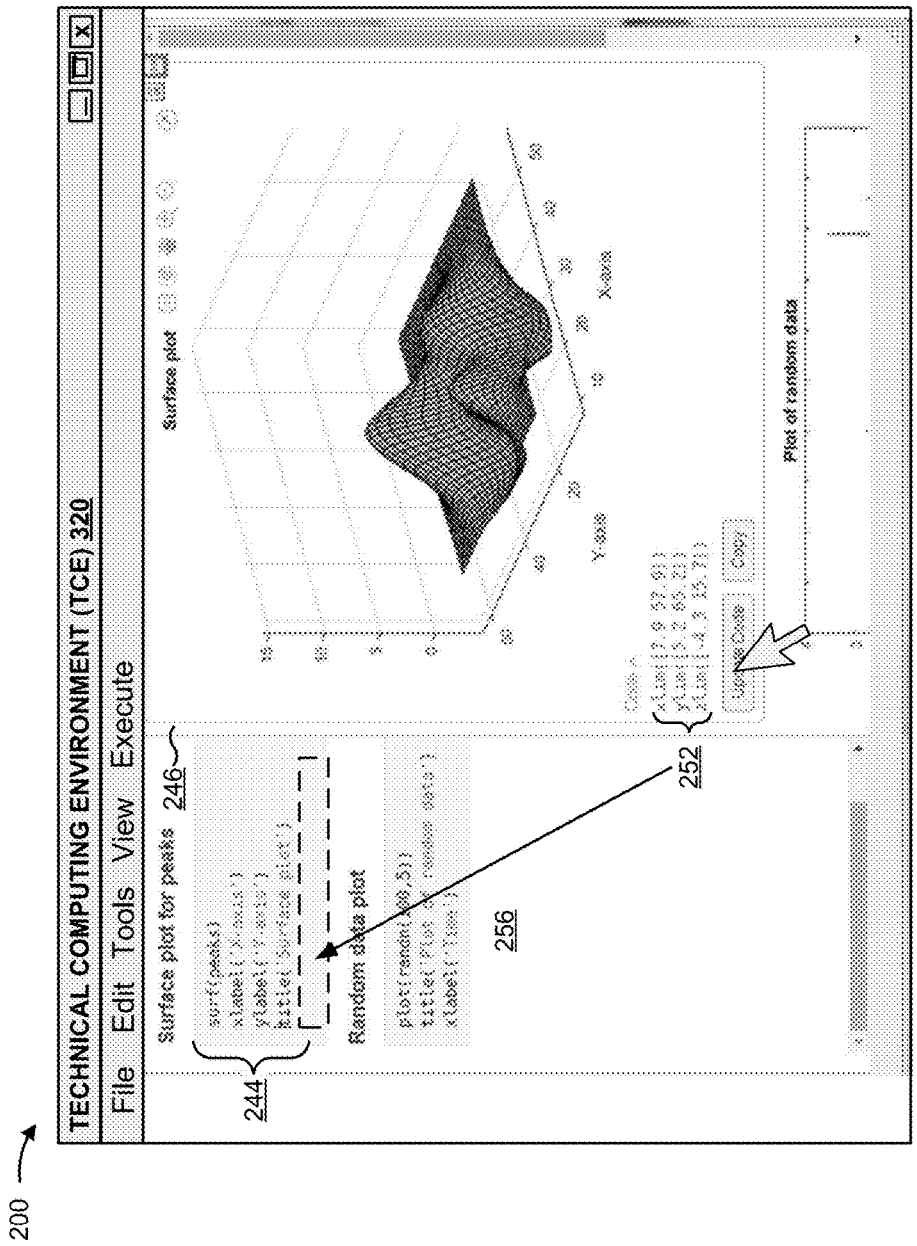
Figure 2K:
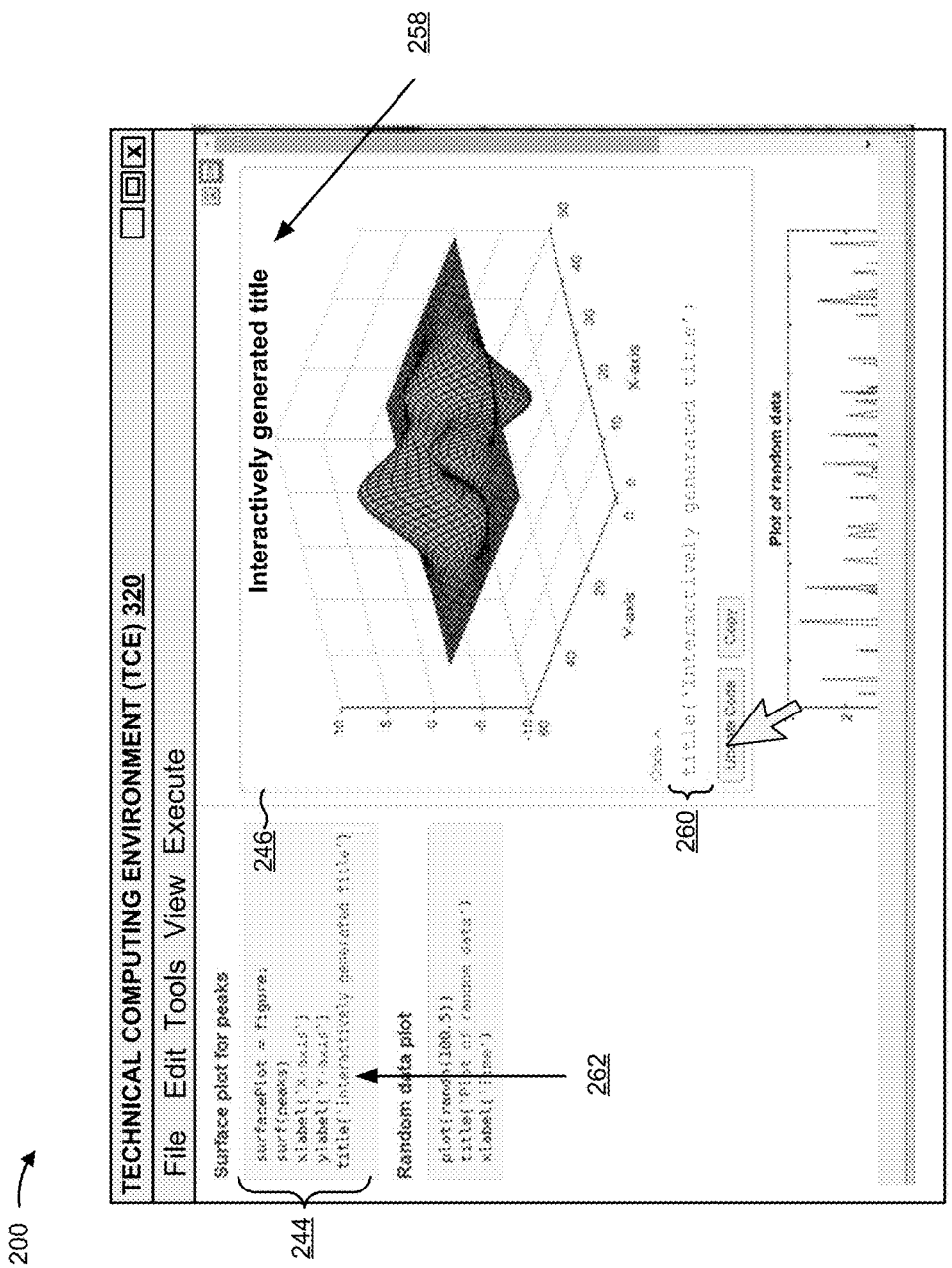
Figure 2L:
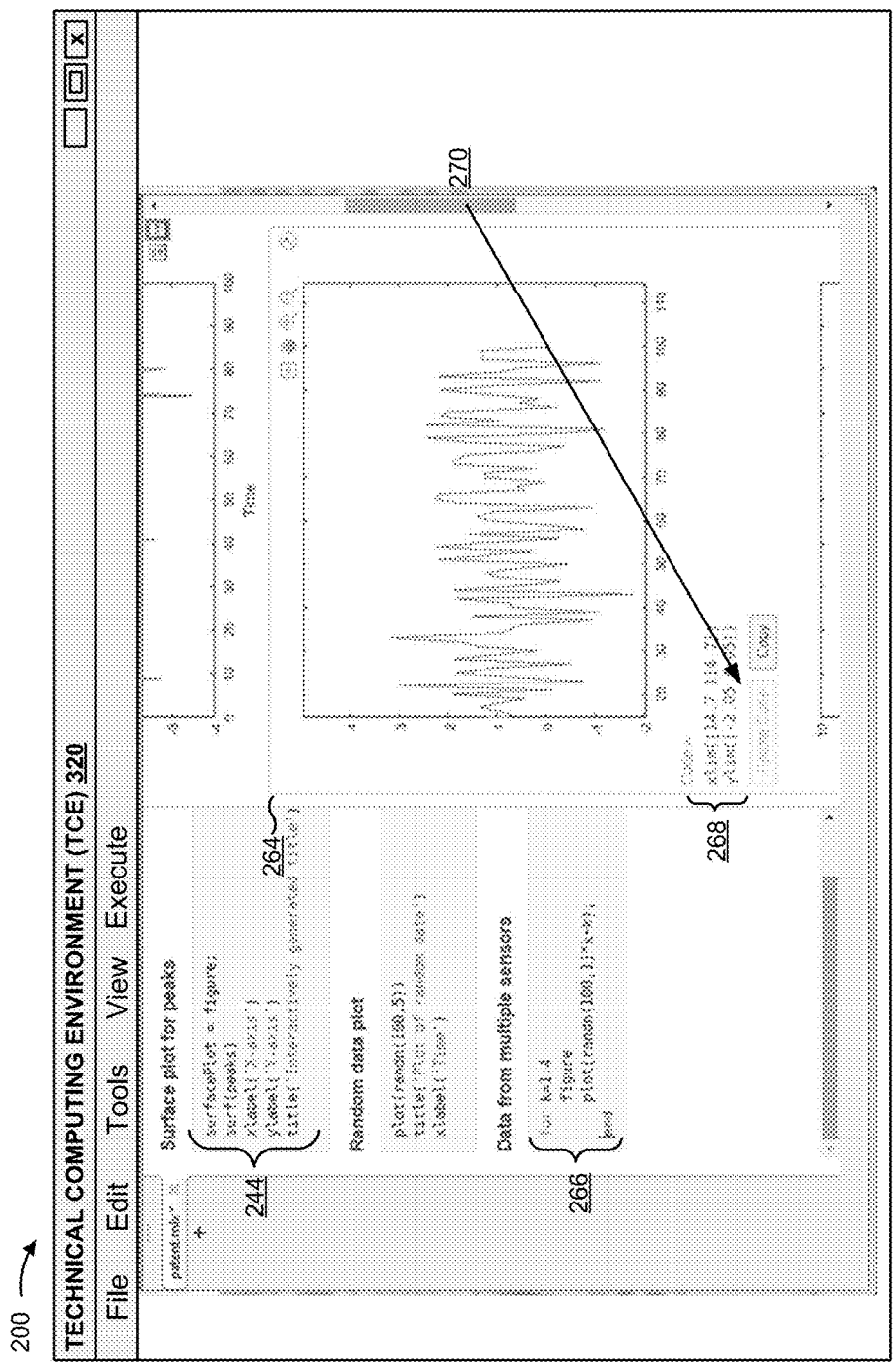
Figure 2M:
Figure 2N:
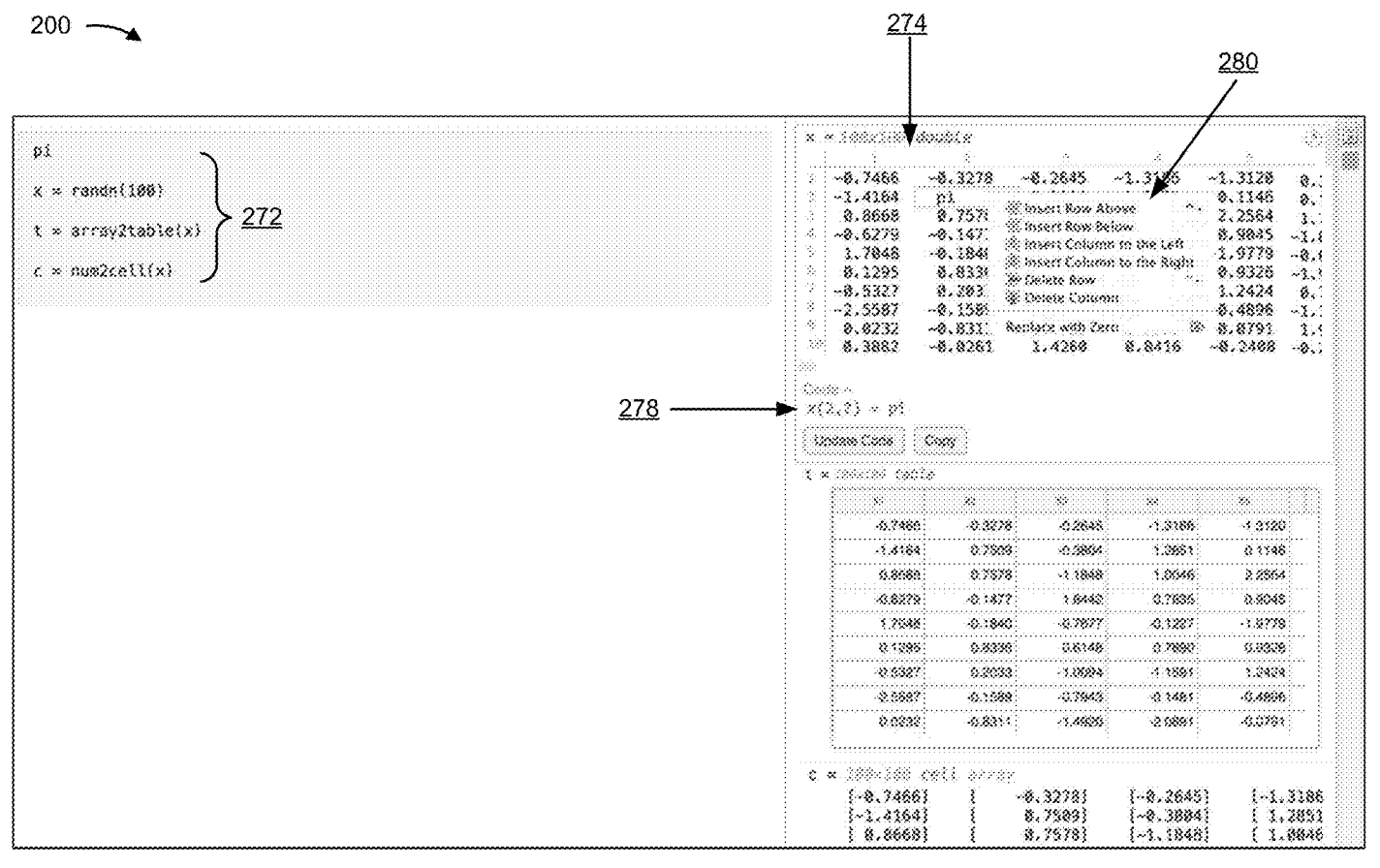
Figure 2O:
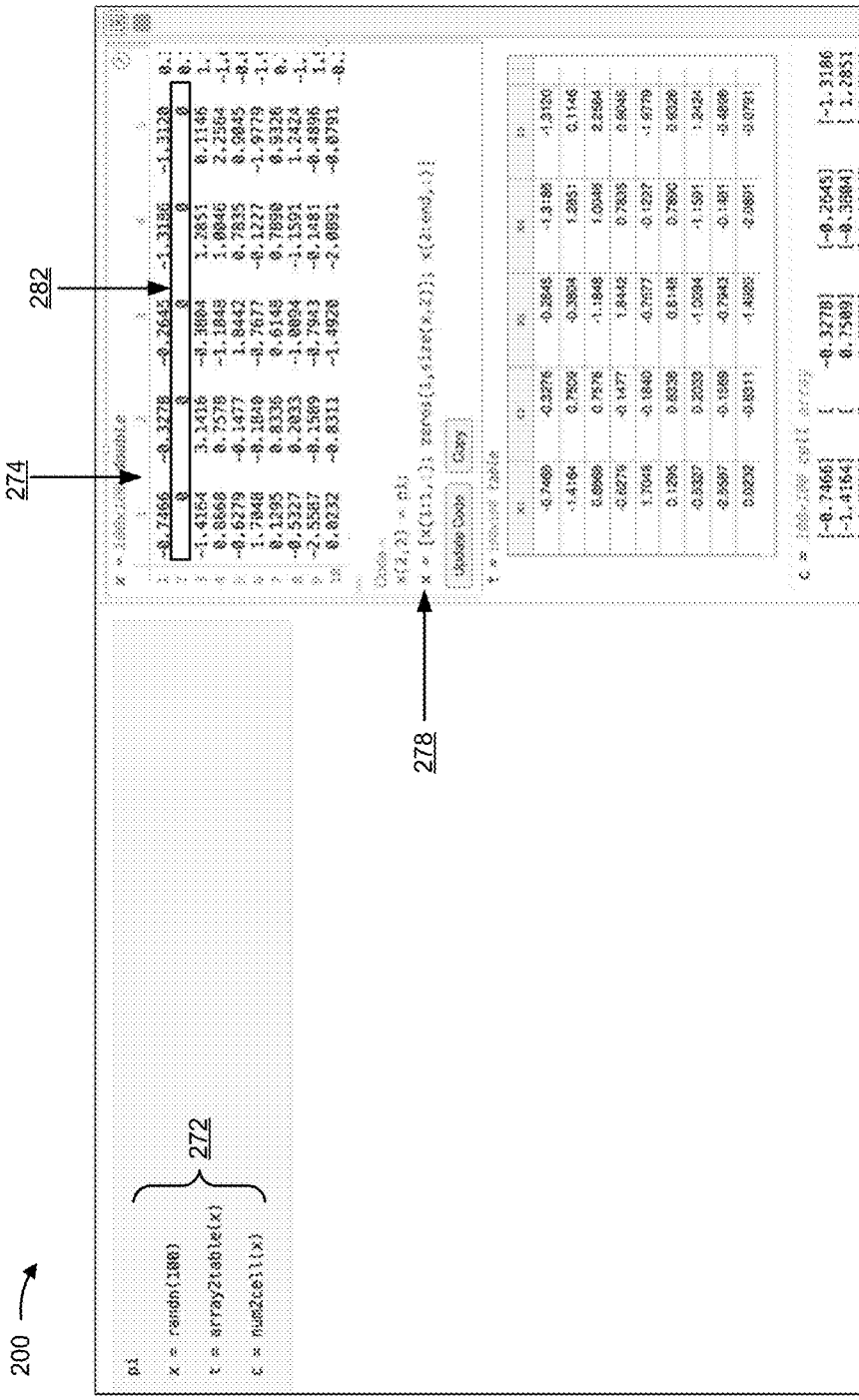
Figure 2P:
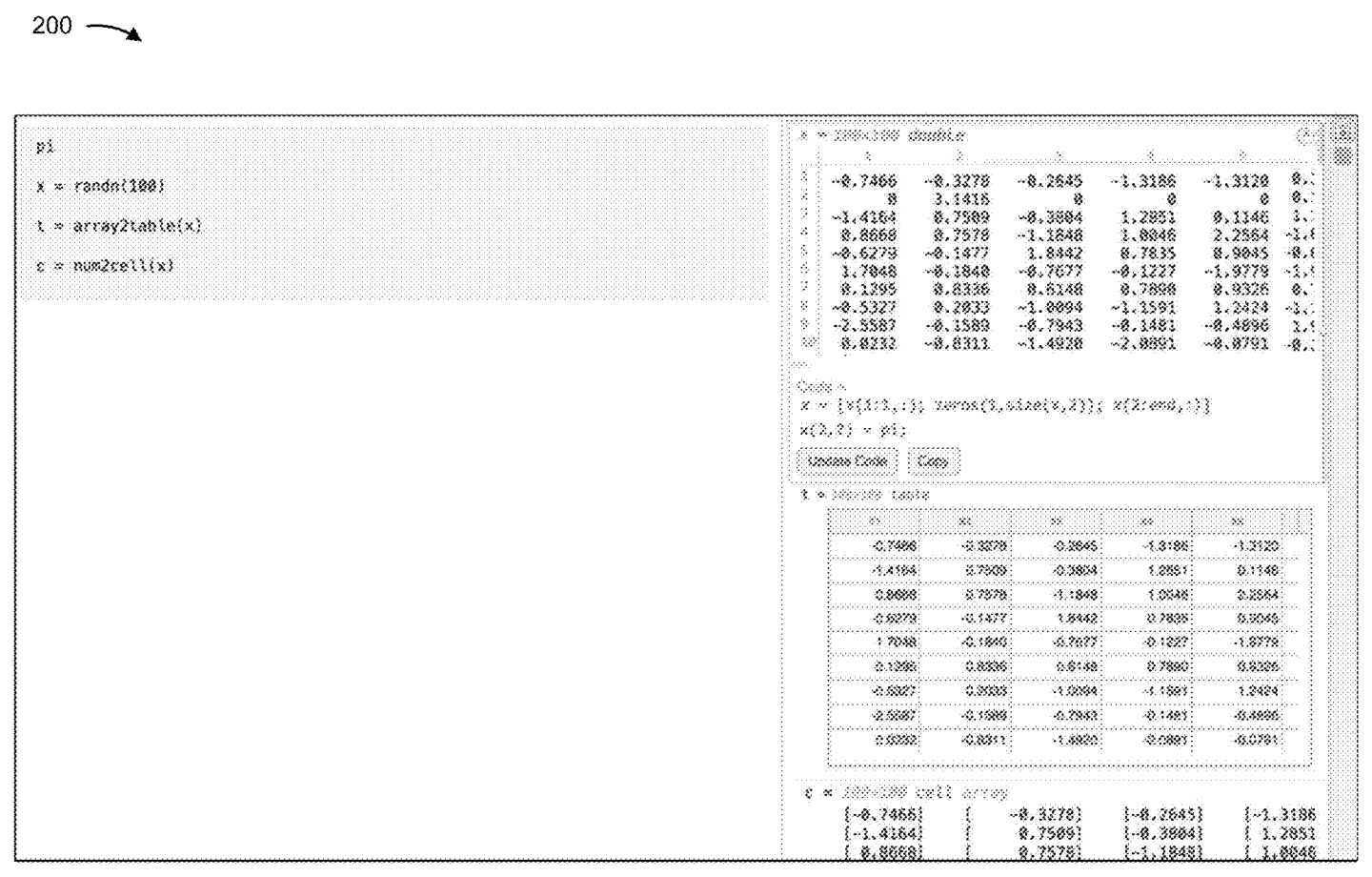
Figure 2Q:
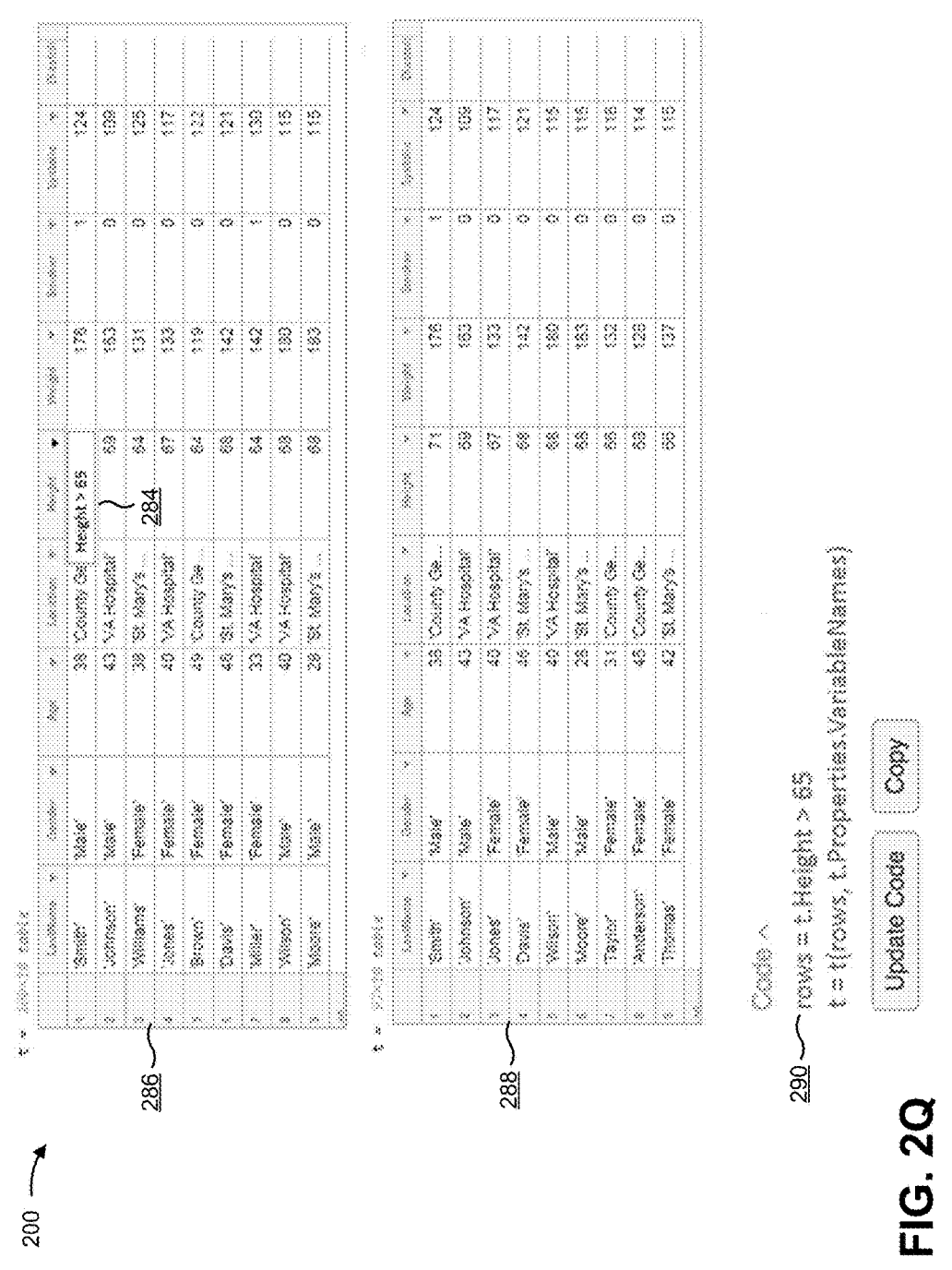
Figure 2R:
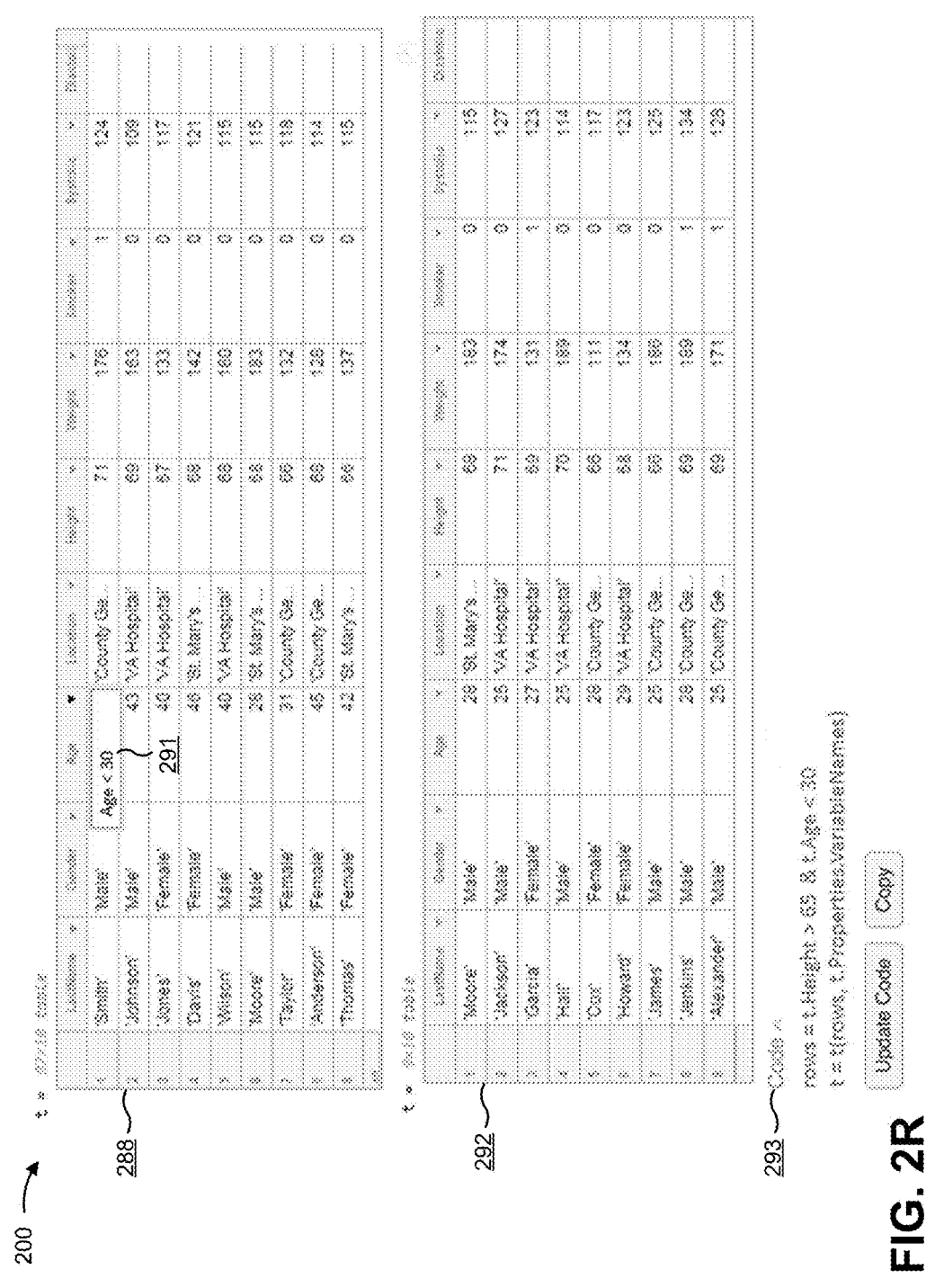
Figure 2S:
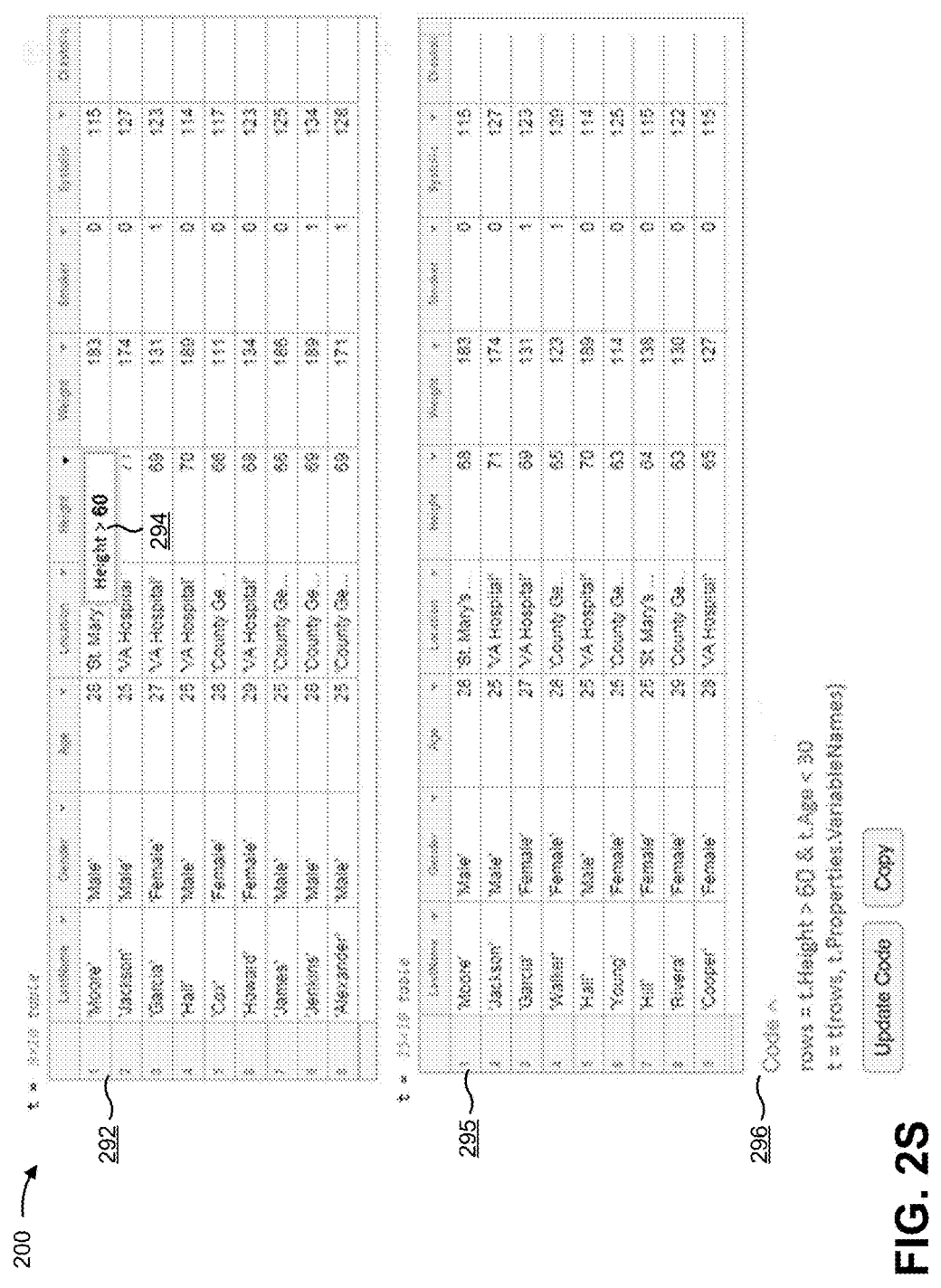
Figure 2T:
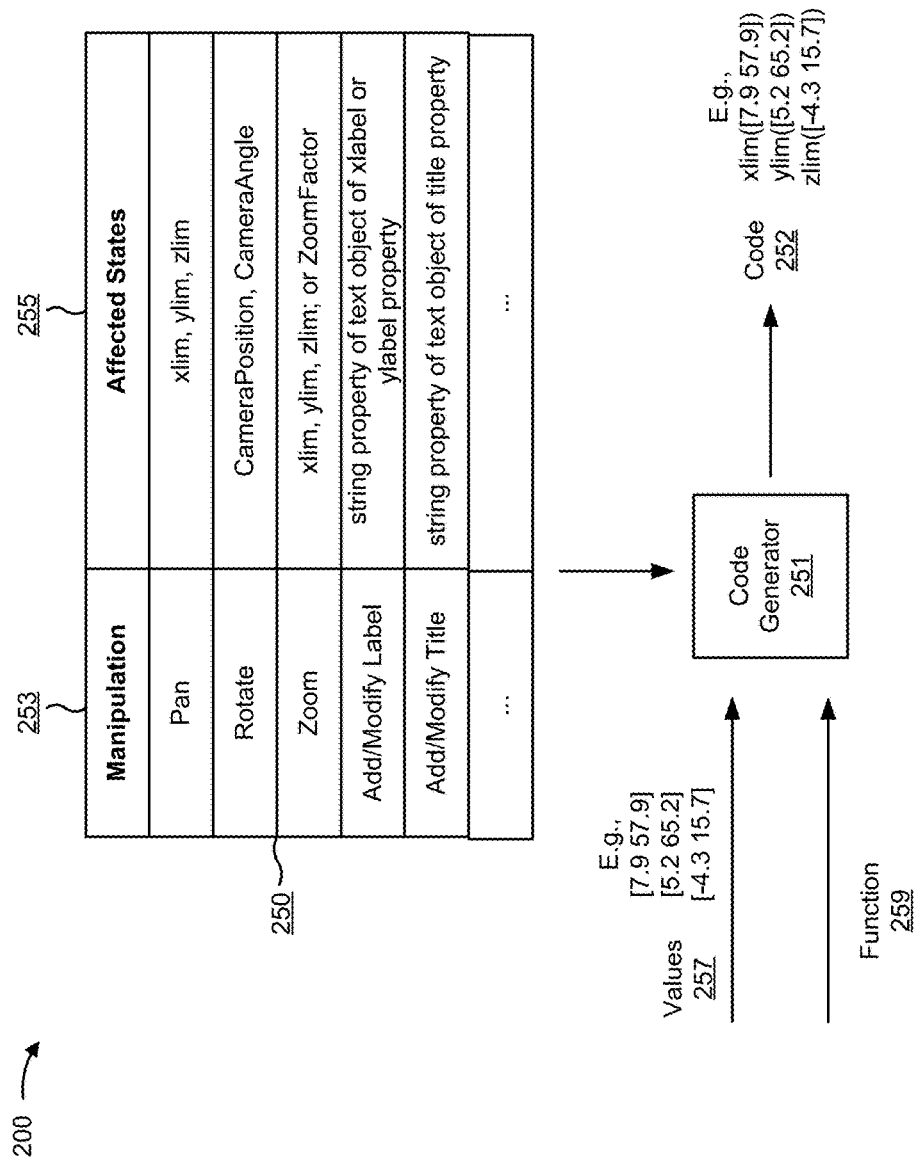

In some implementations, in generating code, e.g., code 252, a code generator 251 associated with the TCE 320, and an example of which is shown in FIG. 2T, may access stored information 250 that indicates relationships between manipulations 253 and affected states 255 of the plot 248 corresponding to the manipulations. The information 250 can be stored within the code generator 251 or can be stored external to the code generator 251 and accessible by the code generator 251. In some implementations, in generating code 252, the code generator 251 uses the information about the type of manipulation, the states affected, and the values for the states affected. The code generator may be configured, e.g., programmed, to generate code using the information. In some implementations, the code generator 251 is configured to use a function 259 (e.g., a pre-coded, stored function) that corresponds to a manipulation 253 and/or the affected states 255 affected by the manipulation. The values for the states can be used as values for input arguments of the function call. Using the function 259 and the value(s) 257 of the affected state(s) 255, the code generator 251 can generate code 252 to generate the result of the manipulation 253. Such function 259 may be configured to generate user-friendly, e.g., consistent with the input program code, e.g., program code 244, that generated the figure being manipulated, e.g., surface plot 248, and simple, e.g., with as few lines as possible, and/or optimized. There may be different functions available for different manipulations or affected states and the code generator can initiate the function call(s) based on the manipulation and/or affected states using the values of the affected states. The different functions can be stored in the code generator 251 or at a different location that is accessible by the code generator. Other than functions and function calls, other programming implementations can be used for the code generator 251 to generate the desired code. For example, the code generator 251 can construct commands based on the manipulations and/or affected states, and the values of the affected states, and the generated code contains the commands constructed.

Examples of states of a figure can include xlim, ylim, zlim, CameraPosition, CameraAngle, ZoomFactor, a string property of a text object of an xlabel and/or a ylabel property, and/or a string property of a text object of a title property. There are many other states. In some implementations, different values of states can make different configurations of a figure.

For each type of manipulation, there are one or more states that are affected. For example, a pan manipulation may affect an xlim, ylim, and/or zlim state, a rotate manipulation may affect a CameraPosition and/or CameraAngle state, a zoom manipulation may affect an xlim, ylim, zlim, and/or ZoomFactor state, an add/modify label manipulation may affect a string property of a text object of an xlabel and/or a ylabel property, an add/modify title manipulation may affect a string property of a text object of a title property, and/or the like. Some of the states affected by different types of manipulations may overlap. For example, xlim, ylim, and/or zlim may overlap between a pan manipulation and a zoom manipulation. Based on the correlations between each type of manipulation and its affected states, the code generator 251 may determine one or more states of the FIG. 248 affected by the one or more manipulations. The information 250 shown in FIG. 2T is merely an example. In different scenarios, the same type of manipulation may affect different states of a figure. For example, a zoom manipulation may change the axes limits, as shown in FIG. 2T. However, alternatively or additionally, when the figure is configured differently, the zoon manipulation may also change, or may instead change, the viewing camera viewing angles while the axes limits do not change.

The code generator 251 may also obtain a value for each of the one or more states from a resulting figure configuration of the manipulation. The code generator 251 may then generate the code 252 based on the value for each of the one or more states of the FIG. 248. In some implementations, code for other states unaffected by the one or more manipulations is not generated. Such values of states may be of any data type, such as a numerical value (e.g., an integer, a real number, etc.), a Boolean value, a string, a character, an array, an object, a structure, and/or the like.

As shown by stored information 250 in FIG. 2T, manipulations 253 include a pan manipulation, a rotate manipulation, a zoom manipulation, a manipulation to add or modify an axis label, a manipulation to add or modify a title of the FIG. 248, and/or many others not shown in the list. As further shown, the pan manipulation may be associated with states of an x-axis limit (e.g., xlim), a y-axis limit (e.g., ylim), a z-axis limit (e.g., zlim), and/or the like. As further shown, the rotate manipulation may be associated with states of a camera position, a camera angle, and/or the like. As further shown, the zoom manipulation may be associated with a zoom factor, an x-axis limit, a y-axis limit, a z-axis limit, and/or the like. As further shown, the manipulation to add or modify an axis label may be associated with states that have values corresponding to contents of the "String" property of the object in the "XLabel" state, the "YLabel" state, and the "ZLabel" state. As further shown, the manipulation to add or modify a title may be associated with states that have values corresponding to contents of the "String" property of the object stored in the "Title" state. The manipulations and corresponding affected states shown in FIG. 2I are shown as example, and other manipulations and affected states are possible. For example, the user may manipulate a figure by adding or modifying a figure characteristic, such as a line thickness, a legend (e.g., a legend location, size, type, etc.), modifying a figure color, modifying a size of one or more axes of a figure (e.g., to resize the axis or axes), modifying a font size, and/or the like.

In the example shown in FIG. 2T, the stored information 250 indicates that when the manipulation is a pan (e.g., the user pans the FIG. 248), then the affected states are an x-axis limit (e.g., xlim), a y-axis limit (e.g., ylim), and a z-axis limit (e.g., zlim). Thus, when the user pans the FIG. 248, as described above, the code generator 251 may access the stored information 250 to determine that the affected states are xlim, ylim, and zlim. The TCE 320 may then determine values for the affected states based on the configuration change (e.g., values for the states of the FIG. 248 after the user interaction). Based on the values, the type of manipulation(s), and/or the affected states, the code generator 251 can generate code that is user friendly, simple, and/or optimized. and. For example, the TCE 320 may determine that, in the configuration change, the FIG. 248 has an xlim value of [7.9 57.9], has a ylim value of [5.2 65.2], and has a zlim value of [−4.3 15.7]. As shown, the TCE 320 may generate code 252 without generating code for other states unaffected by the pan manipulation. In this way, the TCE 320 may conserve memory and processor resources, may enhance performance, and may generate code that is more understandable and useable by a user as compared to generating code to regenerate the entire FIG. 248 from scratch. Also, the code may be similar to what the user would write because the code would exclude code that has no affect (e.g., for unaffected states).

The code 252 can be displayed separately from the program code 244, 245. For example, the code 252 is displayed within the UI element 246 in FIG. 2I. The code 252 can also be displayed at other locations, e.g., in a pop up window. As shown by reference number 254, TCE 320 may display one or more buttons, e.g., for a user to interact with the code 252. For example, TCE 320 may display an "Update Code" button and a "Copy" button. Additionally, or alternatively, TCE 320 may display the code 252 as an option for use in automatically updating the program code 244. For example, selection of a button may cause the systems and/or methods to perform an action. For example, selection of the "Update Code" button may cause the systems and/or methods to automatically add program code 252 to program code 244 and/or modify program code 244 based on program code 252, as described below. As another example, selection of the "Copy" button may cause the systems and/or methods to copy program code 252, thereby, for example, enabling the user to manually select where in program code 244 to paste program code 252. In some implementations, adding program code 252 to program code 244 may produce a result of the user interaction with the graphics object when program code 244 is executed. As further shown, in some implementations, the program code 244, the FIG. 248, and the code 252 may be displayed in different portions of the same display (e.g., at the same time).

In some implementations, TCE 320 may automatically determine a location in the program code 244 for inserting the code 252 such that executing the program code 244 with the inserted code 252 generates the FIG. 248 in the second configuration (e.g., the configuration resulting from the user manipulation). For example, the TCE 320 may map the program code 244, 245 in relation to the FIG. 248 (e.g., may determine a portion of the program code 244 used to generate the FIG. 248), and may use the mapping to determine the location for inserting the code 252. As another example, the TCE 320 may maintain correlation information for the first portion of program code 244 and the output from executing the first portion of program code 244 (e.g., the output FIG. 248), and may use the correlation information to determine the location for inserting the code 252. In some implementations, the correlation information may be obtained during generation of the program code 244 and the plot 248. For example, when the plot 248 is generated from the program code 244, the TCE 320 places and maintains one or more identifiers, e.g., tags or flags, between the code 244 and the plot 248 to track the relationship between lines of program code and the output figures. In some examples, the TCE 320 may maintain tags between the different lines of code 244 and different states of the plot 248. Although tags are discussed as an example, other forms can also be used for maintaining the correlation information. In some implementations, the TCE 320 may insert the code 252 after the location, which is identified through mapping or using the maintained identifier that associates the figure with the line of code that generated or last modified the figure. Additionally, or alternatively, the TCE 320 may overwrite values for the affected states included in the portion of program code 244 or values for the affected states included in code that was previously added to the program code 244, e.g., using the "Update Code" button. This allows the user to perform a manipulation, insert the code for the manipulation, perform another manipulation, and insert the code for the second manipulation so that the code for the second manipulation will overwrite the inserted code for the first manipulation.

In some implementations, the TCE 320 may continuously generate and/or update the first code 252 during the manipulation (e.g., as the user is interacting with the FIG. 248). For example, the TCE 320 may generate and/or update the code 252 each time that the manipulation results in a change to a value of an affected state. As an example, when a user continuously pans a plot, e.g., the plot 248, the values in the code 252 can continuously change in response to the continuous panning such that, the instant values in the code 252 correspond to the instant configuration of the plot 248 during the panning.

Additionally, or alternatively, the TCE 320 may generate and/or update the code 252 during the manipulation based on a trigger, such as the user pausing interaction for a threshold amount of time, the detection of an input trigger (e.g., a click and drag follow by releasing of a mouse button, etc.), and/or the like. In this way, the user may view the result of the user interaction in real-time.

In some implementations, the TCE 320 may record selected manipulations of the one or more manipulations on the output of the program code 244, and may record multiple versions of code 252 for affected states of the FIG. 248 as a result of the selected manipulations. For example, the TCE 320 may record code 252 each time that the TCE 320 detects that a user interaction has paused for a threshold time period, each time that the TCE 320 detects a particular type of user input (e.g., releasing a mouse button, pressing a keyboard button, removal of a screen touch, etc.), and/or the like. In some implementations, the TCE 320 may record the code 252 associated with the selected manipulations so that the selected manipulations can be played back. For example, the TCE 320 may receive a playback request, e.g., an undo request, and may restore the figure to configurations corresponding to the selected manipulations (e.g., in sequential order). In an example, a user may pan the plot 248 three times, and at the end of the third time, may decide that panning two times without the third time leads the final figure configuration desired. Instead of restarting the entire manipulation process, the user can undo the third panning action and reach the desired figure configuration with generated code, which can be regenerated or retrieved from storage without regeneration.

In some implementations, the TCE 320 may generate the code 252 without considering a sequence of the one or more manipulations of the output figure or without generating code for each individual manipulation. In some implementations, code is generated for an aggregated effect multiple, e.g., all, manipulations. For example, the user may perform multiple interactions of the same type (e.g., multiple pan operations) on the FIG. 248, and the TCE 320 may overwrite values of the states of xlim, ylim, and zlim after each manipulation, such that only the most recent values (e.g., after the most recent manipulation) are available for use in the program code 244, when the most recent values represent the aggregated effect of the manipulations. In another example, a user may perform different types of manipulations on the plot 248, e.g., pan first, zoom next, and pan again. In some implementations, the final code generated by a set of different types of manipulations is not affected by the sequence of the different types of manipulations. Instead, the code generator uses all types of manipulations to determine all states affected by the manipulations and generate code for the affected states based on the final, resulting configuration of the figure. In the example of pan first, zoom next, and pan again, the code generator determines that there are two types of manipulations: pan and zoom, regardless of their sequence, and determines that the states affected by these two types of manipulations are xlim, ylim, and zlim. Then the code generator obtains values for each of the affected states and generates code. In some implementations, code may not be generated for the initial pan action but is instead generated after all manipulations are concluded, e.g., when certain trigger of conclusion, like time lapse, is detected. In other implementations, code is generated for the initial pan action and updated after the final pan action.

Alternatively, as described above, the TCE 320 may generate code for each interaction (e.g., each pan operation), and may store the code so that the code is available for a playback, e.g., undo, operation. When the user performs a different manipulation (e.g., a rotate operation) of the FIG. 248, the TCE 320 may generate code based on values for the state(s) affected by the different manipulation. Such code generation may be independent of any previous interactions, such as the pan operation(s). In some implementations, the TCE 320 may use the sequence of manipulations when generating code 252. For example, sequence of the manipulations is taken into consideration when a user performs an undo operation. When the user undoes a most recent manipulation, the generated code reflects the state of the figure after the undo operation. For example, if the user performs a pan, zoom, then another pan and then undoes this last pan, the configuration of the figure will correspond to the initial pan and the zoom, and the generated code will represent the aggregate effect of the initial pan and zoom As shown in FIG. 2J, assume, for example, that the user has selected the "Update Code" button. As shown by reference number 256, the systems and/or methods of the disclosure may insert program code 252 into program code 244 based on the user selection of the "Update Code" button. In some implementations, the systems and/or methods may add program code 252 at a particular location in program code 244 (e.g., a particular line of program code, before or after a particular line of program code, or at a particular point in the program code). For example, the systems and/or methods may add program code 252 after the last line of program code in program code 244 (e.g., title('Surface plot')).

In some implementations, the systems and/or methods may determine the location to add program code 252 by mapping particular lines of program code 244 to particular output, e.g., the graphical plots generated, and displayed in UI element 246, when program code 244 is executed. In some implementations, the systems and/or methods may invert the relationship between program code 244 and the output to determine where to insert program code 252. For example, if the systems and/or methods map particular lines of program code 244 to particular output, the systems and/or methods may determine where to insert program code 252 by reverse mapping the particular output back to the particular lines of program code 244.

In some implementations, if the user performs additional interactions after the systems and/or methods add program code 252 to program code 244, the systems and/or methods may generate additional program code and add the additional generated program code to program code 244. Additionally, or alternatively, the systems and/or methods may generate additional program code based on the result of both program code 252 and the additional user interactions. For example, the systems and/or methods may add the additional program code to program code 244 by replacing program code 252, adding to program code 252, etc., thereby recording a result of both program code 252 and the additional user interactions.

In some implementations, the user may interact with the graphics object in a different manner (e.g., by adding or modifying the title of the graphics object, adding or modifying labels for the axes of the graphics object, etc.). As shown in FIG. 2K, and by reference number 258, the user may interact with UI element 246 by, for example, adding or modifying a title of the graphics object. For example, the user may modify the title of the graphics object from "Surface plot" to "Interactively generated title." As further shown, the systems and/or methods may generate program code based on the user interaction with UI element 246. For example, the systems and/or methods may generate program code 260 based on the user modification to the title of the graphics object.

In some implementations, the systems and/or methods may generate program code that reassigns a value of a variable. For example, if program code 244 includes a variable that stores a string for the title of the graphics object, the systems and/or methods may generate program code that reassigns a value of the variable based on the user interaction (e.g., rather than generating program code 260).

As further shown in FIG. 2K, assume, for example, that the user has selected the "Update Code" button. As shown by reference number 262, the systems and/or methods may modify program code 244 based on the program code generated in association with the user interaction (e.g., rather than adding program code 260 to program code 244 or replacing lines of program code 244 with program code 260). For example, the systems and/or methods may modify program code 244 by modifying the title line of program code 244 from title('Surface plot') to title('Interactively generated title').

In some implementations, the systems and/or methods may map particular lines of program code to output of the program code to identify particular lines of program code to modify. For example, the systems and/or methods may map the particular line of program code 244 that includes the term "title" to a title of a graphics object created by program code 244. In some implementations, the systems and/or methods may identify the particular lines of program code to modify by inverting the relationship between existing program code and a graphics object in a manner similar to what was described above.

In some implementations, the systems and/or methods may parse lines of program code to enable the systems and/or methods to identify particular lines of program code to modify. In some implementations, the systems and/or methods may parse the lines of program code 244 and program code 260 into key words, tokens, or the like. For example, the systems and/or methods may parse the title line of both program code 244 and program code 260 to identify "title" as a key word of both title lines of program code. Parsing lines of program code enables the systems and/or methods to determine the particular lines of program code 244 to modify by matching the key words, the tokens, or the like included in program code 244 and program code 260. For example, the systems and/or methods may identify the title line of program code 244 as the line to modify based on the user modification of the title and based on the title lines of both program code 244 and program code 260 including the key word "title."

In some implementations, the systems and/or methods may have to add program code and/or replace program code based on modifications to the output (e.g., rather than modifying the program code). For example, the systems and/or methods may have to add program code and/or replace program code when the systems and/or methods cannot map particular lines of the program code to the output of the program code or cannot parse terms from the program code.

In some implementations, it may not be desirable for automatically adding to existing program code the additional program code generated from a user interaction with output of the existing program. For example, the addition may introduce errors to the existing program code. An example is shown in FIG. 2L.

As shown by reference number 270, in some implementations, the systems and/or methods may disable the "Update Code" button based on the program code that is affected by the user interaction. For example, the systems and/or methods may disable the "Update Code" button when the user interaction affects multiple lines of program code or multiple outputs of program code, such as when the user interaction affects a for loop or a while loop capable of iterating multiple times. The systems and/or methods may disable the "Update Code" button in this situation because the generated program code may not be added in a single location to recreate the user interaction.

Applying this example to FIG. 2L, the systems and/or methods may disable the "Update Code" button based on program code 266 including a for loop that iterates four times. For example, the systems and/or methods may disable the "Update Code" button because the systems and/or methods would have to add conditional program code to detect which iteration of the for loop the user interaction affected (e.g., an iteration when k equals one, when k equals two, etc.).

In some implementations, when the systems and/or methods disable the "Update Code" button, the systems and/or methods may not disable the "Copy" button. By not disabling the "Copy" button, the systems and/or methods may enable a user to copy generated program code when automatic insertion of the generated program code is otherwise unavailable. For example, the systems and/or methods may enable the user to copy generated program code 268 for manual insertion into handwritten program code 266 when the systems and/or methods have disabled the "Update Code" button.

In some implementations, the systems and/or methods may provide information for display in association with disabling the "Update Code" button. For example, the systems and/or methods may provide instructions, for display, that assist the user with copying program code 268 into program code 266. As another example, the systems and/or methods may highlight program code 266 to identify where the user may paste generated program code 268. Providing information in association with disabling the "Update Code" button can help the user to manually modify existing program code when the systems and/or methods disable the "Update Code" button.

As described with respect to FIGS. 2I-2L, the systems and/or methods may generate program code based on a user interaction with a UI element and/or a graphics object. In addition, the systems and/or methods may integrate the generated program code into existing program code. Further, the systems and/or methods may integrate the program code into the existing program code at a location based on semantics and structure of the existing program code. Further, the systems and/or methods may parse the program code and use results of the parsing to generate additional program code (e.g., that reassigns variable names or modifies portions of a graphics object).

Although FIGS. 2I-2L were described with respect to a UI element displaying a graphics object, the implementations described with respect to those figures may be applied to other UI elements, such as a table of data or objects. For example, implementations described with respect to those figures may apply to user interactions with a table that include transposing or sorting data within the table (e.g., rather than panning, zooming, and/or rotating a graphics object).

As shown in FIG. 2M, the systems and/or methods may display program code 272 (e.g., user-entered program code or code imported into the editor). In some implementations, program code 272 may produce an output (e.g., when executed). For example, program code 272 may create a data set 274, such as a table (e.g., containing an array of values), when program code 272 is executed. As further shown, TCE 320 may display a UI element, which may include the table as output of execution of program code 272. As shown by reference number 276, a user may interact with the data set. For example, the user may insert a value of the data set, may modify a value of the data set, may delete a value of the data set, may filter values of the data set, may sort values of the data set, may transpose values of the data set, and/or the like. Although in FIG. 2M, the data set is shown to be in the form of a table, the data set 274 may include one or more data points in any other form, which can include, for example, a matrix, an array, a vector, a data structure, and/or the like.

In the example shown in FIG. 2M, the user interacts with the data set 274 to edit a value of a cell 276 to the value of pi. The TCE 320, e.g., using a code generator such as the code generator 251 of FIG. 2T, may generate code 278 based on the user interaction. For example, the TCE 320 may generate the code x(2,2)=pi, based on the effects of editing the value of the cell. As further shown, TCE 320 may display code 278. In some implementations, TCE 320 may display code 278 prior to the systems and/or methods using the generated program code (e.g., to modify program code 244, as described below). Providing the generated program code prior to using the generated program code can allow the user to view the generated program code prior to the systems and/or methods using the generated program code, thereby increasing user control over modifications to the existing program code.

As shown in FIG. 2N, the user may interact with the data set 274 using a context menu 280. In this example, the context menu permits the user to insert a row (e.g., above or below an indicated row), insert a column (e.g., to the left or to the right of an indicated column), delete a row, delete a column, and/or the like. In this case, the user selects the option to insert a row above the indicated row (e.g., above row 2).

As shown in FIG. 2O, based on the user selecting the option to insert the row above the indicated row, the TCE 320 adds the row to the data set 274, as shown by reference number 282. Further, the TCE 320 adds a line to code 278 to record the addition of the row, shown as x=[x(1:1, :); zeros(1,size(x,2)); x(2:end, :)]. In this case, the TCE 320 may use the order of the manipulations (e.g., the cell edit followed by the row insertion) when generating the code 278 because the lines of code 278 may produce different results when executed in a different order (e.g., as opposed to the code 252 described above in connection with FIG. 2I). For example, executing a first line of code to edit the cell (2,2) to the value of pi, and then executing a second line of code to insert a row above row 2 may generate the data set 274 shown in FIG. 2O. However, executing a first line of code to insert a row above row 2, and then executing a second line of code to edit the cell (2,2) to the value of pi may generate a different data set, as shown in FIG. 2P.

In some implementations, and in a similar manner as described in connection with FIG. 2I and FIG. 2T, the TCE 320 may display the data set 274 as an output from executing a first portion of program code 272. The TCE 320 may receive an indication that the data set 274 has been modified through one or more manipulations of the data set 274 to form a modified data set, e.g., those shown in FIGS. 2M-2S. The code generator of FIG. 2T may generate code 278 that represents one or more modifications to the data set 274 such that executing the first code 278 (e.g., code as shown in FIGS. 2M-2P) with the first portion of code 272 generates the modified data set. The TCE 320 may provide the first code 278 as an option for use in automatically inserting in the program code such that executing the first portion of the program code 272 and the first code 278 generates the modified data set.

Figure 2U:
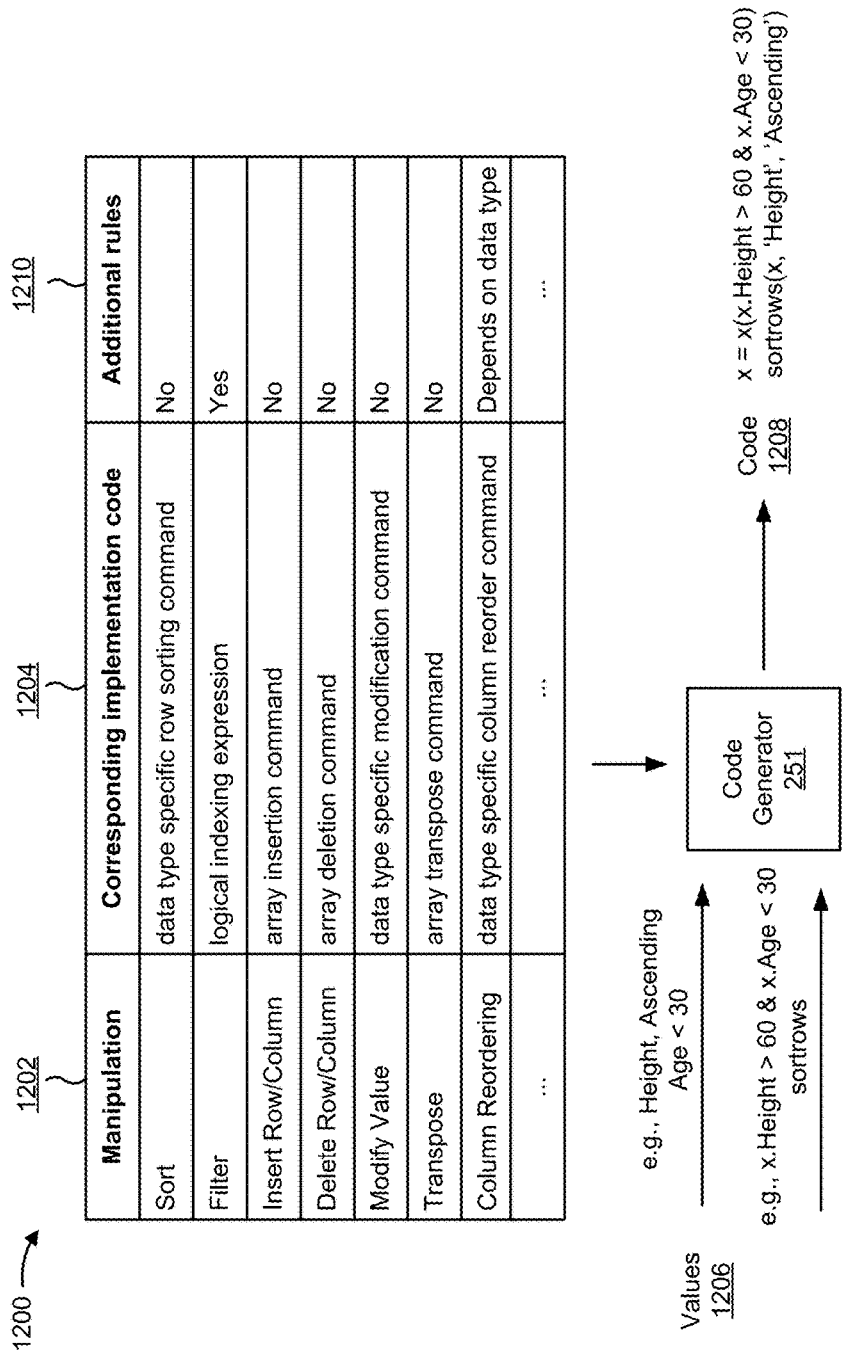

Referring to FIG. 2U, in generating code corresponding to the manipulation(s) made to the data set, the code generator 251 of FIG. 2T may access information 1200 based on the manipulation types identified by the TCE 320. The information 1200 can be stored in the form of a table or in any other forms, similar to the information 250 of FIG. 2T. The information 1200 can be stored with, e.g., within the same file or document or table, or separately from the information 250. The code generator 251 determines which information to use for code generation based on the identified different manipulations applied to the data or figure. In the examples shown in FIG. 2U, manipulations 1202 applicable to data sets can include, but not limited to, sort, filter, insert row or column, delete row or column, modify value, transpose, or column reordering. For each type of manipulation, the code generator 251 determines the corresponding implementation code 1204 for use in generating code that represents the manipulation(s) applied to the data set. Similar to those described in connection with figure manipulations, the implementation code 1204 can include function calls and functions that can be called. The execution of the functions can generate the code, using the values associated with the manipulations. The implementation code 1204 can also construct commands that can be included in the code generated. For example, for sort manipulation, the corresponding code can include a data type specific row sorting command. Some other examples of commands and/or implementation code for other example manipulations are shown in FIG. 2U. Furthermore, the code generator 251 determines the data points on which the manipulation(s) is applied, and obtains values 1206 corresponding to the manipulations and use the values 1206 and the commands to generate code 1208. Similar to those described for figure manipulations, the values 1206 can have any type, e.g., string, numerical values, data structure, objects, functions, etc.

In some implementations, if there are multiple manipulations of the data set 274, the TCE 320 may determine whether the multiple manipulations are a same type of manipulation or different types of manipulations. In some implementations, if the manipulations are different, then for each different type of manipulation, the TCE 320 may generate code 278 for each manipulation in a sequence corresponding to a sequence that the manipulations are applied to the data set 274. The code 278 may be generated based on the type of manipulation and one or more values of the data set 274 that are modified by the manipulation.

Additionally, or alternatively, if the manipulations are the same type of manipulation, e.g., consecutive manipulations of the same type, in some implementations, the TCE 320 may generate code 278 for an initial manipulation of the type, and may update the code 278 without generating additional code (e.g., without generating an additional line of code) for a later manipulation of the type. In this way, the TCE 320 minimizes or reduces a number of lines of code 278 generated in association with the manipulations of the data set 274. For example, if the user performs multiple manipulations of the same type, such as changing the value of a same cell multiple times, then the TCE 320 may generate code corresponding to the most recently input value, and may overwrite code generated for pervious values. For example, the user may change cell (2,2) to a value of 100, then may change cell (2,2) to a value of pi. In this case, the code would only include code to recreate the value of pi in cell (2,2), as shown in FIG. 2M. As another example, if the user performs multiple manipulations of different types, such as changing a value of a cell and then inserting a row, then the TCE 320 may generate code corresponding to both manipulations in a sequence corresponding to the sequence of the manipulation, an example of which is shown in FIG. 2O. In some implementations, multiple same type of certain manipulations are separated by one or more other types of manipulations, and code is generated for each of the same type of manipulations in sequence to represent the changes made to the data set by the manipulations. For example, when sort, value modification, and sort are applied to the same selected data points of the data set, code is generated for each of the manipulations in sequence.

In some implementations, the code generator 251 applies additional rules 1210 in code generation, e.g., rules for generating code when multiple manipulations have been applied. An example of the rules is whether multiple manipulations of the same type are applied to the same targets, e.g., data points, within the data set. A "No" can mean that the manipulation is always applied to the result of a previous manipulation, whether or not the previous manipulation is of the same type or not. For example, for the transpose manipulation, when there are two transpose applied in an immediate sequence, the later transpose is applied to the data set that has been initially transposed, instead of the original data set that hasn't received the initial transpose manipulation. Accordingly, code generated for the two manipulations can be no code at all since the effect of the two manipulations is effectively no manipulation. When there are one or more other manipulations between the two same type of manipulations, e.g., transpose, the generated code will depend on the other manipulations in addition to the transpose manipulations.

For the manipulations that has the "No" answer to the rule, in many situations, code generation depends on the sequence of each manipulation, regardless of the types. The sequence of all manipulations can affect the final result of the manipulations. For example, when transpose, delete a row, and then transpose again are applied, the result is different from applying transpose, transpose, and delete a row. In such situations, the code generator 251 generates code sequentially for each manipulation. However, in some implementations, as described above, when multiple manipulations of the same type are applied, the results of the manipulations only rely on the last manipulation, e.g., modifying values. Accordingly, the code generation depends on the final manipulation of the type.

A "Yes" can mean that the manipulation can be applied to the original data set before a same type of manipulation is applied. For example, a filter manipulation applied to the same target, e.g., the same row or column of data points, is applied to the original target before a previous filter manipulation is applied. For example, when a column of data points is filtered to show those data points larger than a threshold, e.g., a value of 10, and when in a following filtering manipulation, a user tries to change the threshold to be a different value, e.g., 4, or change the criteria to be smaller than another threshold, the following filtering manipulation is applied to the original data set without the initial filtering manipulation. As shown in this example, the rules can be set based on convenience of usage and conventional usage. In some implementations, code generated for this type of manipulations can use values of the final result of the same manipulation type, instead of using values or generating code corresponding to each manipulation of the same type. In the example of filtering, code is only generated for the following filtering using values associated with the following filtering. However, in some implementations, values of each manipulation are used and code is generated for each manipulation. For example, when filter, modify value, and filter are applied to the same target, code is generated for each of the manipulations in sequence.

There can be other rules. The rules 1210 for each manipulation are chosen as an example. Based on user needs, other rules can be chosen. For example, the rule can stipulate a "No" to filter, instead of a "Yes." The rule can also be more specific. For example, for a given manipulation, the rule can be a "Yes" for certain data types while a "No" for other data types.

In some implementations, code can be continuously generated during manipulation(s) of the data set, similarly to the continuous code generation for manipulation(s) of a figure. For example, when a value modification is performed, code can be generated and displayed as soon as the modification starts and continuously records the modified value. In another example, when multiple manipulations take place, code can be generated and displayed during the manipulations. In some implementations, code can be generated based on triggering events during or after manipulation(s) of the data set. Examples of triggering events can be the same as those described for the triggering of code generation for figure manipulation(s).

In some implementations, the TCE 320 may generate a figure from the data set 274, and may receive an indication that the figure has been modified to form a modified figure through one or more manipulations of the figure (e.g., as described above in connection with FIG. 2I and FIG. 2T). In some implementations, the TCE 320 may generate code such that executing the code generates the modified figure. Additional details regarding figure manipulation and code generation for modified figures are described above in connection with FIG. 2I and FIG. 2T.

In some implementations, the TCE 320 may generate another data set from the data set 274, and may receive an indication that the other data set has been modified to form a modified other data set through one or more manipulations of the other data set (e.g., in a similar manner as described in connection with modifying the data set 274). In some implementations, the TCE 320 may generate code such that executing the code modifies the other data set to form the modified other data set.

In some implementations, the TCE 320 may record selected manipulations of the one or more manipulations, and may record code 278 generated for the selected manipulations. For example, the TCE 320 may record code 278 each time that the TCE 320 detects that a user interaction has paused for a threshold time period, each time that the TCE 320 detects a particular type of user input (e.g., releasing a mouse button, pressing a keyboard button, removal of a screen touch, etc.), for each manipulation, and/or the like. In some implementations, the TCE 320 may record the code 278 associated with the selected manipulations so that the selected manipulations can be played back. For example, the TCE 320 may receive a playback request, and may restore the data set corresponding to the selected manipulations (e.g., in sequential order). Such playback mechanism may permit a user to undo and redo manipulations.

In some implementations, TCE 320 may automatically determine a location in the program code 272 for inserting the code 278 such that executing the program code 272 with the inserted code 278 generates the modified data set (e.g., the data set resulting from the user manipulation). For example, the TCE 320 may map the program code 272 (e.g., a portion of the program code 272) to the data set 274 (e.g., may determine a portion of the program code 272 used to generate the data set 274), and may use the mapping to determine the location for inserting the code 278. As another example, the TCE 320 may maintain correlation information for the first portion of program code 272 and the output from executing the first portion of program code 272 (e.g., the output data set 274), and may use the correlation information to determine the location for inserting the code 278. Examples of implementations of mapping or maintaining correlation information, e.g., using identifiers, are described in connection with figure manipulations and are applicable to data set manipulations.

As shown in FIG. 2Q, and by reference number 284, a user may manipulate a data set 286 by filtering the data set 286. For example, the user may input an instruction to filter the data set 286 to show data corresponding to Height>65. This manipulation may result in a modified data set 288 filtered according to the instruction. The TCE 320 may generate code 290 that represents a modification to the data set 286 such that executing the code 290, with code for generating the data set 286, generates the modified data set 288. For example, the code 290 is generated as a first line of code rows=t.Height>65 and a second line of code t=t(rows, t.Properties.VariableNames).

As shown in FIG. 2R, and by reference number 291, a user may manipulate the data set 288 (e.g., created as described above in connection with FIG. 2Q) by filtering the data set 288. For example, the user may input an instruction to filter the data set 288 to show data corresponding to Age<30. This manipulation may result in a modified data set 292 filtered according to the instruction. The TCE 320 may generate code 293 that represents a modification to the data set 288 such that executing the code 293, with code for generating the data set 288, generates the modified data set 292. For example, the code 293 is generated as a first line of code rows=t.Height>65 & t.Age<30 and a second line of code t=t(rows, t.Properties.VariableNames). In this case, the TCE 320 may update or overwrite the code 290 (as shown in FIG. 2Q) to generate the code 293 (e.g., to add t.Age<30 at the end of the first line of code), rather than adding an additional line of code for the second filter operation. For example, TCE 320 may update the code (e.g., by modifying a line of code) instead of generating a new line of code based on determining that the type of manipulation is the same (e.g., the type of manipulation is a filter manipulation in both FIGS. 2Q and 2R).

As shown in FIG. 2S, and by reference number 294, a user may manipulate the data set 292 (e.g., created as described above in connection with FIG. 2R) by filtering the data set 292. For example, the user may input an instruction to filter the data set 292 to show data corresponding to Height>60 (rather than Height>65, as described above in connection with FIG. 2Q). This manipulation may result in a modified data set 295 filtered according to the instruction. The TCE 320 may generate code 296 that represents a modification to the data set 292 such that executing the code 296, with code for generating the data set 292, generates the modified data set 295. For example, the code 296 is generated as a first line of code rows=t.Height>60 & t.Age<30 and a second line of code t=t(rows, t.Properties.VariableNames). In this case, the TCE 320 may update or overwrite the code 293 (as shown in FIG. 2R) to generate the code 296 (e.g., to replace t.Height>65 with t.Height>60), rather than adding an additional line of code for this subsequent filter operation. For example, TCE 320 may update the code (e.g., by modifying a line of code) instead of generating a new line of code based on determining that the type of manipulation is the same (e.g., the type of manipulation is a filter manipulation in FIGS. 2Q, 2R, and 2S). In this way, the TCE 320 generates program code that is more efficiently executed.

In some implementations, in addition to figures (or plots) or data sets that are generated as outputs of input program code, the TCE can also provide capabilities for manipulating symbolic outputs, such as symbolic expressions or equations, e.g., mathematical equations, models, e.g., graphical models, textual models, or models represented by equations, or any object that has a representation that can be manipulated, e.g., a tree, a list, or a control loop. The manipulations of these outputs can be similarly recorded by generating code that can be added into the input program code for regenerating the manipulated outputs. Some examples are shown in FIGS. 2V-1 to 2V-3, 2W-1 and 2W-2, and 2X-1 and 2X-2. Example implementations of code generation are briefly discussed accordingly. The details of the implementations and the process of identifying locations for inserting the generated code in the input program code can be the same or variations of those discussed for figure manipulation and data set manipulation. Continuous code generation and playback, e.g., undo, functionalities that are described previously can similarly apply to these manipulations, based on similar implementations. To reduce redundancy and for simplicity, some of the details are not described below.

Figures 2, 2V:
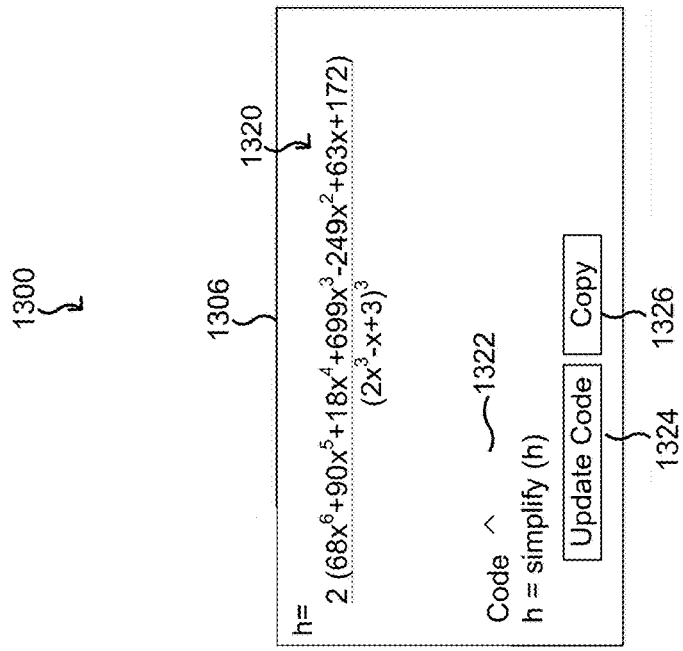
Figures 2, 2V, 3:
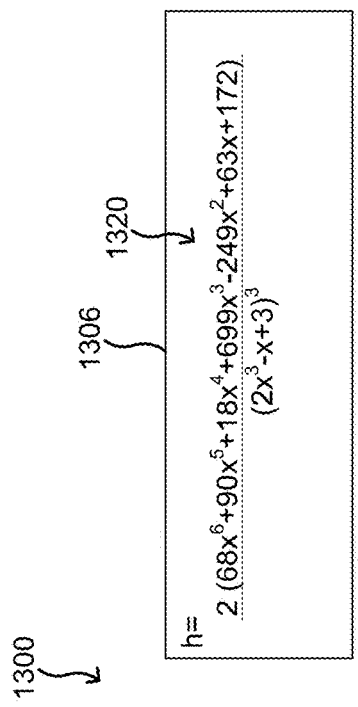
Figures 2, 2W:
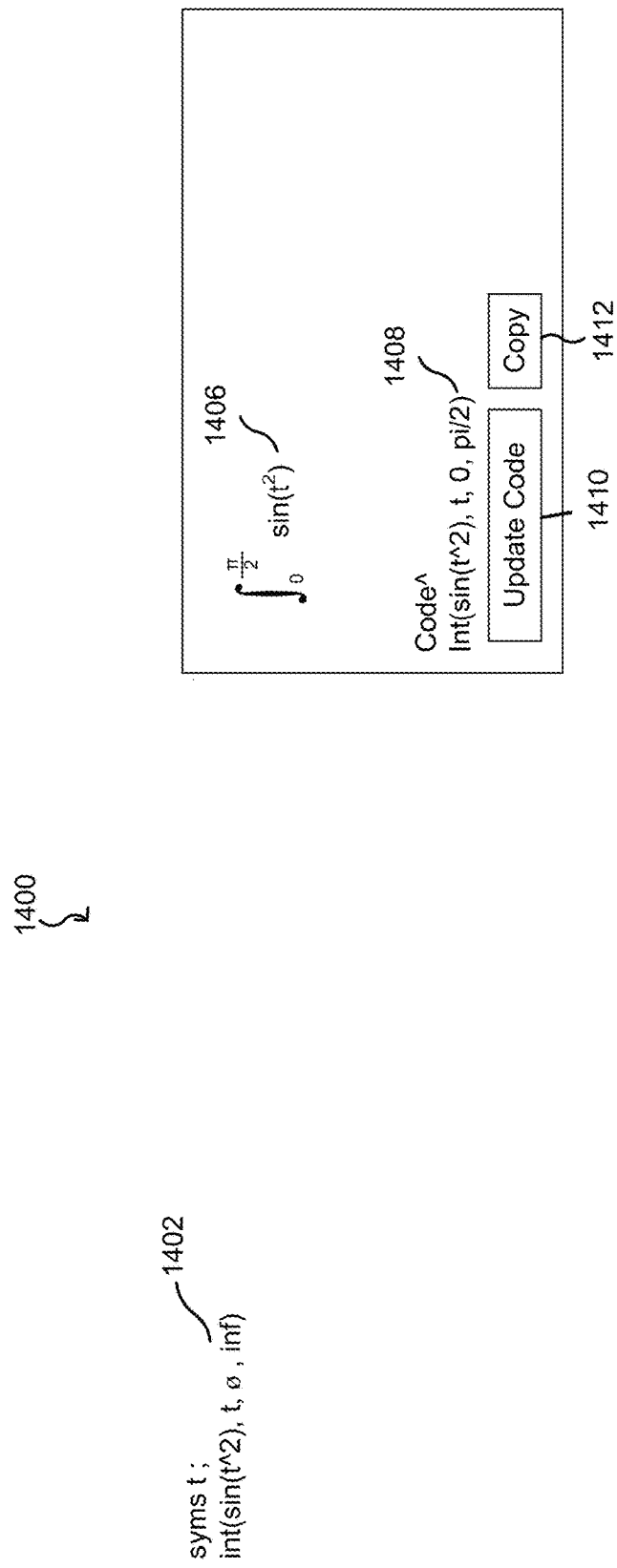
Figures 1, 2X:
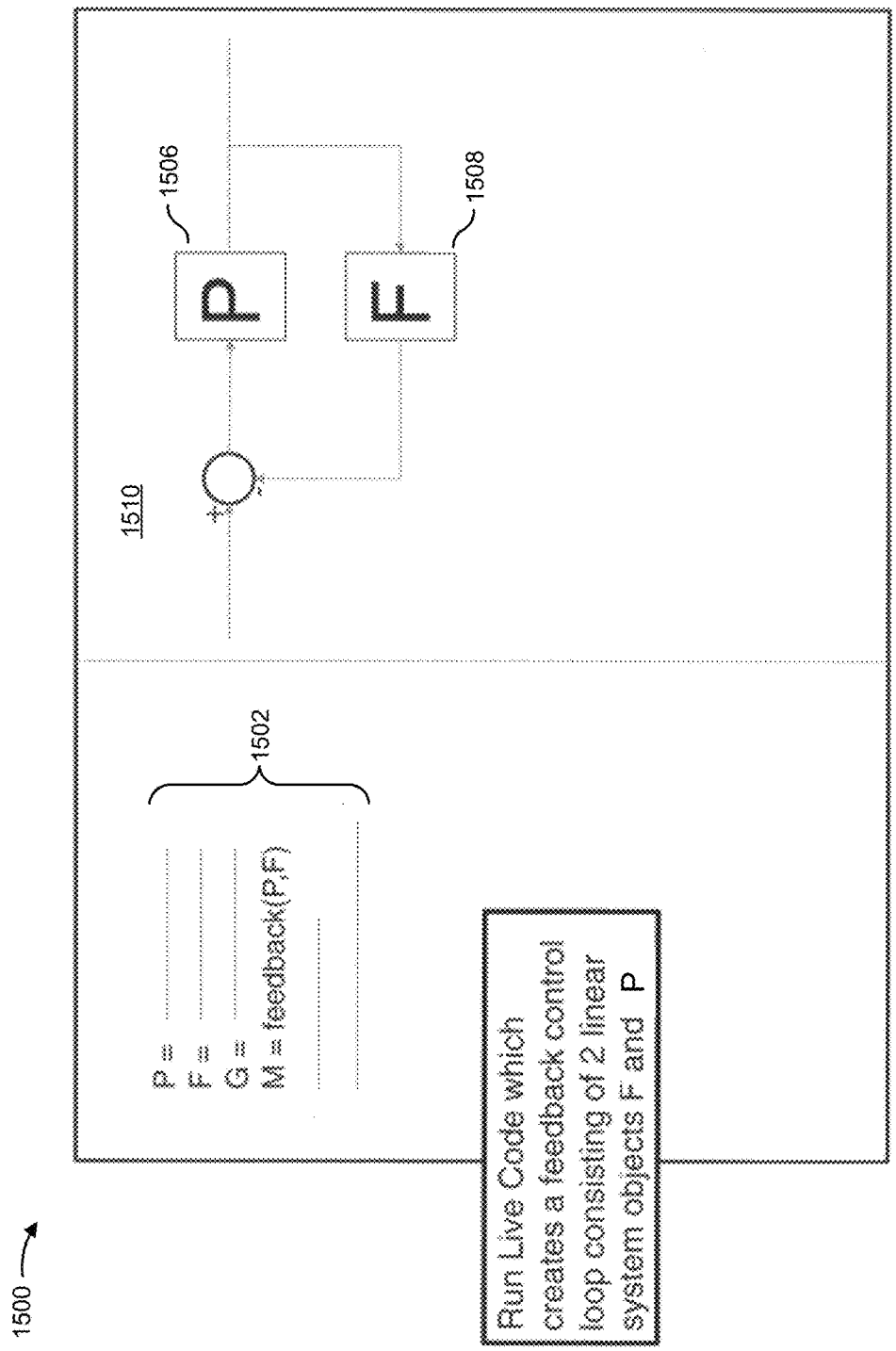
Figures 2, 2X:
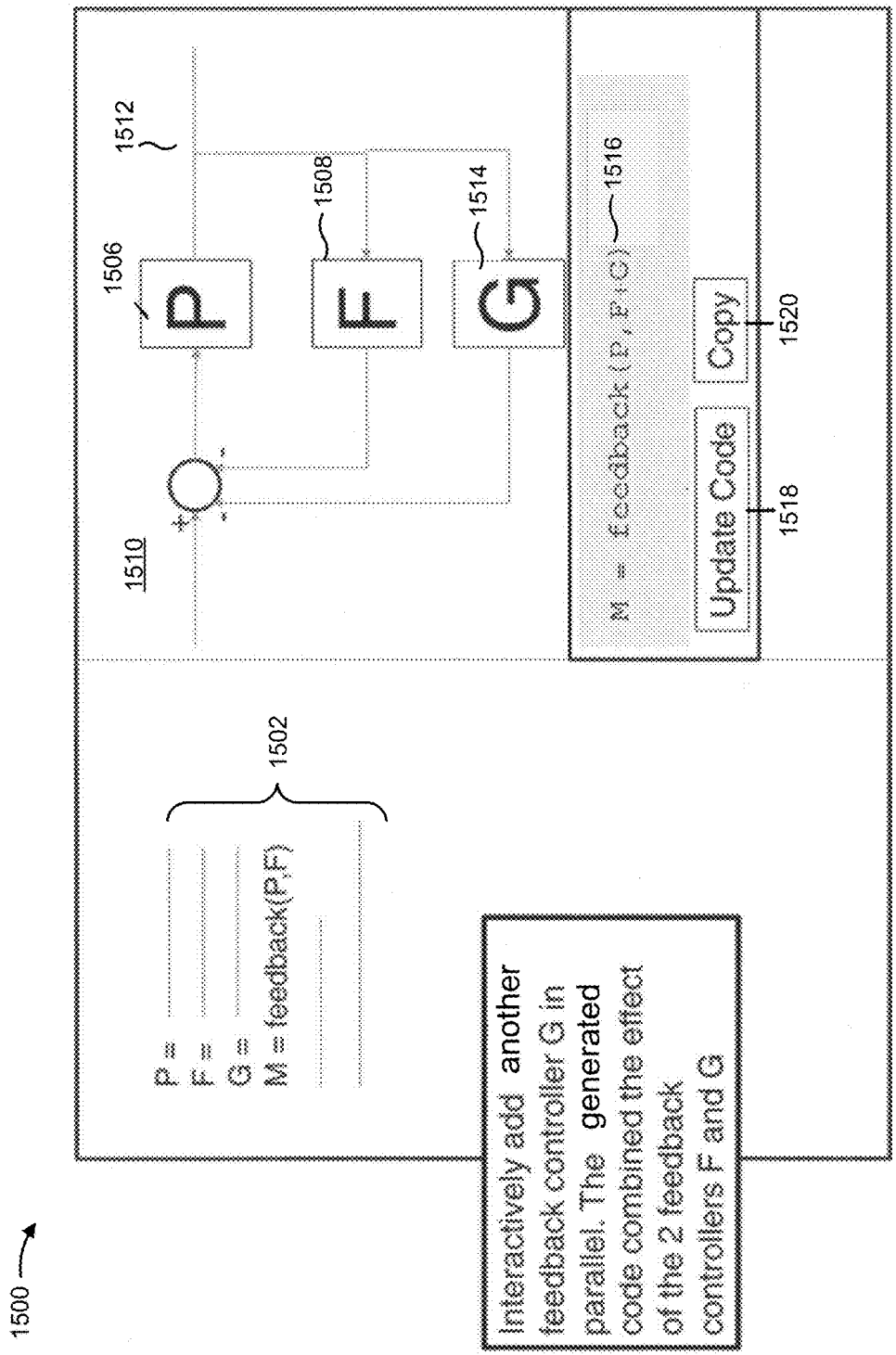
Figure 3:
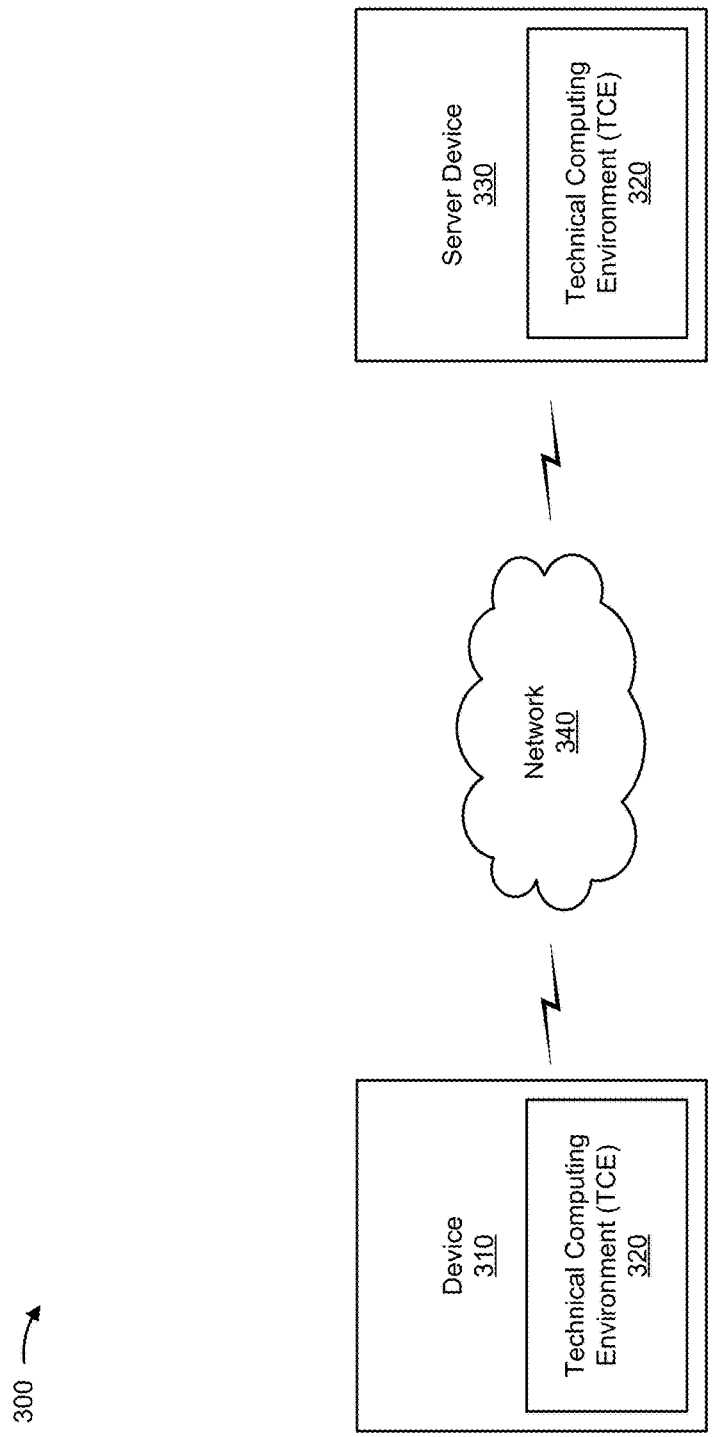

FIG. 2V-1 to FIG. 2V-4 show an example of equation manipulation. Referring to FIG. 2V-1, in a code editor 1300, input program code 1302, e.g., received from a user, generates an output equation 1304, which is a symbolic output. Similar to the figure, data, or object output described previously, the output equation 1304 can be manipulated, e.g., modified, through user interaction with the equation, without requiring the user to provide additional input program code that represent the manipulations or modifications. In some implementations, the equation 1304 is displayed in a UI element 1306. In the example shown in FIG. 2V-1, the manipulations available are displayed in a drop down list, e.g., display triggered by a mouse click, and include "simplify" 1308, "simplifyFraction" 1310, "expand" 1312, "combine" 1314, "subexpression" 1316, and "rewrite" 1318. The manipulations available can be predetermined in the TCE. Other manipulations can be available. In some implementations, in addition to the predetermined manipulations, a user can also interact with the equation in other non-predetermined manner, e.g., change a parameter or variable in the equation. An example of such manipulations is shown in FIGS. 2W-1 and 2W-2. In the example shown in FIG. 2V-1, the manipulation "simplify" 1308 is chosen.

Referring to FIG. 2V-2, in response to the "simplify" manipulation, the equation 1304 of FIG. 2V-1 is simplified into equation 1320, which is mathematically equivalent to the equation 1304, but in a mathematically simplified or reduced form. In addition, code 1322 corresponding to the "simplify" manipulation is generated and displayed near the equation 1320. In some implementations, the code 1322 is generated using predetermined, e.g., preprogrammed, implementation code for the received predetermined manipulation, e.g., "simplify" in this example, and the input program code 1302 or the output equation 1304. For example, the generated code 1322 uses the variable "h" consistently with the input code 1302. In other examples, additional rules may apply to the code generation, e.g., when multiple manipulations are performed. Examples of the rules may include whether or not the sequence of the manipulations is considered in code generation, or whether or not multiple manipulations are applied to the original output equation 1304 or an equation in its manipulated form.

Activatable buttons "Update Code" 1324 and "Copy" 1326 associated with the code 1322 are also displayed. The functionalities of these buttons are the same as those described previously. Briefly, when the "Update Code" button 1324 is activated, the TCE automatically determines a suitable location in the input program code 1302 and insert the code 1322 after the location. In the example shown in FIG. 2V-3, the TCE determines that the location is the input program code 1302, e.g. by mapping or using the traceability information between the input program code and the corresponding output, as described previously. The program code 1322 is inserted after the determined location. Referring again to FIG. 2V-2, the "Copy" button 1326 can allow a user to manually insert the copied code 1322 at a desired location in the program code 1302.

In another example, referring to FIGS. 2W-1 and 1W-2, instead of selecting one or more predetermined manipulations on a symbolic output, a user can manipulate the output in a non-predetermined manner. In some implementations, each of the symbols in the symbolic output can be manipulated. In this example, as shown in FIG. 2W-1, in an editor 1400, input code 1402 generates a symbolic expression 1404, which integrates $\sin(t^2)$ from zero to infinite. A user chooses to change the upper limit of the integration from infinite to Pi/2, as shown in FIG. 2W-2, by changing the symbol $\infty$ to $\pi/2$. The expression 1404 of FIG. 2W-1 is modified to the modified expression 1406 of FIG. 2W-2. In addition, in response to the manipulation, code 1408 is generated and displayed near the expression 1406. Similar to other embodiments, an "Update Code" button 1410 and a "Copy" button are displayed. In some implementations, the code 1408 can be generated using similar processes as those described in FIGS. 2T and 2U. For example, when the output expression 1406 is generated and displayed, each of the symbols made individually manipulatable and each manipulation can be detected. Once a detection takes place, the code generator or the TCE obtains information about the type of manipulation and the value of the manipulated symbol, and generates code using predetermined implementation code, e.g., function calls with or without additional rules, as previously described. Although not shown in the figures, the code 1408 can be automatically or manually inserted at a proper location of the input program code 1402 such that execution of the inserted code with the original input program code can regenerate the expression 1406.

Referring now to FIGS. 2X-1 and 2X-2, the manipulatable output of input program code can also be a control loop. In an editor 1500, execution of input program code 1502, the details of which are not shown but instead simplified using underlines, generates an output control loop 1504. The output control loop 1504 is a feedback control loop including two linear system objects P 1506 and F 1508. Similar to previous embodiments, the input program code 1502 and its output can be displayed together. In some implementations, the output control loop 1504 is displayed in a UI and one or more, e.g., each, symbols or objects of the control loop 1504 can be manipulated. In some implementations, the objects P 1506 and/or F 1508 can also be non-linear or other types of objects.

In the example shown in FIG. 2X-2, a user adds an additional controller G 1514 to the control loop of FIG. 2X-1. Accordingly, a modified control loop 1512 is generated. In response to the user manipulation, code 1516 is automatically generated and displayed near the modified control loop 1512. The generation of the code 1516 can implement similar methodologies described for other embodiments. For example, the type of manipulation, the result of the manipulation, the sequence of the multiple manipulations, and/or additional rules are taken into consideration by the code generator or the TCE for generating the code. Although not shown in the figures, the code 1518 can be automatically or manually inserted at a proper location of the input program code 1502 such that execution of the inserted code with the original input program code can regenerate the modified control loop 1512. In some implementations, the controller G 1514 may not be defined, or fully defined, by the input program code 1502. A user can define the controller G 1514 in the displayed output 1512 when adding the controller G 1514. As a result, the generated code 1516 can additionally include code that defines at least some features of the controller G 1514.

In some implementations, the expressions, the equations, or the control loops can be one or more parts of, or the entirety of, a model, e.g., a statistics model, a graphical model, a model for a dynamic system, or others. The manipulations of the expressions, equations, or the control loops can allow a user to interactively work with the models without programming code in addition to the input program code.

As indicated above, FIGS. 2A-2S and FIGS. 2V-1 to 2V-3, 2W-1 and 2W-2, and 2X-1 and 2X-2 are provided merely as showing examples of UI elements or part of UI elements in a TCE. Other examples are possible and may differ from what was described with regard to FIGS. 2A-2S and FIGS. 2V-1 to 2V-3, 2W-1 and 2W-2, and 2X-1 and 2X-2.

As described with respect to FIGS. 1A-1H and FIGS. 2A-2S and FIGS. 2V-1 to 2V-3, 2W-1 and 2W-2, and 2X-1 and 2X-2, systems and/or methods of the disclosure may provide data, an object, and/or program code for visualization and/or manipulation using a UI element displayed within a code editor. In addition, the systems and/or methods may record user interactions with the UI element by automatically generating program code based on the user interaction.

FIG. 3 is a diagram of an example environment 300 in which systems and/or methods, described herein, may be implemented. As shown in FIG. 3, environment 300 may include a client device 310, which may include a technical computing environment (TCE) 320. Furthermore, environment 300 may include a server device 330, which may include TCE 320, and a network 340. Devices of environment 300 may interconnect via wired connections, wireless connections, or a combination of wired and wireless connections.

Client device 310 includes one or more devices capable of receiving, generating, storing, processing, and/or providing program code and/or information associated with program code (e.g., a document containing program code, a program code segment, or a UI element). For example, client device 310 may include a computing device, such as a desktop computer, a laptop computer, a tablet computer, a mobile phone (e.g., a smart phone or a radiotelephone), or a similar type of device. In some implementations, client device 310 may receive information from and/or transmit information to server device 330.

Client device 310 may host TCE 320. TCE 320 includes any hardware-based component or a combination of hardware and software-based components that provides a computing environment that allows tasks to be performed (e.g., by users) related to disciplines, such as, but not limited to, mathematics, science, engineering, medicine, and business. TCE 320 may include a text-based environment (e.g., MAT-LAB® software by The MathWorks, Inc.), a graphically-based environment (e.g., Simulink® software, Stateflow® software, or SimEvents® software, by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 320 may include, for example, a user interface that permits a user to create and/or modify documents containing program code. For example, TCE 320 may provide a code editor that permits a user to create and/or modify documents containing program code. In some implementations, TCE 320 may permit the user to create and/or modify program code by inputting the program code as text. Additionally, or alternatively, TCE 320 may provide one or more UI elements (e.g., within the document containing program code), and the user may interact with the UI element(s) to cause TCE 320 to generate program code. For example, the user may interact with a UI element to visualize and/or manipulate data or an object, and TCE 320 may generate program code based on the interaction of the user with the UI element.

Server device 330 includes one or more devices capable of receiving, generating, storing, processing, and/or providing program code and/or information associated with program code. For example, server device 330 may include a computing device, such as a server, a desktop computer, a laptop computer, a tablet computer, or a similar type of device. In some implementations, server device 330 may host TCE 320. In some implementations, client device 310 may be used to access one or more TCEs 320 running on one or more server devices 330. For example, multiple server devices 330 may be used to execute program code (e.g., serially or in parallel), and may provide respective results of executing the program code to client device 310.

In some implementations, client device 310 and server device 330 may be owned by different entities. For example, an end user may own client device 310, and a third party may own server device 330. In some implementations, server device 330 may include a device operating in a cloud computing environment. In this way, front-end applications (e.g., a UI) may be separated from back-end applications (e.g., program code execution). Additionally, or alternatively, server device 330 may perform one, more, or all operations described elsewhere herein as being performed by client device 310.

Network 340 includes one or more wired and/or wireless networks. For example, network 340 may include a cellular network, a public land mobile network (PLMN), a local area network (LAN), a wide area network (WAN), a metropolitan area network (MAN), a telephone network (e.g., a Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
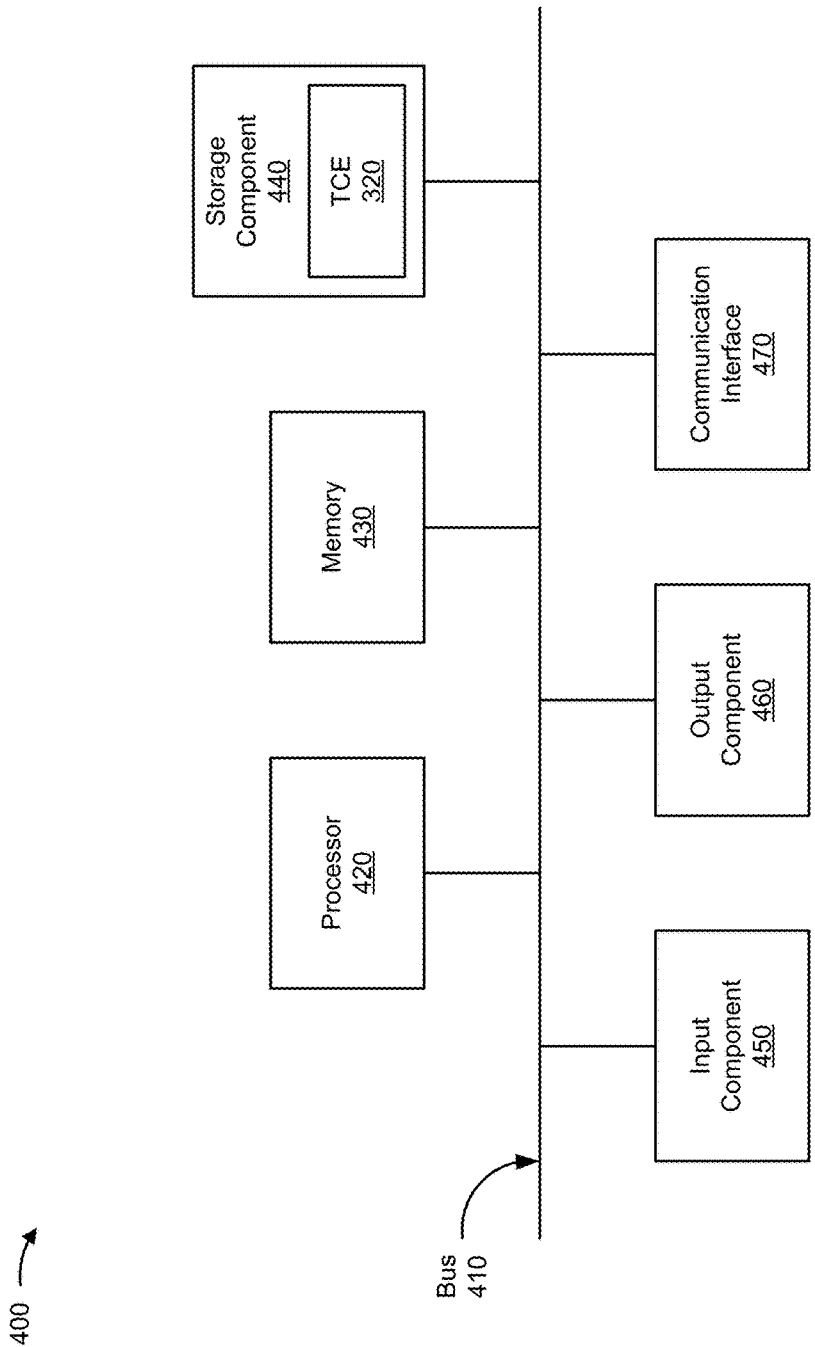
FIG. 4 is a diagram of example components of one or more devices of FIG. 3.

FIG. 4 is a diagram of example components of a device 400. Device 400 may correspond to client device 310 and/or server device 330. In some implementations, client device 310 and/or server device 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. In some implementations, storage component 440 may store TCE 320.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from non-transitory computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
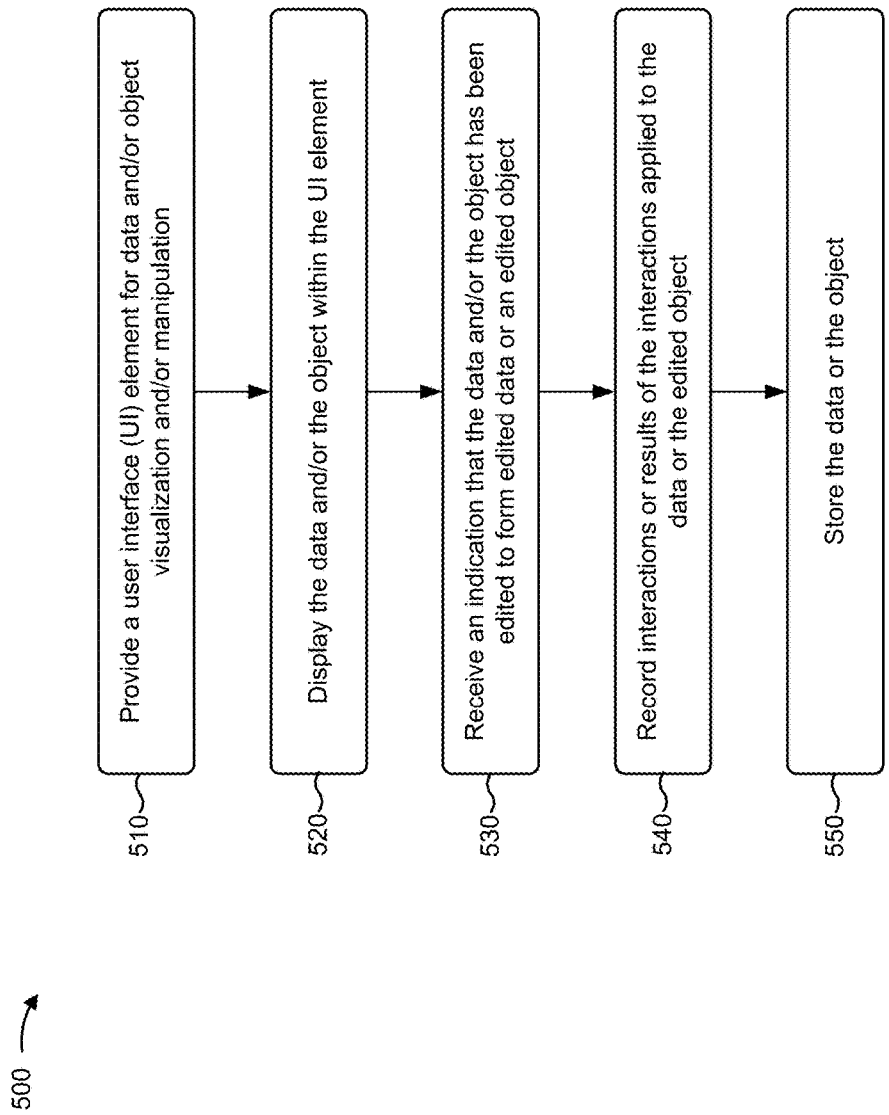
FIG. 5 is a flow chart of an example process for visualizing and/or manipulating data or objects using a user interface element in a code editor.

FIG. 5 is a flow chart of an example process 500 for visualizing and/or manipulating data or objects using a UI element in a code editor. In some implementations, one or more process blocks of FIG. 5 may be performed by client device 310. In some implementations, one or more process blocks of FIG. 5 may be performed by another device or a group of devices separate from or including client device 310, such as server device 330.

As shown in FIG. 5, process 500 may include providing a user interface (UI) element for data and/or object visualization and/or manipulation (block 510). For example, client device 310 may provide, in a code editor in which program code is received and displayed, a UI element for data or object visualization or manipulation. In some implementations, the code editor may be displayed within TCE 320.

As further shown in FIG. 5, process 500 may include displaying the data and/or the object within the UI element (block 520). For example, the data may be displayed within a table displayed by, or displayed in, the UI element and the object may be displayed as a graph displayed by, or displayed in, the code editor with, the UI element. In some implementations, client device 310 may display the data or the object within the UI element.

In some implementations, the data and/or the objects may be created via execution of program code (e.g., handwritten program code, program code loaded into code editor 102 from a program file, etc.). Additionally, or alternatively, the data and/or the objects may be created based on user input (e.g., by a user inputting data into the UI element, using one or more input mechanisms to generate the data and/or the objects, etc.). Additionally, or alternatively, the data and/or the objects may be created by importing the data and/or the objects into the UI element (e.g., from a file). In some implementations, data and/or objects displayed in a UI element may be created using a combination of ways to create the data and/or the objects. For example, the data and/or the objects in a UI element may be created using a combination of executing program code, based on user input, and/or via import into the UI element.

In some implementations, the data or the object may be manipulated within the UI element. For example, a user may interact with (e.g., edit, zoom, pan, etc.) the data or the object within the UI element without needing additional program code to edit the data or the object, such as additional program code handwritten by a user of TCE 320 that, when executed, performs the editing.

In some implementations, TCE 320 (or the systems and/or methods) may generate or obtain the data. In some implementations, TCE 320 may generate the data or the object. For example, TCE 320 may generate the data or the object by executing program code within the code editor. In some implementations, TCE 320 obtain the data or the object. For example, TCE 320 may obtain the data or object by importing the data or object into the code editor or the UI element from a location different from the code editor or the UI element.

In some implementations, the systems and/or methods may import the data or the object. For example, the systems and/or methods may import the data or the object into the UI element from a location different from the code editor. In some implementations, the systems and/or methods may receive an indication (e.g., a user selection of a button displayed by TCE 320 or the UI element to import the data or the object from a file into the code editor. In some implementations, when displaying the data or the object, the systems and/or methods may execute first program code that imports the data or the object into the UI element, may import the data or the object based on executing the program code, and may display the data or the object within the UI element based on importing the data or the object.

In some implementations, the UI element may include a UI element displayed within, in line with, in place of, etc. program code (e.g., program code input by a user in a code editor or program code automatically generated). For example, the UI element may include an editable UI element that displays an output of a function, thereby enabling the user to manipulate the output of the function without manipulating the program code executing the function or without manipulating arguments of the function. As another example, the UI element may include an editable UI element that represents an argument for a function, thereby enabling the user to manipulate the arguments for the function without needing the user to manipulate the program code or provide additional program code.

As further shown in FIG. 5, process 500 may include receiving an indication that the data and/or the object has been edited to form edited data or an edited object (block 530). For example, the systems and/or methods may receive an indication of the interaction with a subset of the data or the object to form an edited subset of the data or the object. In some implementations, the interaction may include a user interaction, such as inputting the data, manipulating the data, or manipulating the object.

In some implementations, the user may input data into the UI element. For example, the user may input values into cells of a table displayed within the UI element. In some implementations, the user may manipulate data or an object displayed within the UI element. For example, the user may change values of the data displayed in the table. As another example, the user may change the manner in which the data is displayed (e.g., by transposing the data, inserting rows and/or columns into the data, deleting rows and/or columns from the data, or scrolling through the data). As another example, the user may change the manner in which the object is displayed (e.g., by zooming in on a portion of a graphics object, zooming out from a portion of a graphics object, or scrolling through a graphics object). As another example, the user may select a button or a menu item displayed by, displayed within, connected to, etc. the UI element and/or the code editor.

In some implementations, the interaction may form edited data or an edited object. For example, the user interaction with or manipulation of the data or the object may form the edited data of the edited object based on the user interaction.

As further shown in FIG. 5, process 500 may include recording interactions or results of the interactions applied to the data or the edited object (block 540). For example, the systems and/or methods may record a result of one or more user interactions that formed the edited data or the edited object. In some implementations, the UI element may generate program code based on, to record, etc. one or more user interactions with the data or the object to record the one or more user interactions. For example, the systems and/or methods may generate program code that permits recreation of the interaction or results of the interactions when the program code is executed.

In some implementations, the systems and/or methods may generate program code that, when executed, recreates the edited data or the edited object (e.g., by recreating the user interactions with the data or the object). Additionally, or alternatively, the systems and/or methods may record the one or more user interactions by generating a variable in memory (e.g., a variable to store data displayed by a UI element) that, when accessed by program code, causes the program code to recreate the edited data or the edited object (e.g., the variable data described above with respect to FIGS. 1A-1H and 2A-2I. In some implementations, when generating the program code, client device 310 may display the program code outside of the UI element or in the code editor, where the program code may be editable within the UI element of the code editor. In some implementations, client device 310 may display the edited data or the edited object (e.g., within the UI element).

In some implementations, TCE 320 may generate program code based on a rule. For example, TCE 320 may generate program code to record a user interaction with a graphics object based on a rule that causes TCE 320 to generate program code to record a user interaction. As another example, TCE 320 may wait a threshold amount of time or a threshold number of interactions before generating program code based on a rule. In some implementations, TCE 320 may insert generated program code into program code displayed within a code editor. Program code generation and/or insertion of generated program code into other program code is described in more detail above with respect to FIGS. 1A-1H and FIGS. 2A-2T and FIGS. 2V-1 to 2V-3, 2W-1 and 2W-2, and 2X-1 and 2X-2.

As further shown in FIG. 5, process 500 may include storing the data or the object (block 550). For example, the systems and/or methods may store the data or the object such that the data or the object is usable in the code editor. In some implementations, the systems and/or methods may store the program code such that the data or the object is stored and usable in the code editor.

In some implementations, the systems and/or methods may store the generated program code such that the data or the object is usable as the edited data or the edited object. For example, the systems and/or methods may store the generated program code such that program code (e.g., generated program code or program code input by a user) in another program file may use the edited data or the edited object. Additionally, or alternatively, the systems and/or methods may store the program code such that the data or the object is usable outside of the UI element. For example, the systems and/or methods may store the program code such that the data or the object may be used by another program file or used by other systems and/or methods.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
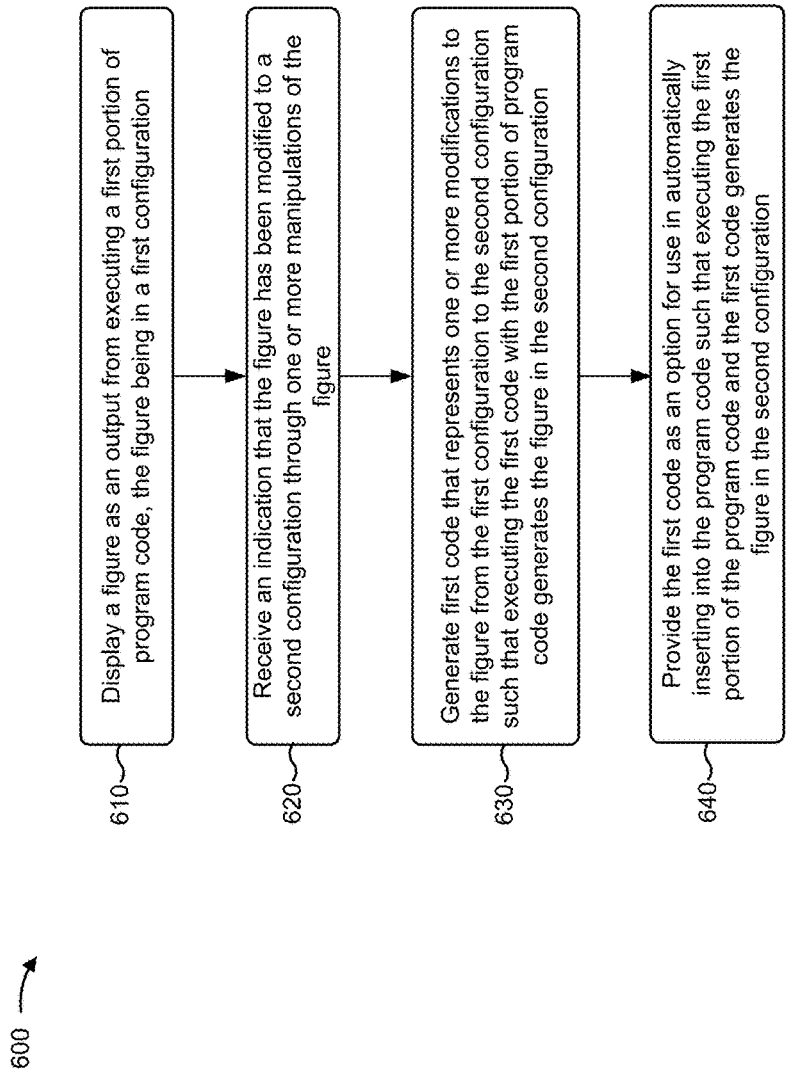
FIGS. 6-8 are flow charts of example processes for generating code based on a user interaction with a user interface element in a code editor.

FIG. 6 is a flow chart of an example process 600 for generating code based on a user interaction with a user interface element in a code editor. In some implementations, one or more process blocks of FIG. 6 may be performed by client device 310 (e.g., TCE 320 executing on client device 310). In some implementations, one or more process blocks of FIG. 6 may be performed by another device or a group of devices separate from or including client device 310, such as server device 330 (e.g., TCE 320 executing on server device 330).

As shown in FIG. 6, process 600 may include displaying a figure as an output from executing a first portion of program code, the figure being in a first configuration (block 610). For example, TCE 320 may display a figure as an output from executing a first portion of program code, as described above (e.g., in connection with FIG. 2I). The figure may be in a first configuration.

As further shown in FIG. 6, process 600 may include receiving an indication that the figure has been modified to a second configuration through one or more manipulations of the figure (block 620). For example, TCE 320 may receive an indication that the figure has been modified to a second configuration through one or more manipulations of the figure, as described above (e.g., in connection with FIG. 2I). In some implementations, the one or more manipulations include one or more of panning, rotating, zooming, adding or modifying a label, adding or modifying a title, moving a title or another legend to a different location, thickening or thinning a line in the figure, resizing one or more axes, and/or the like.

As further shown in FIG. 6, process 600 may include generating first code that represents one or more modifications to the figure from the first configuration to the second configuration such that executing the first code with the first portion of program code generates the figure in the second configuration (block 630). For example, TCE 320 may generate first code that represents one or more modifications to the figure from the first configuration to the second configuration, as described above (e.g., in connection with FIG. 2I). In some implementations, executing the first code with the first portion of program code generates the figure in the second configuration. Additional details regarding generating the first code are described below in connection with FIG. 7.

In some implementations, TCE 320 may display the program code, the first code, and the figure in different portions of the same display. Additionally, or alternatively, TCE 320 may display the first code as an option for use in automatically updating the program code. Additionally, or alternatively, TCE 320 may automatically determine a location in the program code for inserting the first code such that executing the first portion of the program code with the inserted first code generates the figure in the second configuration. For example, TCE 320 may map the program code to the figure to identify the first portion of the program code, and may use the mapping for determining the location. Additionally, or alternatively, TCE 320 may maintain correlation information for the first portion of the program code and the output, and may use the correlation information for determining the location.

In some implementations, TCE 320 may, during a manipulation, generate the first code continuously as the value changes. The continuously generated code can be continuously displayed with the changing values. Additionally, or alternatively, TCE 320 may record selected manipulations of the one or more manipulations and the code generated for the selected manipulations, may receive a playback request, and may restore the figure to a configuration corresponding to one or more of the selected manipulations and the code generated for the one or more of the selected manipulations. Additionally, or alternatively, TCE 320 may generate the first code without considering a sequence of the one or more manipulations or without generating code for each individual manipulation.

As further shown in FIG. 6, process 600 may include providing the first code as an option for use in automatically inserting into the program code such that executing the first portion of the program code and the first code generates the figure in the second configuration (block 640). For example, TCE 320 may provide the first code as an option for use in automatically inserting into the program code, as described above (e.g., in connection with FIG. 2I). In some implementations, executing the first code with the first portion of program code generates the figure in the second configuration. Additional details regarding generating the first code are described below in connection with FIG. 7.

Although FIG. 6 shows example blocks of process 600, in some implementations, process 600 may include additional blocks, fewer blocks, different blocks, or differently arranged blocks than those depicted in FIG. 6.

Figure 7:
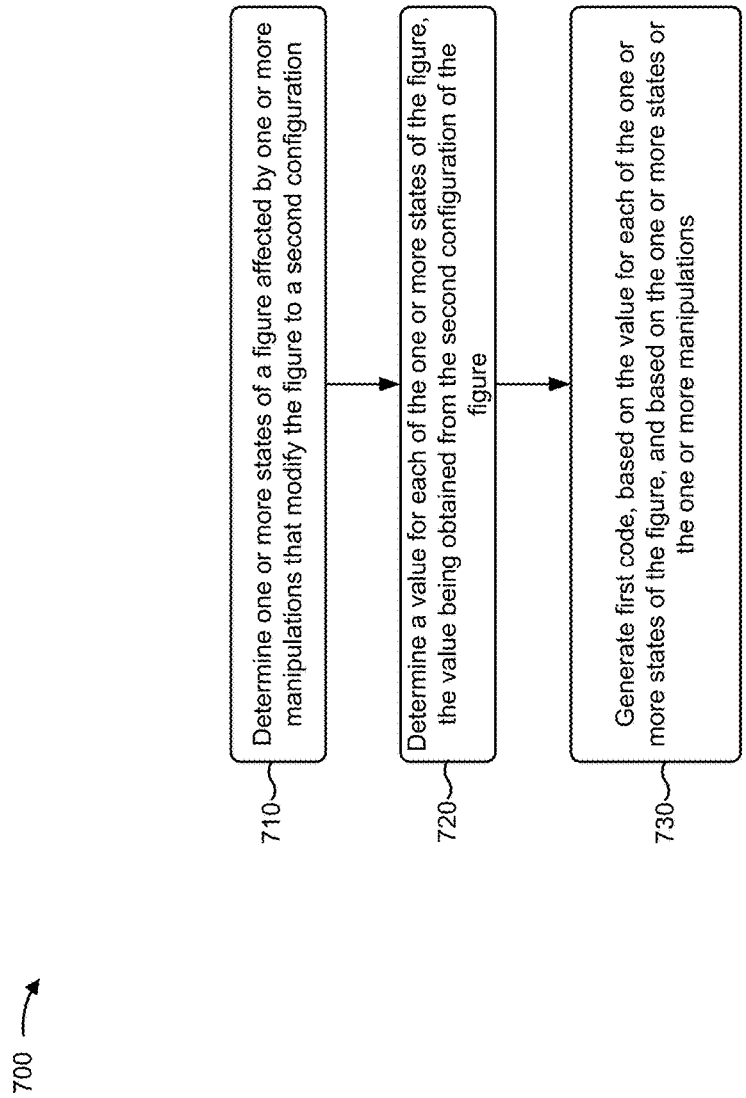

FIG. 7 is a flow chart of an example process 700 for generating code based on a user interaction with a user interface element in a code editor. In some implementations, process 700 may correspond to block 630 of FIG. 6. In some implementations, one or more process blocks of FIG. 7 may be performed by client device 310 (e.g., TCE 320 executing on client device 310). In some implementations, one or more process blocks of FIG. 7 may be performed by another device or a group of devices separate from or including client device 310, such as server device 330 (e.g., TCE 320 executing on server device 330).

As shown in FIG. 7, process 700 may include determining one or more states of a figure affected by one or more manipulations that modify the figure to a second configuration (block 710). For example, TCE 320 may determine one or more states of a figure affected by one or more manipulations that modify the figure to a second configuration, as described above (e.g., in connection with FIG. 2I). In some implementations, the one or more states affected by the one or more manipulations may include a manipulation to one or more of an x-axis limit, a y-axis limit, a z-axis limit, an axis of rotation, a degree of rotation, a zoom factor, text for a label, text for a title, and/or the like.

As further shown in FIG. 7, process 700 may include determining a value for each of the one or more states of the figure, the value being obtained from the second configuration of the figure (block 720). For example, TCE 320 may determine a value for each of the one or more states of the figure, as described above (e.g., in connection with FIG. 2I). In some implementations, the value may be obtained from the second configuration of the figure. In some implementations, the value for each state may include one or more of a numerical value, a string, a Boolean value, a character, an array, an object, a structure, and/or the like.

As further shown in FIG. 7, process 700 may include generating first code, that based on value for each of the one or more states of the figure, and based on the one or more states or the one or more manipulations (block 730). In some implementations, code for other states unaffected by the one or more manipulations is not generated. For example, TCE 320 may generate first code based on the value for each of the one or more states of the figure, as described above (e.g., in connection with FIG. 2I). In some implementations, TCE 320 may generate the first code without generating code for other states unaffected by the one or more manipulations. In this way, TCE 320 may conserve processing resources and/or memory resources as compared to regenerating all of the code to create the figure from scratch.

Although FIG. 7 shows example blocks of process 700, in some implementations, process 700 may include additional blocks, fewer blocks, different blocks, or differently arranged blocks than those depicted in FIG. 7.

Figure 8:
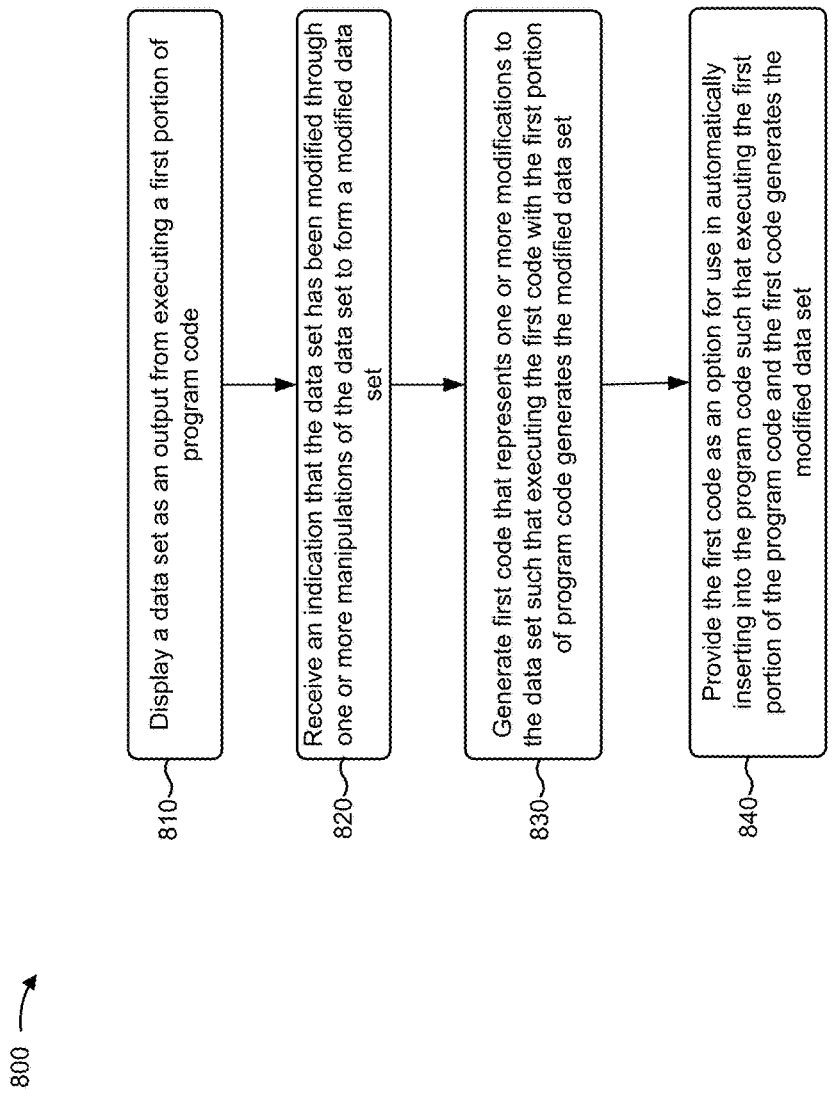

FIG. 8 is a flow chart of an example process 800 for generating code based on a user interaction with a user interface element in a code editor. In some implementations, one or more process blocks of FIG. 8 may be performed by client device 310 (e.g., TCE 320 executing on client device 310). In some implementations, one or more process blocks of FIG. 8 may be performed by another device or a group of devices separate from or including client device 310, such as server device 330 (e.g., TCE 320 executing on server device 330).

As shown in FIG. 8, process 800 may include displaying a data set as an output from executing a first portion of program code (block 810). For example, TCE 320 may display a data set as an output from executing a first portion of program code, as described above (e.g., in connection with FIGS. 2M-2T). In some implementations, the data set includes one or more data points in the form comprising one or more of a matrix, a table, an array, a vector, a tree, a list, a data structure (e.g., a tree structure), and/or any combination of the above. The data set may include data points in any type of data structure, which may be tabular or non-tabular in nature.

As further shown in FIG. 8, process 800 may include receiving an indication that the data set has been modified through one or more manipulations of the data set to form a modified data set (block 820). For example, TCE 320 may receive an indication that the data set has been modified through one or more manipulations of the data set to form a modified data set, as described above (e.g., in connection with FIGS. 2M-2T). In some implementations, the one or more manipulations include one or more of deleting data, adding data, modifying data, sorting data, filtering data, transposing data, and/or the like.

As further shown in FIG. 8, process 800 may include generating first code that represents one or more modifications to the data set such that executing the first code with the first portion of program code generates the modified data set (block 830). For example, TCE 320 may generate first code that represents one or more modifications to the data set, as described above (e.g., in connection with FIGS. 2M-2T). In some implementations, TCE 320 may generate the first code such that executing the first code with the first portion of program code generates the modified data set.

In some implementations, for each different type of manipulations of the one or more manipulations, TCE 320 may generate first code for each manipulation in a sequence corresponding to a sequence of the one or more manipulations applied to the data set. The code generated for each manipulation may be generated based on the manipulation and one or more values of the data set that are modified by the manipulation. In some implementations, for two or more same type of manipulations of the one or more manipulations, TCE 320 may generate code for a first of the two or more same type of manipulations, and may update the code without generating additional code for the other of the two or more same type of manipulations. In some implementations, generating the first code depends on a sequence of the one or more manipulations. In some implementations, the one or more values include one or more of a numerical value, a string, a Boolean value, a character, an array, an object, a structure, and/or the like.

As further shown in FIG. 8, process 800 may include providing the first code as an option for use in automatically inserting into the program code such that executing the first portion of the program code and the first code generates the modified data set (block 840). For example, TCE 320 may provide the first code as an option for use in automatically inserting into the program code, as described above (e.g., in connection with FIGS. 2M-2T). In some implementations, executing the first portion of the program code and the first code generates the modified data set. In some implementations, the program code, the first code, and the data set are displayed in different portions of the same display.

In some implementations, TCE 320 may automatically determine a location in the program code for inserting the first code, such that executing the first portion of the program code with the inserted first code generates the modified data set. In some implementations, TCE 320 may map the program code to the data set to identify the first portion of the program code, and may use the mapping for determining the location. Additionally, or alternatively, TCE 320 may maintain correlation information for the first portion of the program code and the output, and may use the correlation information for determining the location.

In some implementations, TCE 320 may generate a figure from the data set, may receive an indication that the figure has been modified to form a modified figure through one or more manipulations of the figure, and may generate code such that executing the code modifies the figure generated from the data set to form the modified figure. In some implementations, TCE 320 may generate another data set from the data set, may receive an indication that the other data set has been modified to a modified other data set through one or more manipulations of the other data set, and may generate code such that executing the code modifies the other data set to form the modified other data set. Additionally, or alternatively, executing the code may generate the modified other data set. Additionally, or alternatively, executing the code may modify the original data set, which may update the modified other data set.

In some implementations, TCE 320 may record selected manipulations of the one or more manipulations and the code generated for the selected manipulations, may receive a playback request, and may restore the data set corresponding to one or more of the selected manipulations and the code generated for one or more of the selected manipulations.

Although FIG. 8 shows example blocks of process 800, in some implementations, process 800 may include additional blocks, fewer blocks, different blocks, or differently arranged blocks than those depicted in FIG. 8.

In some implementations, the example code generator 251 and the example code generation process of FIGS. 2T and 2U can be applied to other implementations of this disclosure, e.g., those of FIGS. 1A-1H and FIGS. 2A-2H and FIGS. 2V-1 to 2V-3, 2W-1 and 2W-2, and 2X-1 and 2X-2, in addition to be applicable to the implementations of FIGS. 2I-2S, as described previously. In some implementations, the TCE 320 implements an architecture that allows the code generated from manipulation of data, figure, and other objects in a UI element to be consistent with input program code that generates the data, figure, or the other objects. For example, the variable names used in the input program code are consistently used in the code generated based on the manipulations. As another example, the generated code reuses elements from the input program code, e.g., user's hand-written code. For example, in FIG. 2K, if the user interactively changes the background color of the output figure to blue, the generated code can re-use the variable name "surfacePlot" to generate code "surfacePlot.Color='blue'. The code generated can also be insertable to the input program code.

In some implementations, the figure and/or data set described above can be represented by, be in the form of, or contain one or more objects. For example, an entire data set or one or more parts of the data set, e.g., data points in the data set, contains, is in the form of, or is represented by one or more objects. For example, a table can be an object. In some implementations, an object can have one or more attributes, e.g., data values, and one or more methods, e.g., code. A user can interact with the object(s) in the UI elements as described previously. The example methodologies for generating code based on figure manipulation or data set manipulation can be applied to object manipulation.

In some examples, the architecture maintains traceability between the input program code and its output data, figure, or other objects. As described previously in an example, the traceability can be maintained using tags or flags or other mechanisms. In some implementations, the architecture includes maintaining the input program code, the output of the program code to which manipulation(s) can be applied, and other related information in a single document. In this document, the executable contents, e.g., program code, the non-executable contents, e.g., outputs of execution, are identifiable. In other examples, these contents are stored in multiple documents but traceability information is maintained. An applicable example architecture is described in U.S. Ser. No. 15/052,464, filed Feb. 24, 2016, the entire content of which is incorporated here by reference.

Implementations described herein enable systems and/or methods to provide data or an object from within a program file for visualization, manipulation, and/or execution using a UI element within a code editor. In addition, the systems and/or methods may record manipulations and/or other interactions with the data or the object by automatically generating code, thereby persisting the manipulations and/or the other interactions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, or another type of hardware and/or software based code that may be compiled and/or synthesized), binary code that may be executed (e.g., executable files that may be directly executed by an operating system, bitstream files that may be used to configure an FPGA, Java byte code, object files combined together with linker directives, source code, or makefiles), text files that may be executed in conjunction with other executables (e.g., Python text files, Octave files, a collection of dynamic-link library (DLL) files with text-based combining, configuration information that connects pre-compiled modules, or an extensible markup language (XML) file describing module linkage), source code (e.g., readable by a human), machine code (e.g., readable by a machine), or the like. In some implementations, program code may include different combinations of the above-identified classes of code (e.g., text-based code, binary code, text files, source code, or machine code). Additionally, or alternatively, program code may include code generated using a dynamically-typed programming language (e.g., the M language, a MATLAB® language, a MATLAB-compatible language, or a MATLAB-like language) that may be used to express problems and/or solutions using mathematical notations. Additionally, or alternatively, program code may be of any type, such as a function, a script, or an object.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, or a text-based user interface. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, or a position of information provided via the user interface). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   displaying, by one or more processors, a figure as an output from executing a first portion of program code, the figure being in a first configuration;
   receiving, by the one or more processors, an indication that the figure has been modified to a second configuration through one or more manipulations of the figure;
   generating, by the one or more processors, a first code that represents one or more modifications to the figure from the first configuration to the second configuration such that executing the first code with the first portion of the program code generates the figure in the second configuration,
   wherein the generating the first code comprises:
      determining one or more states of the figure affected by the one or more manipulations of the figure that modify the figure to the second configuration,
      determining a value for each of the one or more states of the figure, the value being obtained from the second configuration, and
      generating the first code, based on the value for each of the one or more states of the figure, and based on the one or more states of the figure or the one or more manipulations of the figure; and
   providing, by the one or more processors, the first code as an option to use in automatically inserting into the program code such that executing the first portion of the program code and the first code generates the figure in the second configuration; or
   automatically inserting, by the one or more processors, the first code into the program code such that executing the first portion of the program code and the first code generates the figure in the second configuration.

2. The method of claim 1, wherein the first code is generated without generating code for other states unaffected by the one or more manipulations of the figure.

3. The method of claim 1, further comprising:
   displaying the first code as an option to use in automatically updating the program code.

4. The method of claim 1, further comprising:
   automatically determining a location in the program code to insert the first code such that executing the first portion of the program code with the inserted first code generates the figure in the second configuration,
   the automatically determining the location in the program code comprising:
      mapping the program code to the figure to identify the first portion of the program code and using the mapping to automatically determine the location in the program code; or
      maintaining correlation information for the first portion of the program code and the output and using the correlation information to automatically determine the location in the program code.

5. The method of claim 1, wherein the one or more manipulations of the figure comprise one or more of panning, rotating, zooming, adding or modifying a label, adding or modifying a title, or adding or modifying a figure characteristic.

6. The method of claim 5, wherein the one or more states of the figure affected by the one or more manipulations of the figure comprise one or more of an x-axis limit, a y-axis limit, a z-axis limit, an axis of rotation, a degree of rotation, a zoom factor, text for the label, or text for the title.

7. The method of claim 1, wherein the first code is generated continuously with one or more values continuously changing.

8. The method of claim 1, further comprising:
   recording selected manipulations of the one or more manipulations of the figure and the first code generated for the selected manipulations of the one or more manipulations of the figure;
   receiving a playback request; and
   restoring the figure to a configuration corresponding to one or more of the selected manipulations of the one or more manipulations of the figure and the first code generated for the one or more of the selected manipulations of the one or more manipulations of the figure.

9. The method of claim 1, wherein the generating the first code comprises:
   generating the first code without considering a sequence of the one or more manipulations of the figure or without generating code for each individual manipulation of the figure.

10. The method of claim 1, wherein the value, for each of the one or more states of the figure, comprises a numerical value, a string, a Boolean value, a character, an array, an object, or a structure.

11. The method of claim 1, wherein the program code, the first code, and the figure are displayed in different portions of a same display.

12. A method comprising:
   displaying, by one or more processors, a data set as an output from executing a first portion of program code;
   receiving, by the one or more processors, an indication that the data set has been modified through one or more manipulations of the data set to form a modified data set;
   generating, by the one or more processors, a first code that represents one or more modifications to the data set such that executing the first code with the first portion of the program code generates the modified data set,
   wherein the generating the first code comprises:
      determining one or more data points of the data set affected by the one or more manipulations that modify the data set to form the modified data set, determining a value for each of the one or more data points of the data set, the value being obtained from the modified data set, and generating the first code, based on the value for each of the one or more data points of the data set, and based on the one or more data points of the data set or the one or more manipulations of the data set, the generating comprises applying one or more rules defined for each of the one or more manipulations of the data set; and providing, by the one or more processors, the first code as an option to use in automatically inserting into the program code such that executing the first portion of the program code and the first code generates the modified data set; or automatically inserting, by the one or more processors, the first code into the program code such that executing the first portion of the program code and the first code generates the modified data set.

13. The method of claim 12, wherein generating the first code comprises:

for each different type of manipulation of the one or more manipulations of the data set, generating the first code for each manipulation in a sequence corresponding to a sequence of the one or more manipulations of the data set applied to the data set, the first code generated for each manipulation being generated based on the manipulation and one or more values of the data set that are modified by the manipulation, or for two or more same type of manipulations of the one or more manipulations of the data set, generating code for a first of the two or more same type of manipulations and updating the first code without generating additional code for the other of the two or more same type of manipulations.

14. The method of claim 12, wherein the data set comprises one or more data points in a form comprising a matrix, a table, an array, a vector, a tree, a list, an object, or a data structure.

15. The method of claim 12, wherein the one or more manipulations of the data set comprises deleting data, adding data, modifying data, sorting data, filtering data, or transposing data.

16. The method of claim 12, further comprising:
generating a figure from the data set;
receiving an indication that the figure has been modified to form a modified figure through one or more manipulations of the figure; and
generating the first code such that executing the first code generates the modified figure.

17. The method of claim 12, further comprising:
generating another data set from the data set;
receiving an indication that the other data set has been modified to form a modified other data set through one or more manipulations of the other data set; and
generating code such that executing the code modifies the other data set to form the modified other data set.

18. The method of claim 12, further comprising:
recording selected manipulations of the one or more manipulations of the data set and the first code generated for the selected manipulations;
receiving a playback request; and
restoring the data set corresponding to one or more of the selected manipulations of the one or more manipulations of the data set and the first code generated for one or more of the selected manipulations of the one or more manipulations of the data set.

19. The method of claim 12, further comprising:
automatically determining a location in the program code to insert the first code such that executing the first portion of the program code with the inserted first code generates the modified data set,
the automatically determining the location in the program code comprising:
mapping the program code to the data set to identify the first portion of the program code and using the mapping to automatically determine the location in the program code; or
maintaining correlation information for the first portion of the program code and the output and using the correlation information to automatically determine the location in the program code.

20. The method of claim 12, wherein one or more values of the data set comprise a numerical value, a string, a Boolean value, a character, an array, an object, or a structure.

21. The method of claim 12, wherein the program code, the first code, and the data set are displayed in different portions of a same display.

22. The method of claim 12, wherein the first code is generated continuously during the one or more manipulations of the data set.

23. A method comprising:
displaying, by one or more processors, an output from executing a first portion of program code;
receiving, by the one or more processors, an indication that the output has been modified through one or more manipulations of the output to form a modified output;
generating, by the one or more processors, a first code that represents one or more modifications to the output to generate the modified output such that executing the first code with the first portion of the program code generates the modified output,
wherein the generating the first code comprises:
identifying a result associated with a manipulation of the one or more manipulations of the output,
identifying implementation code for the manipulation of the one or more manipulations of the output,
generating the first code based on the result and based on the implementation code, and
when multiple manipulations of the output are applied, applying one or more rules associated with the multiple manipulations of the output; and
providing, by the one or more processors, the first code as an option to use in automatically inserting into the program code such that executing the first portion of the program code and the first code generates the modified output; or
automatically inserting, by the one or more processors, the first code into the program code such that executing the first portion of the program code and the first code generates the modified output.

24. The method of claim 23, wherein the output comprises a figure, a data set, a symbolic expression or equation, a model, or an object with a representation that can be manipulated.

25. The method of claim 24, wherein the object is in a representation of a tree, a list, a table, or a control loop.

26. The method of claim 23, further comprising:
automatically inserting the first code into the program code.

27. The method of claim 26, further comprising:
automatically determining a location in the program code to insert the first code.

28. A system comprising:
a memory; and
one or more processors to:
- display a figure as an output from executing a first portion of program code, the figure being in a first configuration;
- receive an indication that the figure has been modified to a second configuration through one or more manipulations of the figure;
- generate a first code that represents one or more modifications to the figure from the first configuration to the second configuration such that executing the first code with the first portion of the program code generates the figure in the second configuration,
  wherein, when generating the first code, the one or more processors are to:
  - determine one or more states of the figure affected by the one or more manipulations of the figure that modify the figure to the second configuration,
  - determine a value for each of the one or more states of the figure, the value being obtained from the second configuration, and
  - generate the first code, based on the value for each of the one or more states of the figure, and based on the one or more states of the figure or the one or more manipulations of the figure; and
- provide the first code as an option to use in automatically inserting into the program code such that executing the first portion of the program code and the first code generates the figure in the second configuration; or
- automatically insert the first code into the program code such that executing the first portion of the program code and the first code generates the figure in the second configuration.

29. The system of claim 28, wherein the first code is generated without generating code for other states unaffected by the one or more manipulations of the figure.

30. A non-transitory computer-readable medium storing instructions, the instructions comprising:
one or more instructions that, when executed by at least one processor, cause the at least one processor to:
- display a figure as an output from executing a first portion of program code, the figure being in a first configuration;
- receive an indication that the figure has been modified to a second configuration through one or more manipulations of the figure;
- generate a first code that represents one or more modifications to the figure from the first configuration to the second configuration such that executing the first code with the first portion of the program code generates the figure in the second configuration,
  wherein the one or more instructions that, when executed by the at least one processor, cause the at least one processor to generate the first code comprise one or more instructions that cause the at least one processor to:
  - determine one or more states of the figure affected by the one or more manipulations of the figure that modify the figure to the second configuration,
  - determine a value for each of the one or more states of the figure, the value being obtained from the second configuration, and
  - generate the first code, based on the value for each of the one or more states of the figure, and based on the one or more states of the figure or the one or more manipulations of the figure; and
- provide the first code as an option to use in automatically inserting into the program code such that executing the first portion of the program code and the first code generates the figure in the second configuration; or
- automatically insert the first code into the program code such that executing the first portion of the program code and the first code generates the figure in the second configuration.

31. The non-transitory computer-readable medium of claim 30, wherein the one or more manipulations of the figure comprise one or more of panning, rotating, zooming, or adding or modifying a figure characteristic.

32. A system comprising:
a memory; and
one or more processors to:
- display a data set as an output from executing a first portion of program code;
- receive an indication that the data set has been modified through one or more manipulations of the data set to form a modified data set;
- generate a first code that represents one or more modifications to the data set such that executing the first code with the first portion of the program code generates the modified data set,
  wherein, when generating the first code, the one or more processors are to:
  - determine one or more data points of the data set affected by the one or more manipulations that modify the data set to form the modified data set,
  - determine a value for each of the one or more data points of the data set, the value being obtained from the modified data set, and
  - generate the first code, based on the value for each of the one or more data points of the data set, and based on the one or more data points of the data set or the one or more manipulations of the data set, the generating comprises applying one or more rules defined for each of the one or more manipulations of the data set; and
- provide the first code as an option to use in automatically inserting into the program code such that executing the first portion of the program code and the first code generates the modified data set; or
- automatically insert the first code into the program code such that executing the first portion of the program code and the first code generates the modified data set.

33. The system of claim 32, wherein the first code is generated during the one or more manipulations of the data set.

34. A non-transitory computer-readable medium storing instructions, the instructions comprising:
one or more instructions that, when executed by at least one processor, cause the at least one processor to:
- display a data set as an output from executing a first portion of program code;
- receive an indication that the data set has been modified through one or more manipulations of the data set to form a modified data set;
- generate a first code that represents one or more modifications to the data set such that executing the first code with the first portion of the program code generates the modified data set,
wherein the one or more instructions that, when executed by the at least one processor, cause the at least one processor to generate the first code comprise one or more instructions that cause the at least one processor to:
determine one or more data points of the data set affected by the one or more manipulations that modify the data set to form the modified data set,
determine a value for each of the one or more data points of the data set, the value being obtained from the modified data set, and
generate the first code, based on the value for each of the one or more data points of the data set, and based on the one or more data points of the data set or the one or more manipulations of the data set, the generating comprises applying one or more rules defined for each of the one or more manipulations of the data set; and
provide the first code as an option to use in automatically inserting into the program code such that executing the first portion of the program code and the first code generates the modified data set; or
automatically insert the first code into the program code such that executing the first portion of the program code and the first code generates the modified data set.

35. The non-transitory computer-readable medium of claim 34, wherein the instructions further comprise:
one or more instructions that, when executed by the at least one processor, cause the at least one processor to:
generate a figure from the data set;
receive an indication that the figure has been modified to form a modified figure through one or more manipulations of the figure; and
generate the first code such that executing the first code generates the modified figure.

36. A system comprising:
a memory; and
one or more processors to:
display an output from executing a first portion of program code;
receive an indication that the output has been modified through one or more manipulations of the output to form a modified output;
generate a first code that represents one or more modifications to the output to generate the modified output such that executing the first code with the first portion of the program code generates the modified output,
wherein, when generating the first code, the one or more processors are to:
identify a result associated with a manipulation of the one or more manipulations of the output,
identify implementation code for the manipulation of the one or more manipulations of the output,
generate the first code based on the result and based on the implementation code, and
when multiple manipulations of the output are applied, apply one or more rules associated with the multiple manipulations of the output; and
provide the first code as an option to use in automatically inserting into the program code such that executing the first portion of the program code and the first code generates the modified output; or
automatically insert the first code into the program code such that executing the first portion of the program code and the first code generates the modified output.

37. The system of claim 36, wherein the output comprises a figure, a data set, a symbolic expression or equation, a model, or an object with a representation that can be manipulated.

38. A non-transitory computer-readable medium storing instructions, the instructions comprising:
one or more instructions that, when executed by at least one processor, cause the at least one processor to:
display an output from executing a first portion of program code;
receive an indication that the output has been modified through one or more manipulations of the output to form a modified output;
generate a first code that represents one or more modifications to the output to generate the modified output such that executing the first code with the first portion of the program code generates the modified output,
wherein the one or more instructions that, when executed by the at least one processor, cause the at least one processor to generate the first code comprise one or more instructions that cause the at least one processor to:
identify a result associated with a manipulation of the one or more manipulations of the output,
identify implementation code for the manipulation of the one or more manipulations of the output,
generate the first code based on the result and based on the implementation code, and
when multiple manipulations of the output are applied, apply one or more rules associated with the multiple manipulations of the output; and
provide the first code as an option to use in automatically inserting into the program code such that executing the first portion of the program code and the first code generates the modified output; or
automatically insert the first code into the program code such that executing the first portion of the program code and the first code generates the modified output.

39. The non-transitory computer-readable medium of claim 38, wherein the instructions further comprise:
one or more instructions that, when executed by the at least one processor, cause the at least one processor to:
determine a location in the program code to insert the first code; and
insert the first code into the location in the program code.

* * * * *